(12) United States Patent
Moreno et al.

(10) Patent No.: US 12,390,940 B2
(45) Date of Patent: Aug. 19, 2025

(54) ROBOTIC FOAM DISPENSER

(71) Applicant: Dexterity, Inc., Redwood City, CA (US)

(72) Inventors: Robert Moreno, Sunnyvale, CA (US); Andrew Dupree, San Francisco, CA (US); Salvador Perez, Jersey City, NJ (US)

(73) Assignee: Dexterity, Inc., Redwood City, CA (US)

( * ) Notice: Subject to any disclaimer, the term of this patent is extended or adjusted under 35 U.S.C. 154(b) by 775 days.

(21) Appl. No.: 17/716,382

(22) Filed: Apr. 8, 2022

(65) Prior Publication Data

US 2022/0331989 A1  Oct. 20, 2022

Related U.S. Application Data

(60) Provisional application No. 63/175,772, filed on Apr. 16, 2021.

(51) Int. Cl.
| | |
|---|---|
| *G06F 7/00* | (2006.01) |
| *B05B 7/00* | (2006.01) |
| *B25J 9/16* | (2006.01) |
| *B25J 15/00* | (2006.01) |
| *B25J 15/06* | (2006.01) |
| *B25J 19/00* | (2006.01) |

(52) U.S. Cl.
CPC ......... *B25J 15/0019* (2013.01); *B05B 7/0018* (2013.01); *B25J 9/1671* (2013.01); *B25J 9/1687* (2013.01); *B25J 15/0616* (2013.01); *B25J 19/0025* (2013.01)

(58) Field of Classification Search
CPC .... B25J 15/0019; B25J 9/1671; B25J 9/1687; B25J 15/0616; B25J 19/0025; B25J 11/00; B25J 9/1612; B25J 9/1697; B25J 15/0066; B25J 15/00; B05B 7/0018; B05B 7/0025; B65G 2203/0233; B65G 2203/041; B65G 2203/042; B65G 57/005; B65G 61/00; G05B 2219/39102; G05B 2219/40006; G05B 2219/50364
USPC .................................................. 700/213, 217
See application file for complete search history.

(56) References Cited

U.S. PATENT DOCUMENTS

| | | | |
|---|---|---|---|
| 3,664,062 | A | 5/1972 | Danielson |
| 2007/0130855 | A1 | 6/2007 | Wentworth |
| 2012/0180951 | A1 | 7/2012 | Park |
| 2016/0297611 | A1 | 10/2016 | Williams |
| 2019/0299424 | A1 | 10/2019 | Curhan |

(Continued)

FOREIGN PATENT DOCUMENTS

| | | | | |
|---|---|---|---|---|
| CA | 2184774 | | 3/1997 | |
| CN | 111605938 | A * | 9/2020 | ............ B25J 9/0093 |
| JP | 2021006481 | A * | 1/2021 | |

*Primary Examiner* — Yolanda R Cumbess
(74) *Attorney, Agent, or Firm* — Van Pelt, Yi & James LLP

(57) ABSTRACT

A device that dispenses spacer material is disclosed. The device may be implemented in connection with a robotic palletization/depalletization system. The device may include a mounting hardware configured to mount the device on or adjacent to an end effector of a robotic arm, a communication interface configured to receive a control signal, and an actuator configured to dispense a quantity of spacer material from a supply of spacer material in response to the control signal.

44 Claims, 32 Drawing Sheets

(56) References Cited

U.S. PATENT DOCUMENTS

| | | |
|---|---|---|
| 2020/0270071 A1 | 8/2020 | Chavez |
| 2021/0053216 A1 | 2/2021 | Diankov |

* cited by examiner

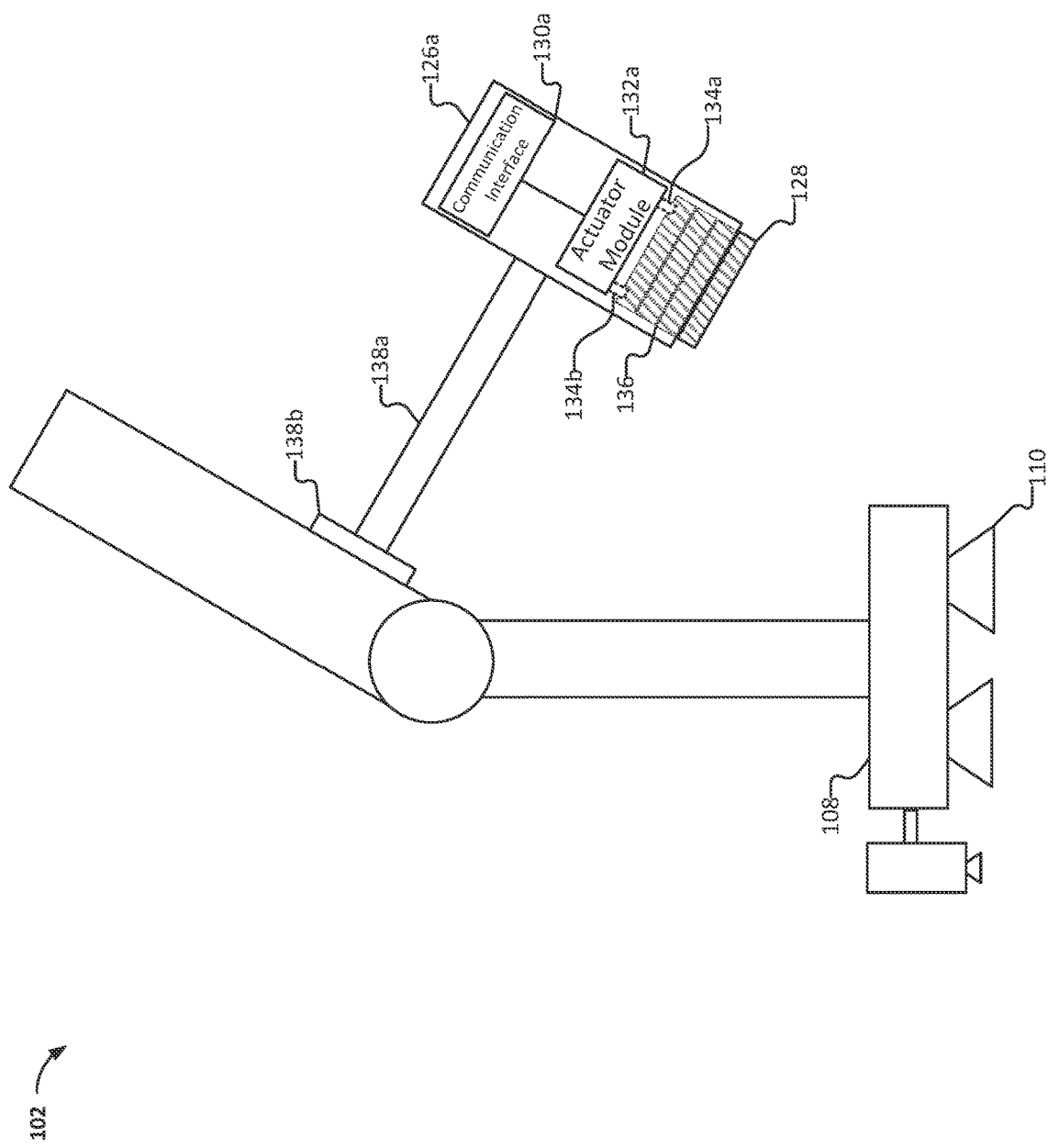

ROBOTIC FOAM DISPENSER

CROSS REFERENCE TO OTHER APPLICATIONS

This application claims priority to U.S. Provisional Patent Application No. 63/175,772 entitled ROBOTIC FOAM DISPENSER filed Apr. 16, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc. When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

Use of robotics is made more challenging in many environments due to the variety of items, variations the order, number, and mix of items to be packed, on a given pallet for example, and a variety of types and location of container and/or feed mechanism from which items must be picked up to be placed on the pallet or other container. In addition, such variations in items, order of items, number of items, and mix of types of items may lead to instability of a stack of items on a pallet.

BRIEF DESCRIPTION OF THE DRAWINGS

Various embodiments of the invention are disclosed in the following detailed description and the accompanying drawings.

FIG. 1B is a diagram illustrating an embodiment of a robotic system including a device to dispense a spacer.

DETAILED DESCRIPTION

Figure 1A:
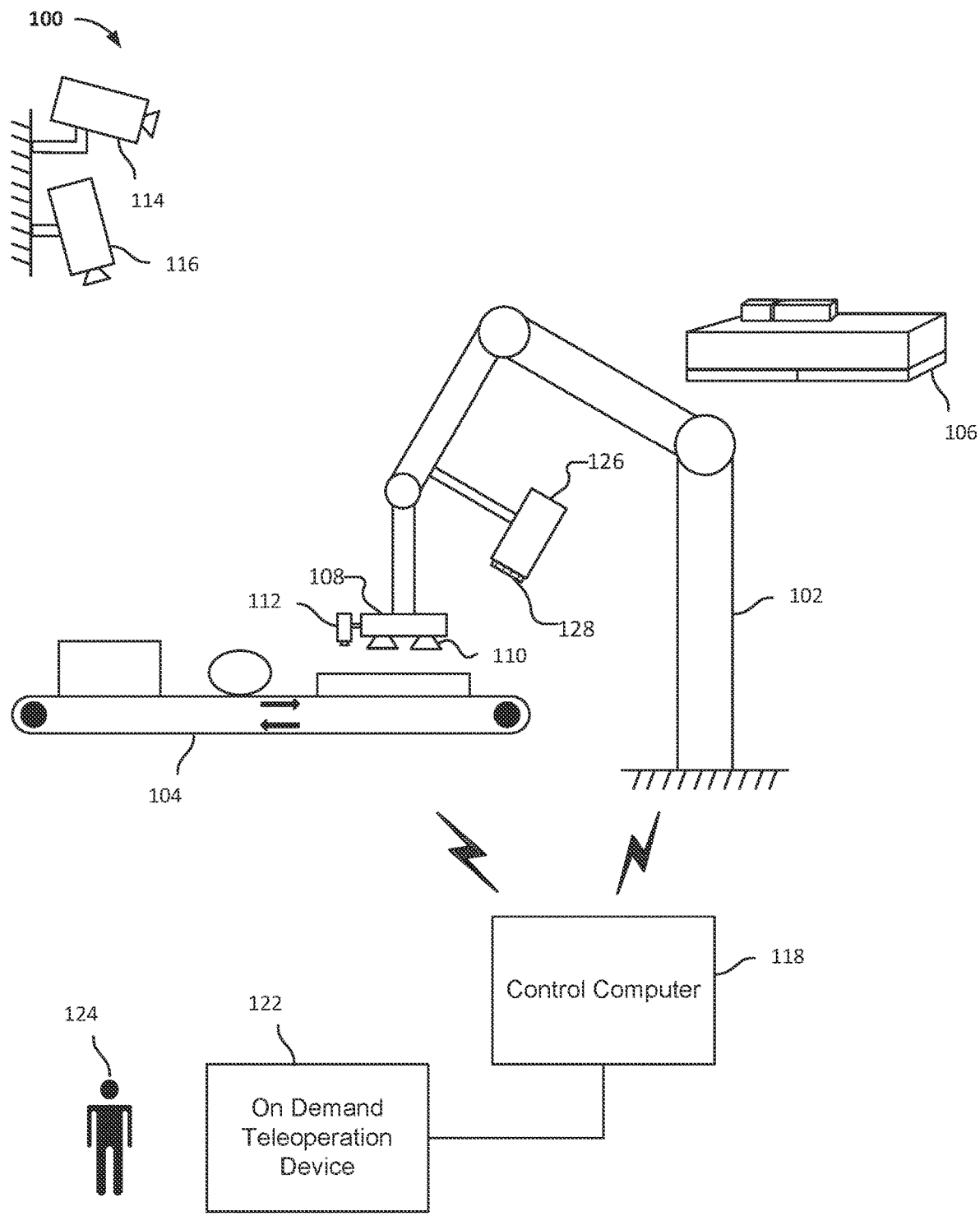
FIG. 1A is a diagram illustrating an embodiment of a robotic system to palletize and/or depalletize heterogeneous items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

One technical challenge to robotic palletizing and/or depalletizing of objects of mixed sizes, such as boxes of different dimensions, is the impact on stability that a layer with an upper surface has on the stability of the stack of items as items are placed/stacked on the upper surface. Generally, there is a need to build each layer with an upper surface suitable to form the base for the next layer. In some embodiments, suitability of an upper surface is measured/determined based at least in part on one or more of an extent to which the upper surface is flat (e.g., level or planar, etc.), a rigidity of the upper surface, a variability in the height or flatness of the upper surface etc. In some embodiments, the upper surface of a layer is determined to be suitable if an average rigidity of the upper surface exceeds a rigidity threshold value. As an example, the upper surface of a layer may be determined to be suitable if a variation in a height of is less than a variability threshold value. As an example, the upper surface of a layer may be determined to be suitable if a variation in a level/flatness of the upper surface is less than a variability threshold value. As an example, the upper surface of a layer may be determined to be suitable if a rigidity of at least a part (e.g., a defined minimum surface area) of the upper surface does is not below a minimum rigidity threshold value.

Techniques are disclosed to use robotically dispensed and/or accessed foam or other spacers to perform robotic mixed object palletizing & depalletizing. In various embodiments, a robotic system as disclosed herein determines programmatically to pick objects from a chute, conveyor, or other source of objects; retrieves objects from a buffer or receptacle in which the system has placed objects that arrived previously via the chute, conveyor, or other source of objects; or robotically dispense or grasp foam or other rigid or semi-rigid spacers, e.g., blocks of predetermined and/or dynamically and robotically formed dimensions, to quickly and efficiently build a next layer in a pallet.

In various embodiments, when depalletizing a robotic system as disclosed herein recognizes a foam or other spacer placed previously in a layer, and based at least in part on recognizing the foam or other spacer the system moves the foam or other spacer from the pallet layer to a receptacle or conveyance other than a conveyor or other destination to which mixed objects other than spacers are placed, e.g., for further delivery to a downstream destination. In some embodiments, the foam or other spacer may be reused in a future palletization.

Various embodiments are disclosed to pick and place items between a source location and a destination location based at least in part on an attribute or state of the source location and/or and attribute or state of the destination location. Attributes of a source location and/or destination location may include a height of the location, a relative distance between an item to be moved and the location (e.g., the destination location), etc. The item may be moved in connection with a palletization process, a depalletization process, a singulation process, and/or a kitting process (e.g., an assembly of a set of items), etc.

Various embodiments provide a device that includes a mounting hardware configured to mount the device on or adjacent to an end effector of a robotic arm, a communication interface configured to receive a control signal, and an actuator configured to dispense a quantity of spacer material from a supply of spacer material in response to the control signal. In some embodiments, the device may be a dispenser of a spacer or spacer material. The robotic arm may be comprised in a robotic palletization system. In some embodiments, the robotic palletization system may determine that a spacer is to be placed in connection with palletization of one or more items, and generate the control signal to cause the actuator to dispense the quantity of spacer material. The end effector may be a gripper. The gripper may be a suction-based gripper, such as a pneumatic driven gripper.

According to various embodiments, one or more spacers or a spacer material is used in connection with palletization of one or more items. The quantity of spacer material that may be dispensed and/or used in connection with the palletization may be a predefined quantity. In some embodiments, a control signal provided to the device (e.g., a dispenser of the spacer/spacer material) may indicate the quantity of the spacer material to be dispensed/used as the spacer.

A robotic palletization system may determine to use a spacer or a quantity of spacer material in connection with palletizing one or more items in response to a determination that the use of the spacer or quantity of spacer material will improve result in an improved stack of items on the pallet (e.g., improve the stability of the stack of items). In some embodiments, the determination that the placing one or more spacers in connection with placing the set of N items on the pallet will result in an improved stack of items on the pallet is based at least in part on one or more of a packing density, a level top surface, and a stability. In some embodiments, the determination that the placing one or more spacers in connection with placing the set of N items on the pallet will result in an improved stack of items on the pallet is based at least in part on a determination that a packing density of the stack of items with the set of N items is higher than a packing density if the set of N items are placed on the pallet without the one or more spacers. In some embodiments, the determination that the placing one or more spacers in connection with placing the set of N items on the pallet will result in an improved stack of items on the pallet is based at least in part on a determination that a top surface is more level than a top surface if the set of N items are placed on the pallet without the one or more spacers. In some embodiments, the determination that the placing one or more spacers in connection with placing the set of N items on the pallet will result in an improved stack of items on the pallet is based at least in part on a determination that a stability of the stack of items with the set of N items is higher than a stability if the set of N items are placed on the pallet without the one or more spacers.

According to various embodiments, a spacer is placed on a pallet or a stack of items in connection with improving a stability of the stack of items on the pallet. As an example, the spacer may be placed in response to a determination that a stability of the stack of items is estimated (e.g., likely) to be improved if the spacer is used. As another example, the spacer may be placed in response to a determination that a stability of the stack of items is less than a threshold stability value, and/or that the stability of the stack of items is estimated to be less than a threshold stability value in connection with the placement of a set of items (e.g., a set of N items, N being an integer).

According to various embodiments, the stability of a stack of items may be determined based at least in part on a model of a stack of items and/or a simulation of placing a set of one or more items. A computer system may obtain (e.g., determine) a current model of a stack of items, and model (e.g., simulate) the placing of a set of item(s). In connection with modeling the stack of items, an expected stability of the stack of items may be determined. The modelling of the stack of items may include modelling the placement of a spacer in connection with the modelling of the placement of the set of item(s).

In some embodiments, the stability of the stack of items (or simulated stack of items) may be determined based at least in part on one or more attributes of a top surface of the stack of items (or simulated stack of items). For example, a measure of an extent to which the top surface is flat may be used in connection with determining the stability of the stack of items. The placing of a box on a flat surface may result in a stable placement and/or stack of items. As another example, a surface area of a flat region on the top surface may be used in connection with determining the stability or expected stability of the placement of an item on the stack of items. The larger a flat region on a top surface of the stack of items is relative to a bottom surface of an item being placed on the stack of items, the greater the likelihood the stability of the stack of items will satisfy (e.g., exceed) a threshold stability value.

According to various embodiments, a robotic palletization system generates a model of a pallet or a stack of one or more items on the pallet, and the spacer or spacer material is determined to be placed in connection with palletization of one or more items based at least in part on the model of the pallet or the stack of one or more items on the pallet. The robotic palletization system may generate a model of at least a top surface of a pallet or a stack of one or more items on the pallet, determine a set of N items to be placed next on the pallet (e.g., N being a positive integer), determine that placing one or more spacers in connection with placing the set of N items on the pallet will result in an improved stack of items on the pallet compared to a resulting stack of placing the set of N items without spacers, generate one or more control signals to cause the actuator to dispense the quantity of spacer material corresponding to the one or more spacers, and provide the one or more control signals to the actuator in connection with placing the set of N items on the pallet.

According to various embodiments, variation in items (e.g., types of items) among items to be palletized may complicate the palletization of the items in a stable manner (e.g., a manner according to which the stability of the stack of items satisfies a threshold stability value). In some embodiments, the system may only be able to forecast a certain number of items that are to be palletized. For example, the system may have a queue/buffer of N items to be palletized, where N is a positive integer. N may be a subset of a total number of items to be stacked on a pallet. For example, N may be relatively small in relation to the total number of items to be stacked on the pallet. Accordingly, the system may only be able to optimize the stacking of items using the next N known items. For example, the system may determine a plan to stack one or more items according to the current state of the stack of items (e.g., a current model) and one or more attributes associated with the next N items to be stacked. In some embodiments, the use of one or more spacers may provide flexibility in the manner in which the next N items are to be stacked and/or may improve the stability of the stack of items.

Various embodiments include palletization of a relatively large number of mixed boxes or items on a pallet. The various boxes and items to be palletized may have different attributes such as heights, shapes, sizes, rigidity, packaging type, etc. The variations across one or more attributes of the various boxes or items may cause the placement of the items on a pallet in a stable manner to be difficult. In some embodiments, the system may determine a destination location (e.g., a location at which an item is to be placed) for an item having a greater surface area (e.g., a larger bottom surface) than the boxes or other items beneath the item being placed. In some embodiments, items having different heights (e.g., different box heights) may be placed on relatively higher areas of the pallet (e.g., a height greater than a height threshold value equal to a maximum pallet height multiplied by 0.5, a height greater than a height threshold value equal to a maximum pallet height multiplied by ⅔, a height greater than a height threshold value equal to a maximum pallet height multiplied by 0.75, a height greater than a height threshold value equal to a maximum pallet height multiplied by another predefined value).

According to various embodiments, a spacer or a spacer material is rigid block. For example, spacer or a spacer material may be a rigid block of foam. In some embodiments, a spacer or a spacer material comprises polyurethane.

In some embodiments, the supply of spacer material comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material comprises one or more of a larger block of spacer material, a strip of spacer material, and a roll of spacer material. A device (e.g., device that dispenses the spacer material) or a robotic system may comprise a cutter that is configured to cut the quantity of spacer material from the supply of spacer material. In response to the control signal being provided to the actuator, the actuator may cause the cutter to cut the quantity of spacer material from the supply of spacer material.

In some embodiments, the supply of spacer material comprises a liquid precursor. In response to the control signal being provided to the actuator, the actuator causes the quantity of spacer material to be dispensed onto a surface of a pallet or a stack of items on the pallet. The dispensed precursor may harden after being dispensed onto the surface of the pallet or the stack of items on the pallet.

In some embodiments, the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc.

In various embodiments, a robotically controlled dispenser tooling or machine fills the void between and/or adjacent to boxes to prepare the surface area for the next box/layer being placed. In some embodiments, the system may use a robotic arm to pick/place predefined cut material and/or may dynamically trim the material to fit the need of the surface area of the next item being placed. In some embodiments, the robotically controlled dispenser, or robotic palletization system comprising the robotically controlled dispenser, comprises a device to trim to size a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The device may place the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The device may dispense a predetermined amount (e.g., a correct amount or an expected amount) of spacer material to correct or improve the surface area discrepancy between boxes or items on the layer (e.g., on the upper surface of the layer) to prepare the surface area for a next box or item.

According to various embodiments, an item is moved based at least in part on a cost function associated with moving the item from a source location to a destination location. The item may be moved in connection with a palletization process, a depalletization process, a singulation process, and/or a kitting process (e.g., an assembly of a set of items), etc. In some embodiments, one or more of a path/trajectory, source location, and/or destination location associated with picking and placing an item is selected based at least in part on a cost function corresponding to moving the item from a source location to a destination location. In some embodiments, an order in which a set of items are moved from corresponding source locations to destination locations is based at least in part on corresponding values for one or more cost functions associated with one or more items in the set of items. For example, an order in which the set of items are to be moved is selected based at least in part on a composite cost function of moving the set of items (e.g., an aggregated resulting value for moving the various items in the set of items). The order for moving the set of items may be optimized based at least in part on optimizing the composite cost function (e.g., such as reducing a total cost of moving the set of items).

Various embodiments improve the stability of a stack of items. The implementation of various embodiments may improve the stability of boxes on higher layers. The stability of the stack of items may be compromised as a set of mixed items are palletized as a result of non-uniform top surfaces of a layer of items, or non-uniform heights and/or rigidity of items. As items are stacked on a surface that does not provide full or adequate support of the item being stacked, the item may cause an instability in the overall stack of items. The use of a spacer, or spacer material, may improve stability by providing support for an item in a context where lower or adjacent items do not provide adequate support. Accordingly, the use of one or more spacers or spacer material in the context of palletizing a set of items may allow for a variety of mixed items to be palletized (e.g., a stack of the variety items may be stacked in a manner that a stability of the stack satisfies a threshold stability value). The use of one or more spacers or spacer material in the context of palletizing a set of items may also enable the system set of items to be palletized in a manner that a top surface of the stack of items is relatively flat, which may allow for the stack of items to be capped (e.g., a box with an open bottom may be placed over the stack of items such that the circumference of the stack of items and at least part of the top layer of items is encapsulated by the box). The capping of the stack of items may provide support for the stack of items.

FIG. 1A is a diagram illustrating an embodiment of a robotic system to palletize and/or depalletize heterogeneous items.

In the example shown, robotic system 100 includes a robotic arm 102. In this example the robotic arm 102 is stationary, but in various alternative embodiments robotic arm 102 may be a fully or partly mobile, e.g., mounted on a rail, fully mobile on a motorized chassis, etc. As shown, robotic arm 102 is used to pick arbitrary and/or dissimilar items (e.g., boxes, packages, etc.) from a conveyor (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1A may be used to push receptacle 106 into position to be loaded/unloaded and/or into a truck or other destination to be transported, etc.

In some embodiments, a plurality of receptacles 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. Robotic system 100 may determine an arrangement (e.g., a stacking of items) on the plurality of pallets (e.g., how the plurality of items for an order are to be divided among the plurality of pallets, how the items on any one pallet are to be stacked, etc.). Robotic system 100 may store one or more items (e.g., item(s) for an order) in a buffer or staging area while one or more other items are stacked on a pallet. As an example, the one or more items may be stored in the buffer or staging area until such time that robotic system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack would be expected to satisfy (e.g., exceeds) a threshold fit or threshold stability, and/or in connection with determining the threshold fit or threshold stability (e.g., the thresholds against which a simulation or model are measured to assess whether to place the item on the stack).

In the example shown, robotic arm 102 is equipped with a suction-type end effector (e.g., end effector 108). End effector 108 has a plurality of suction cups 110. Robotic arm 102 is used to position the suction cups 110 of end effector 108 over an item to be picked up, as shown, and a vacuum source provides suction to grasp the item, lift the item from conveyor 104, and place the item at a destination location on receptacle 106. Various types of end effectors may be implemented.

In various embodiments, one or more of 3D or other camera 112 mounted on end effector 108 and cameras 114, 116 mounted in a space in which robotic system 100 is deployed are used to generate image data used to identify items on conveyor 104 and/or determine a plan to grasp, pick/place, and stack the items on receptacle 106 (or place the item in the buffer or staging area, as applicable). In various embodiments, additional sensors not shown, e.g., weight or force sensors embodied in and/or adjacent to conveyor 104 and/or robotic arm 102, force sensors in the x-y plane and/or z-direction (vertical direction) of suction cups 110, etc. may be used to identify, determine attributes of, grasp, pick up, move through a determined trajectory, and/or place in a destination location on or in receptacle 106 items on conveyor 104 and/or other sources and/or staging areas in which items may be located and/or relocated, e.g., by robotic system 100.

In the example shown, cameras 112 is mounted on the side of the body of end effector 108, but in some embodiments cameras 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

In the example shown, robotic system 100 comprises a dispenser device 126 that is configured to dispense a quantity of spacer material 128 from a supply of spacer material in response to the control signal. Dispenser device 126 may be disposed on robotic arm 102, or within proximity of the workspace (e.g., within a threshold distance of the workspace). For example, dispenser device 126 may be disclosed within the workspace of robotic arm 102 such that dispenser device 126 dispenses spacer material on or around receptacle 106 (e.g., pallet), or within a predetermined distance of end effector 108 of robotic arm 102. In some embodiments, dispenser device 126 comprises a mounting hardware configured to mount dispenser device 126 on or adjacent to an end effector 108 of robotic arm 102. The mounting hardware is at least one of a bracket, a strap, and one or more fasteners, etc. As an example, dispenser device 126 may comprise a biasing device/mechanism that biases supply material within dispenser device 126 to be ejected dispensed from dispenser device 126. Dispenser device 126 may include a gating structure that is used to control the dispensing of spacer material 128 (e.g., to prevent spacer material 128 to be dispensed without actuation of the gating structure, and to permit dispensing of the spacer material 128 to be dispensed in response to actuation).

Dispenser device 126 may comprise a communication interface configured to receive a control signal. For example, dispenser device 126 may be in communication with one or more terminals such as control computer 118. Dispenser device 126 may communicate with the one or more terminals via one or more wired connections and/or one or more wireless connections. In some embodiments, dispenser device 126 communicates information to the one or more terminals. For example, dispenser device 126 may send to control computer 118 an indication of a status of dispenser device 126 (e.g., an indication of whether dispenser device 126 is operating normally), an indication of a type of spacer material comprised in dispenser device 126, an indication of a supply level of the spacer material in dispenser device 126 (e.g., an indication of whether the dispenser device is full, empty, half full, etc.). Control computer 118 may be used in connection with controlling dispenser device 126 to dispense a quantity of spacer material. For example, control computer 118 may determine that a spacer is to be used in connection with palletizing one or more items, such as to improve a stability of expected stability of the stack of items on/in receptacle 106. Control computer 118 may determine the quantity of spacer material (e.g., a number of spacers, an amount of spacer material, etc.) to use in connection with palletizing the one or more items. For example, the quantity of spacer material to use in connection with palletizing the one or more items may be determined based at least in part on determining a plan for palletizing the one or more items.

In some embodiments, dispenser device 126 comprises an actuator configured to dispense a quantity of spacer material from a supply of spacer material 128 in response to the control signal. In response to determining that a spacer/spacer material is to be used in connection with palletizing one or more items, control computer 118 may generate the control signal to cause the actuator to dispense the quantity of spacer material. The control signal may comprise an indication of the quantity of spacer material 128 to be used as the spacer.

According to various embodiments, a spacer or a spacer material 128 is rigid block. For example, spacer or a spacer material may be a rigid block of foam. In some embodiments, a spacer or a spacer material comprises polyurethane.

In some embodiments, the supply of spacer material 128 comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material 128 comprises one or more of a larger block of spacer material, a strip of spacer material, and a roll of spacer material. Dispenser device 126 or a robotic system 100 may comprises a cutter that is configured to cut the quantity of spacer material from the supply of spacer material 128. In response to the control signal being provided to the actuator, the actuator may cause the cutter to cut the quantity of spacer material 128 from the supply of spacer material 128.

In some embodiments, the supply of spacer material 128 comprises a liquid precursor. In response to the control signal being provided to the actuator, the actuator causes the quantity of spacer material 128 to be dispensed onto a surface of a pallet or a stack of items on the pallet. The dispensed precursor may harden after being dispensed onto the surface of the pallet or the stack of items on the pallet.

In some embodiments the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. In some embodiments, the extruded material is filled with a gel.

In various embodiments, a robotically controlled dispenser tooling or machine fills the void between and/or adjacent to boxes to prepare the surface area for the next box/layer being placed. In some embodiments, robotic system 100 may use a robotic arm 102 to pick/place predefined cut material and/or may dynamically trim the spacer material 128 to fit the need of the surface area of the next item being placed. In some embodiments, the robotically controlled dispenser device 126, or robotic palletization system comprising the robotically controlled dispenser, comprises a device to trim to size a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The dispenser device 126 may place (e.g., eject, dispense, etc.) the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The dispenser device 126 may dispense a predetermined amount (e.g., a correct amount or an expected amount) of spacer material 128 to correct or improve the surface area discrepancy between boxes or items on the layer (e.g., on the upper surface of the layer) to prepare the surface area for a next box or item.

Referring further to FIG. 1, in the example shown robotic system 100 includes a control computer 118 configured to communicate, in this example via wireless communication (but in one or both of wired and wireless communication in various embodiments) with elements such as robotic arm 102, conveyor 104, end effector 108, and sensors, such as camera 112, 114, and 116 and/or weight, force, and/or other sensors not shown in FIG. 1. In various embodiments, control computer 118 is configured to use input from sensors, such as camera 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model are used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of robotic system 100 may be provided by control computer 118 and/or teleoperation device 122. The user interface may provide a current status of robotic system 100, including information pertaining to a current state of the pallet (or stack of items associated therewith), a current order or manifest being palletized or de-palletized, a performance of robotic system 100 (e.g., a number of items palletized/de-palletized by time), etc. A user may select one or more elements on the user interface, or otherwise provide an input to the user interface, to activate or pause robotic system 100 and/or a particular robotic arm in robotic system 100.

According to various embodiments, robotic system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which robotic system 100 generates a model of the state of the pallet. The model may be generated based at least in part on input from (e.g., information obtained from) one or more sensors in robotic system 100 such as one or more sensors or sensor arrays within workspace of robotic arm 102. The model may be generated based at least in part on a geometry of the stack, a vision response (e.g., information obtained by one or more sensors in the workspace), and the machine learning processes, etc. Robotic system 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, robotic system 100 may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. Robotic system 100 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. Robotic system 100 may select a destination location for which the expected fit and/or expected stability satisfies (e.g., exceeds) a corresponding threshold value. Additionally, or alternatively, robotic system 100 may select a destination location that optimizes the expected fit (e.g., of the item on the stack) and/or expected stability (e.g., of the stack).

Conversely, in the context of de-palletizing one or more items from a pallet (e.g., a stack on the pallet), robotic system 100 (e.g., control computer 118) may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, control computer 118 may use the model to determine whether removal of an item is expected to cause stability of the state of the pallet (e.g., the stack) to drop below a threshold stability. Robotic system 100 (e.g., control computer 118) may simulate removal of one or more items from the pallet and select an order from removing items from the pallet that optimizes the stability of the state of the pallet (e.g., the stack). Robotic system 100 may use the model to determine a next item to remove from the pallet. For example, control computer 118 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, robotic system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). Robotic system 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. Robotic system 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, robotic system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. Robotic system 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

According to various embodiments, robotic system 100 may determine to use a spacer or a quantity of spacer material 128 in connection with palletizing one or more items in response to a determination that the use of the spacer or quantity of spacer material 128 will improve result in an improved stack of items on the pallet (e.g., improve the stability of the stack of items). In some embodiments, the determination that the placing one or more spacers in connection with placing the set of N items on the pallet will result in an improved stack of items on the pallet is based at least in part on one or more of a packing density, a level top surface, and a stability. In some embodiments, the determination that the placing one or more spacers in connection with placing the set of N items on the pallet will result in an improved stack of items on the pallet is based at least in part on a determination that a packing density of the stack of items with the set of N items is higher than a packing density if the set of N items are placed on the pallet without the one or more spacers. In some embodiments, the determination that the placing one or more spacers in connection with placing the set of N items on the pallet will result in an improved stack of items on the pallet is based at least in part on a determination that a top surface is more level than a top surface if the set of N items are placed on the pallet without the one or more spacers. In some embodiments, the determination that the placing one or more spacers in connection with placing the set of N items on the pallet will result in an improved stack of items on the pallet is based at least in part on a determination that a stability of the stack of items with the set of N items is higher than a stability if the set of N items are placed on the pallet without the one or more spacers. N may be a positive integer (e.g., a positive integer less than a total number of items that are to be palletized in the complete pallet).

As an example, because N may be less than a total number of items that are to be palletized, robotic system 100 may be limited in its optimization of the stack of items (e.g., robotic system may only plan the placement of N items at a time). Accordingly, the use of one or more spacers increases number of degrees of freedom associated with placing the N items. Robotic system 100 may use one or more spacers to optimize the stacking of the N items (or to achieve a "good enough" stack with the N items such as a stack that satisfies a minimum stability threshold). Robotic system 100 may use a cost function in connection with determining whether to use one or more spacers, a number of spacers to use, a placement of the spacers, etc. For example, the cost function may include one or more of a stability value, a time to place the one or more items, a packing density of the stack of items, a flatness value or degree of variability of the top of the upper surface of the stack of items, and a cost of supply material, etc.

According to various embodiments, control computer 118 controls robotic system 100 to place a spacer on a receptacle 106 (e.g., a pallet) or a stack of items in connection with improving a stability of the stack of items on the receptacle 106. As an example, the spacer may be placed in response to a determination that a stability of the stack of items is estimated (e.g., likely such as a probability that exceeds a predefined likelihood threshold value) to be improved if the spacer is used. As another example, control computer 118 may control robotic system to use the spacer in response to a determination that a stability of the stack of items is less than a threshold stability value, and/or that the stability of the stack of items is estimated to be less than a threshold stability value in connection with the placement of a set of items (e.g., a set of N items, N being an integer).

According to various embodiments, control computer 118 may determine the stability of a stack of items based at least in part on a model of a stack of items and/or a simulation of placing a set of one or more items. A computer system may obtain (e.g., determine) a current model of a stack of items, and model (e.g., simulate) the placing of a set of item(s). In connection with modeling the stack of items, an expected stability of the stack of items may be determined. The modelling of the stack of items may include modelling the placement of a spacer in connection with the modelling of the placement of the set of item(s).

In some embodiments, control computer 118 may determine the stability of the stack of items (or simulated stack of items) based at least in part on one or more attributes of a top surface of the stack of items (or simulated stack of items) and/or spacers. For example, a measure of an extent to which the top surface is flat may be used in connection with determining the stability of the stack of items. The placing of a box on a flat surface may result in a stable placement and/or stack of items. As another example, a surface area of a flat region on the top surface may be used in connection with determining the stability or expected stability of the placement of an item on the stack of items. The larger a flat region on a top surface of the stack of items is relative to a bottom surface of an item being placed on the stack of items, the greater the likelihood the stability of the stack of items will satisfy (e.g., exceed) a threshold stability value.

According to various embodiments, robotic system 100 generates a model of a pallet or a stack of one or more items on the pallet, and the spacer or spacer material is determined to be placed in connection with palletization of one or more items based at least in part on the model of the pallet or the stack of one or more items on the pallet. Robotic system 100 may generate a model of at least a top surface of a pallet or a stack of one or more items on the pallet, determine a set of N items to be placed next on the pallet (e.g., N being a positive integer), determine that placing one or more spacers in connection with placing the set of N items on the pallet will result in an improved stack of items on the pallet compared to a resulting stack of placing the set of N items without spacers, generate one or more control signals to cause the actuator to dispense the quantity of spacer material corresponding to the one or more spacers, and provide the one or more control signals to the actuator in connection with placing the set of N items on the pallet.

According to various embodiments, variation in items (e.g., types of items) among items to be palletized may complicate the palletization of the items in a stable manner (e.g., a manner according to which the stability of the stack of items satisfies a threshold stability value). In some embodiments, control computer 118 may only be able to forecast a certain number of items that are to be palletized. For example, the system may have a queue/buffer of N items to be palletized, where N is a positive integer. N may be a subset of a total number of items to be stacked on a pallet. For example, N may be relatively small in relation to the total number of items to be stacked on the pallet. Accordingly, robotic system 100 may only be able to optimize the stacking of items using the next N known items. For example, robotic system 100 may determine a plan to stack one or more items according to the current state of the stack of items (e.g., a current model) and one or more attributes associated with the next N items to be stacked. In some embodiments, the use of one or more spacers may provide flexibility in the manner in which the next N items are to be stacked and/or may improve the stability of the stack of items.

Various embodiments include palletization of a relatively large number of mixed boxes or items on a pallet. The various boxes and items to be palletized may have different attributes such as heights, shapes, sizes, rigidity, packaging type, etc. The variations across one or more attributes of the various boxes or items may cause the placement of the items on a pallet in a stable manner to be difficult. In some embodiments, robotic system 100 (e.g., control computer 118) may determine a destination location (e.g., a location at which an item is to be placed) for an item having a greater surface area (e.g., a larger bottom surface) than the boxes or other items beneath the item being placed. In some embodiments, items having different heights (e.g., different box heights) may be placed on relatively higher areas of the pallet (e.g., a height greater than a height threshold value equal to a maximum pallet height multiplied by 0.5, a height greater than a height threshold value equal to a maximum pallet height multiplied by ⅔, a height greater than a height threshold value equal to a maximum pallet height multiplied by 0.75, a height greater than a height threshold value equal to a maximum pallet height multiplied by another predefined value).

According to various embodiments, a machine learning process is implemented in connection with improving spacer material dispensing/usage strategies (e.g., strategies for using spacer material in connection with palletizing one or more items). Robotic system 100 may obtain attribute information pertaining to one or more items to be palletized/de-palletized, attribute information pertaining to one or more spacers to be used in connection with palletizing/de-palletizing the one or more items. The attribute information may comprise one or more of an orientation of the item, a material (e.g., a spacer material type), a size, a weight (or expected weight), or a center of gravity, a rigidity, a dimension, etc. Robotic system 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, robotic system 100 may use the information pertaining to the item (e.g., the attribute information, destination location, etc.) to determine a strategy for palletizing the item (e.g., picking and/or placing the item). The palletizing strategy may include an indication of a picking location (e.g., a location on the item at which the robotic arm 102 is to engage the item such as via the end effector) and a destination location (e.g., a location on the pallet/receptacle 106 or stack of items). The palletizing strategy may include a force to be applied to pick the item and/or a holding force by which the robotic arm 102 is to grasp the item while moving the item from a source location to the destination location, a trajectory along which the robotic arm is to move the item to the destination location, an indication of a quantity, if any, of spacer material that is to be used in connection with placing the item at the destination location, and a plan for placing the spacer material. Robotic system 100 may use machine learning processes to improve the palletizing strategies based at least in part on an association between information pertaining to the item (e.g., the attribute information, destination location, etc.), and one or more of (i) performance of picking and/or placing the item (e.g., historical information associated with past iterations of picking and placing the item or similar items such as items sharing one or more similar attributes), (ii) performance of a stability of the stack of items after the item is placed at the destination location such as relative to an expected stability generated using a model of the stack of items (e.g., historical information associated with past iterations of palletizing the item or similar items such as items sharing one or more similar attributes), and (iii) performance of a stability of the stack of items after the item and/or spacer material is placed at the destination location such as relative to an expected stability generated using a model of the stack of items (e.g., historical information associated with past iterations of palletizing the item or similar items and/or spacers such as items/spacers sharing one or more similar attributes). In some embodiments, robotic system 100 may use machine learning processes to improve the use of one or more spacers in connection with palletizing strategies based at least in part on an association between information pertaining to the spacers and/or one or more items that are palletized (e.g., the attribute information, destination location, etc.), and a stability performance of palletizing a set of items using one or more spacers relative to an expected stability of the palletizing the set of items using the one or more spacers (e.g., the expected stability based on a simulation of the palletizing of the items using a model of the stack of items).

FIG. 1B is a diagram illustrating an embodiment of a robotic system including a device to dispense a spacer.

Referring to FIG. 1B, an example of robotic arm 102 is provided (e.g., robotic arm 102 of robotic system 100 of FIG. 1A). In the example shown, the robotic system includes dispenser device 126a. Dispenser device 126a is configured to dispense a quantity of spacer material 128 (e.g., from a supply of spacer material 136) in response to the control signal. In some embodiments, dispenser device 126a includes a communication interface 130a that is configured to receive a control signal (e.g., a signal used in connection with actuating an actuator or to dispense the spacer material 128). For example, the communication interface 130a receives the control signal from a control system such as control computer 118 of robotic system 100. In some embodiments, dispenser device 126a includes an actuator that is configured to dispense a quantity of spacer material 128 from a supply of spacer material 136 in response to the control signal. As an example, the actuator includes an actuator module 132a and one or more pusher plates 134a and/or 134b (or such other similar device or module to dispense the spacer material 128 from dispenser device 126a). In response to actuator module 132a receiving a control signal (e.g., the signal corresponding to an instruction to dispense/eject the spacer material 128), actuator module 132a actuates pusher plates 134a and/or 134b to dispense the spacer material 128. For example, actuation of the pusher plates 134a and/or 134b causes the pusher plates 134a and/or 134b to apply force on dispenser material (e.g., spacer material 128), or the supply of supply of spacer material 136 comprised in dispenser device 126a, to cause dispenser material (e.g., spacer material 128) to be ejected or dispensed from dispenser device 126a. The dispenser material (e.g., spacer material 128) can be preforms such as blocks of a particular size. In some embodiments, dispenser device 126a is comprised in (or integrated with) robotic arm 102. In some embodiments, dispenser device 126a is comprised in (or integrated with) robotic system such as disposed within proximity of robotic arm 102. Dispenser device 126a can include mounting hardware configured to mount the dispenser device 126a on or adjacent to an end effector of a robotic arm 102. In the example shown, the mounting hardware includes one or more of a mounting arm 138a and/or a mounting plate 138b. Various other mounting hardware can be implemented (e.g., a bracket, a strap, and one or more fasteners, etc.).

Figure 1C:
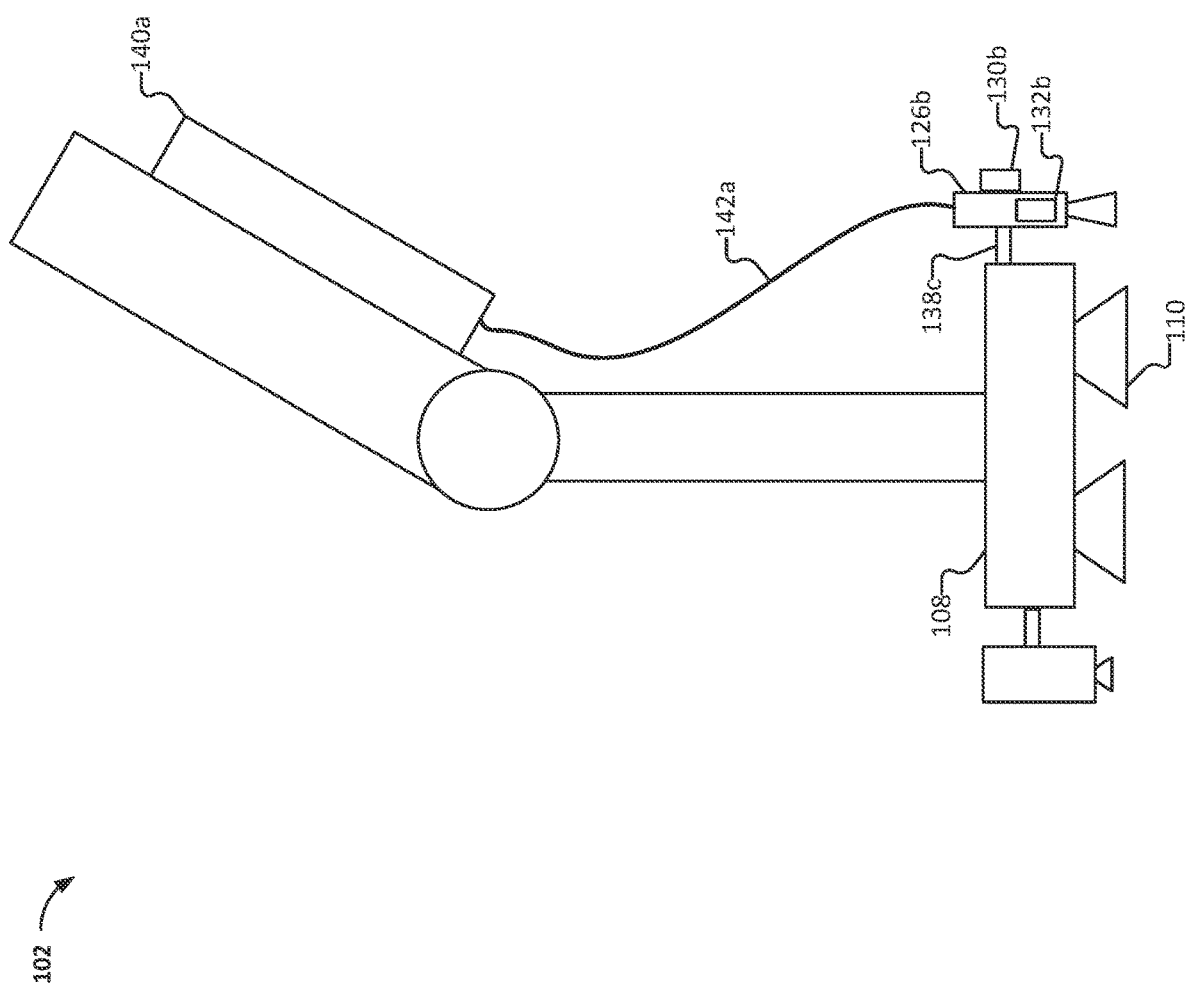
FIG. 1C is a diagram illustrating an embodiment of a robotic system including a device to dispense a spacer.

FIG. 1C is a diagram illustrating an embodiment of a robotic system including a device to dispense a spacer.

Referring to FIG. 1C, an example of robotic arm 102 is provided (e.g., robotic arm 102 of robotic system 100 of FIG. 1A). In the example shown, the robotic system includes dispenser device 126b. Dispenser device 126b is configured to dispense a quantity of spacer material (e.g., from a supply of spacer material) in response to the control signal. In some embodiments, the spacer material is a fluid or gel. For example, the spacer material can be in a fluid or gel form, and the spacer material can harden to become a relatively more rigid spacer in response to dispensing. The spacer material (e.g., the fluid or gel) can be stored in a tank 140a such as a tank that stores the supply of spacer material (or other similar volume that holds the supply of spacer material). The dispenser device 126b includes or is connected to a hose 142a (or other such channel) that conveys spacer material from the supply of spacer material in tank 140a to a nozzle for dispensing.

In some embodiments, dispenser device 126b includes a communication interface 130b that is configured to receive a control signal (e.g., a signal used in connection with actuating an actuator or to dispense the spacer material and/or to cause spacer material to convey from the supply of spacer material such as in tank 140a to a nozzle or exit of dispenser device 126b). For example, the communication interface 130b receives the control signal from a control system such as control computer 118 of robotic system 100. In some embodiments, dispenser device 126b includes an actuator module 132b that is configured to dispense a quantity of spacer material from a supply of spacer material in response to the control signal. In response to actuator module 132b receiving a control signal (e.g., the signal corresponding to an instruction to dispense/eject the spacer material), actuator module 132b causes dispenser material to flow from tank 140a and to be dispensed or ejected from dispenser device 126b such as via a nozzle. As an example, actuator module 132 actuates (e.g., opens/closes) one or more valves to cause the spacer material to flow from tank 140a and/or to be dispensed from dispenser device 126b. In some embodiments, dispenser device 126b is comprised in (or integrated with) robotic arm 102. In some embodiments, dispenser device 126b is comprised in (or integrated with) robotic system such as disposed within proximity of robotic arm 102 (e.g., an end effector 108 of robotic arm 102). Dispenser device 126b can include mounting hardware configured to mount the dispenser device 126b on or adjacent to an end effector of a robotic arm 102. In the example shown, the mounting hardware includes one or more of a mounting arm 138c. Various other mounting hardware can be implemented (e.g., a bracket, a strap, and one or more fasteners, etc.).

Figure 1D:
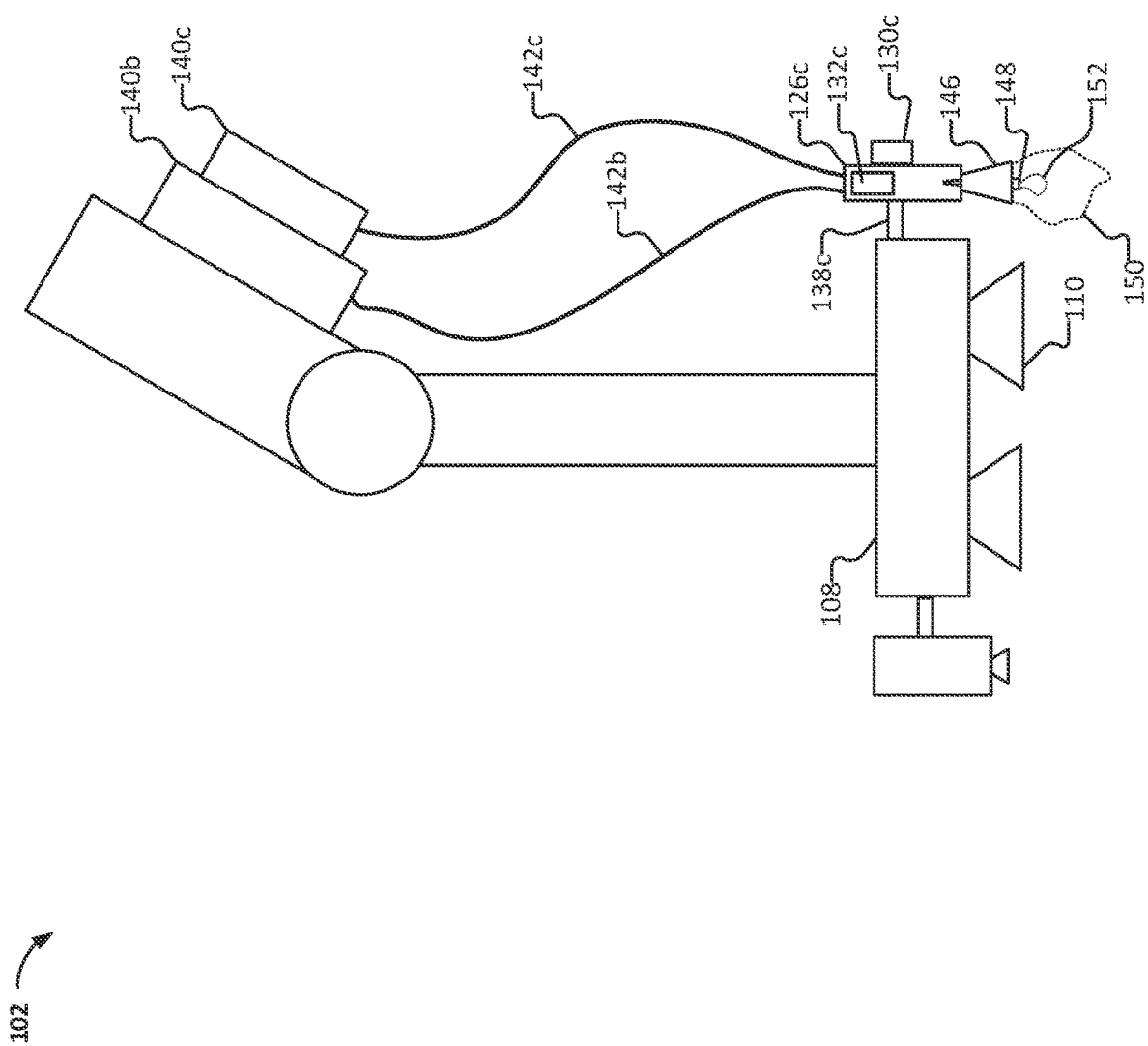
FIG. 1D is a diagram illustrating an embodiment of a robotic system including a device to dispense a spacer.

FIG. 1D is a diagram illustrating an embodiment of a robotic system including a device to dispense a spacer.

Referring to FIG. 1D, an example of robotic arm 102 is provided (e.g., robotic arm 102 of robotic system 100 of FIG. 1A). In the example shown, the robotic system includes dispenser device 126c. Dispenser device 126c is configured to dispense a quantity of spacer material (e.g., from a supply of spacer material) in response to the control signal. In some embodiments, the spacer material includes a fluid or gel 152 that is dispensed into a polybag or other extruded material 150 (e.g., a polymeric material, etc.). For example, a spacer includes polybag or other extruded material 150 filled (e.g., to a determined/predetermined volume, shape, or rigidity, etc.) with spacer material such as a fluid or gel 152. In response to a determination that the polybag or other extruded material 150 has filled to a threshold level (e.g., a predetermined volume, shape, rigidity, etc.), dispenser device 126b can seal the polybag or other extruded material 150. The polybag or other extruded material 150 can be stored in a tank 140b such as a tank (or other similar volume that holds the supply of spacer material). The spacer material such as a fluid or gel 152 can be stored in a tank 140c such as a tank that stores the supply of spacer material (or other similar volume that holds the supply of spacer material). The dispenser device 126b includes or is connected to one or more hoses 142b and/or 142c (or other such channel) that conveys the polybag or other extruded material 150 and the spacer material from the supply of spacer material in tank 140b and/or tank 140c to one or more nozzles for dispensing. As an example, a first nozzle 146 is configured to dispense the polybag or other extruded material 150, and a second nozzle 148 is configured to dispense the spacer material such as a fluid or gel 152. In some embodiments, the polybag or other extruded material 150 and the fluid or gel 152 is co-dispensed from dispenser device 126c.

In some embodiments, dispenser device 126c includes a communication interface 130c that is configured to receive a control signal (e.g., a signal used in connection with actuating an actuator or to dispense the polybag or other extruded material 150 and the fluid or gel 152 and/or to cause the polybag or extruded material 150 and the fluid or gel 152 to convey from tanks 140b and/or 140c to one or more nozzles or exits of dispenser device 126c). For example, the communication interface 130c receives the control signal from a control system such as control computer 118 of robotic system 100. In some embodiments, dispenser device 126c includes an actuator 132c that is configured to dispense a quantity of spacer (e.g., a quantity of the polybag or other extruded material 150 and the fluid or gel 152 and/or to cause extruded material 150 and the fluid or gel 152 from tanks 140b and/or 140c) in response to the control signal. In response to actuator 132c receiving a control signal (e.g., the signal corresponding to an instruction to dispense/eject the spacer), actuator module 132b causes spacer material to flow from tank 140a and to be dispensed or ejected from dispenser device 126b such as via one or more nozzles (e.g., a first nozzle 146 and/or a second nozzle 148). As an example, actuator module 132 actuates (e.g., opens/closes) one or more valves to cause the polybag or other extruded material 150 and the fluid or gel 152 to flow from tank 140b and/or 140c, and/or to be dispensed from dispenser device 126c. In some embodiments, dispenser device 126c is comprised in (or integrated with) robotic arm 102. In some embodiments, dispenser device 126c is comprised in (or integrated with) robotic system such as disposed within proximity of robotic arm 102 (e.g., an end effector 108 of robotic arm 102). Dispenser device 126c can include mounting hardware configured to mount the dispenser device 126c on or adjacent to an end effector of a robotic arm 102. In the example shown, the mounting hardware includes one or more of a mounting arm 138c. Various other mounting hardware can be implemented (e.g., a bracket, a strap, and one or more fasteners, etc.).

Figure 2:
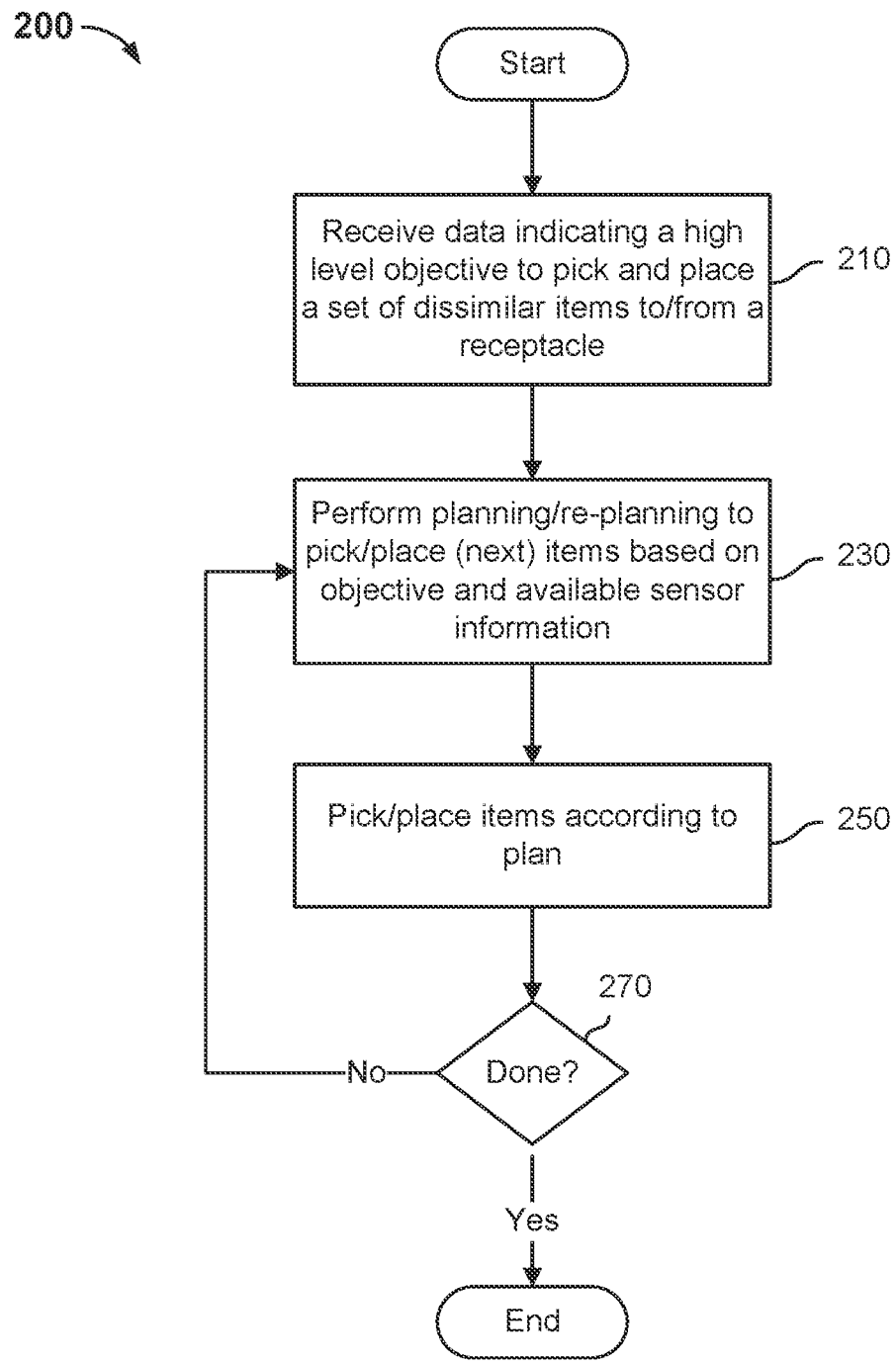
FIG. 2 is a flow chart illustrating an embodiment of a process to palletize and/or depalletize an item.

FIG. 2 is a flow chart illustrating an embodiment of a process to palletize and/or depalletize an item.

Referring to FIG. 2, process 200 may be implemented by robotic system 100 of FIG. 1. For example, process 200 may be implemented by control computer 118.

At 210, a list of items is obtained. The list of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least of the items is associated with a particular robotic arm, a predefined zone corresponding to the particular robotic arm, and/or a particular pallet (e.g., a pallet identifier, a pallet located into a predefined zone), etc.

At 230, planning (or re-planning) is performed to generate a plan to pick/place items based on the list of items and available sensor information. The plan may include a one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

In some embodiments, the plan to pick and place an item may include a plan to use one or more spacers in connection with placement of the item. For example, the plan may include a plan/strategy for placing one or more spacers before or after the placement of the item. The plan/strategy for placing the one or more spacers may be determined based at least in part a model of the stack of items on the pallet (e.g., a current model of the stack of items). The robotic system may simulate the placing the item (e.g., at different locations on the pallet/stack of items, and/or with varying numbers of spacers or locations of such spacers).

The order in which the items are placed on the conveyor may be at least loosely based on the items and an expected stack of the items on one or more pallets. For example, the system determining the order in which to place the items on the conveyor may generate a model of an expected stack(s) of the items, and determine the order based on the model (e.g., so as to first deliver items that form the base/bottom of the stack and progressively deliver items higher up the stack). In the case that the items on the list of items is to be palletized on a plurality of pallets, items that are expected to form the base/bottom of the respective stacks (or otherwise be relatively near the bottom of the stacks) may be placed on the conveyor before items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built.

In some embodiments, the order and/or manner by which a set of items are moved (e.g., palletized and/or depalletized) is based at least in part on a cost associated with moving the set of items or a cost associated with moving at least one of the set of items. The system may determine the order and/or manner by which at least one of the set of items is to be moved based on a minimization/optimization of the cost of moving the set of items or the at least one of the set of items. The minimization/optimization of the cost may be determining a minimal/optimal cost associated with moving the item/set of items subject to one or more conditions (e.g., restricted airspace, stability threshold, time to move the items, etc.). In some embodiments, the minimization/optimization of the cost of moving the item/set of items includes determining an order and/or manner by which to move the item(s) such that a cost satisfies one or more cost value thresholds. The order by which a set of items are moved may be determined based on an aggregate cost of moving the items in the set of items (or a subset of the items in the set of items). The determining the manner by which an item is to be moved may include determining the plan or strategy for picking and placing the item, such as a determination of a path or trajectory along which the item is to be moved. The manner by which the item is to be moved may be based at least in part on a cost of moving the item. For example, a manner by which to move the item may be determined based at least in part on one or more cost value thresholds, or based at least in part on selecting a manner that minimizes/optimizes the moving of the item. The system may determine a set of different manners by which the item may be moved (e.g., different paths/trajectories, different destination locations on the pallet/stack, different number of spacers, different locations at which a number of spacers is placed, expected stability resulting from the moving the item according to the different manners, etc.), and a best one of the set of different manners may be selected. In some embodiments, a cost threshold used in connection with moving an item includes a stability of the stack of items (e.g., an expected stability) in response to placing the item at a destination location. The best one of the set of different manners may be selected based on a cost function. For example, the cost function in connection with determining a best one of the set of different manners may be based at least in part on an expected stability of the stack of items. Other variables may be included in the cost function such as a time to complete the moving the item, a possibility of collision or expected collisions with other objects in the workspace, etc. In some embodiments, a good enough of the best one of the set of different manners of moving the item may be selected is used/determined. For example, the good enough of the best one of the set of different manners may be manner of moving the item in which one or more thresholds are satisfied (e.g., a cost of moving the item is less than a maximum cost threshold, a minimum stability threshold is exceeded, etc.).

The system may generate a model of one or more expected stacks for the items belonging to the list of items. The model may be generated based at least in part on one or more thresholds such as a fit threshold value or stability threshold value, other packing metric (e.g., density), etc. For example, the system can generate a model of a stack for which an expected stability value satisfies (e.g., exceeds) the stability threshold value. The model and/or simulation of the stacking items may include a determination of whether a use of one or more spacers would improve the fit value, or stability value, other packing metric, and if so, a number of spacers and location at which the spacers are to be placed. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) in connection with palletizing the items on the list of items is generated based at least in part on one or more attributes of the items. In some embodiments, the model of the stack(s) in connection with palletizing N items on the list of items (e.g., a set of N items for which the system has knowledge are to be palletized) is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

At 250, items are picked and moved through a (predetermined/planned) trajectory to a location near where the item is to be placed on the corresponding conveyor, and placed at the destination location according to the plan determined and/or updated at 230.

In the example shown, (re-)planning and plan implementation (230, 250) continue until the high-level objective of providing the items on the list of items is completed (270), at which the process 200 ends. In various embodiments, re-planning (230) may be triggered by conditions such as arrival of an items that is not expected and/or cannot be identified, a sensor reading indicating an attribute has a value other than what was expected based on item identification and/or associated item model information, a stability of the stack of items is determined to be less than a minimum stability threshold value, an indication that a supply of spacer material in the dispenser device (or within the workspace) is less than a minimum spacer supply value, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 3:
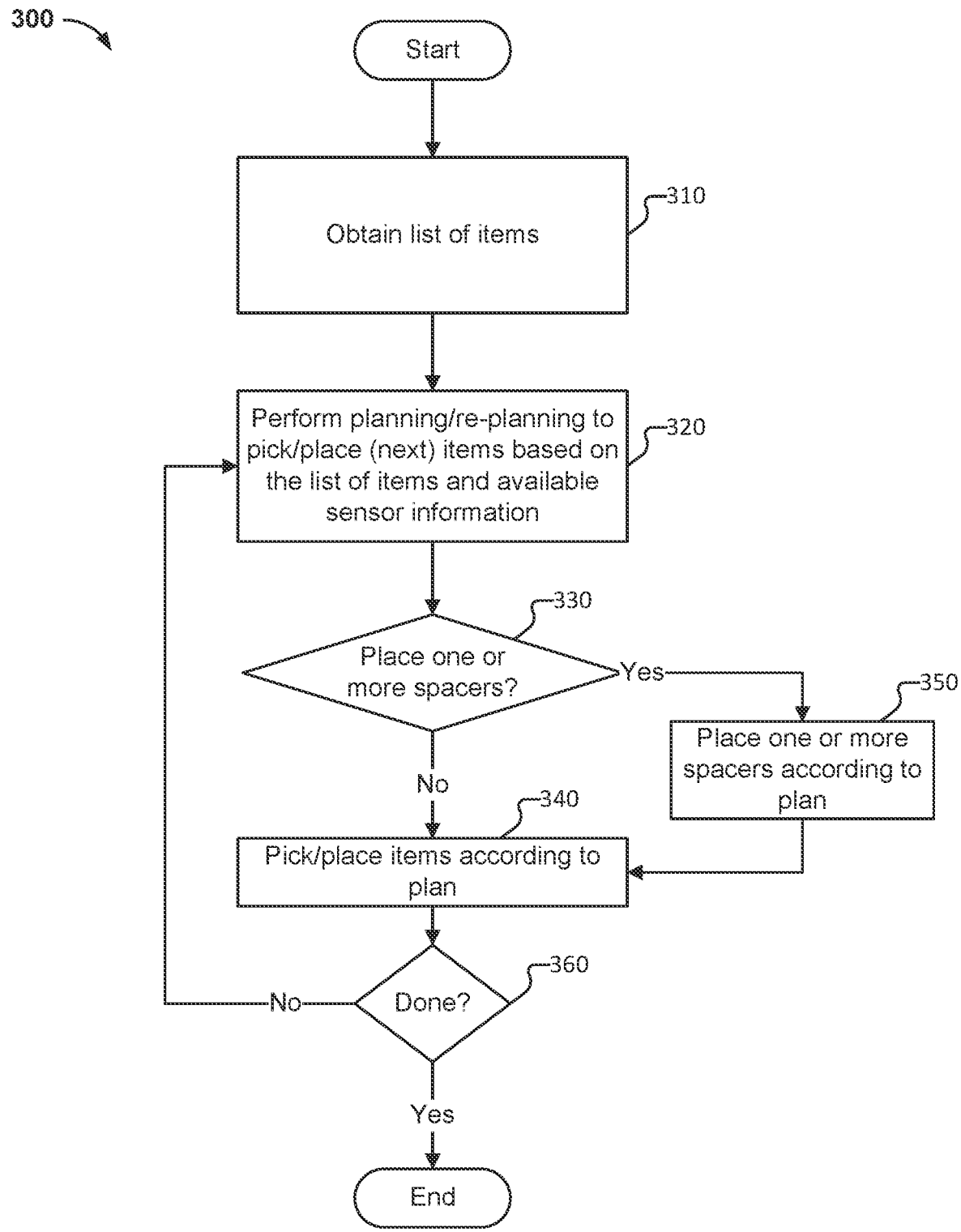
FIG. 3 is a flow chart illustrating an embodiment of a process to select and provide items for palletization.

FIG. 3 is a flow chart illustrating an embodiment of a process to select and provide items for palletization.

Referring to FIG. 3, process 300 may be implemented by robotic system 100 of FIG. 1. For example, process 300 may be implemented by control computer 118. Process 300 may be performed in connection with process 200 of FIG. 2, and/or system 400 of FIG. 4.

At 310, a list of items is obtained. The list of items may correspond to a set of items that are to be collectively palletized on one or more pallets. According to various embodiments, a set of items to be palletized is determined based at least in part on an indication that a manifest or order is to be fulfilled. As an example, the items may be boxes. The items may be boxes comprising different attributes such as one or more of size, shape, rigidity, label, type of packing, center of gravity, etc.

At 320, planning (or re-planning) is performed to generate a plan to pick/place items based on the list of items and available sensor information. The plan may include a one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

In some embodiments, the plan to pick and place an item may include a plan to use one or more spacers in connection with placement of the item. For example, the plan may include a plan/strategy for placing one or more spacers before or after the placement of the item. The plan/strategy for placing the one or more spacers may be determined based at least in part a model of the stack of items on the pallet (e.g., a current model of the stack of items). The robotic system may simulate the placing the item (e.g., at different locations on the pallet/stack of items, and/or with varying numbers of spacers or locations of such spacers).

According to various embodiments, the robotic system may determine to use a quantity of spacers or spacer material. In some embodiments, a spacer may be a pre-cut shape and/or size. In some embodiments, a supply of spacer material may comprise an aggregate amount of spacer material such as a roll of spacer material or a larger block, from which the quantity of spacer material to be used is cut or otherwise removed. The quantity or amount of spacer material to use in connection with palletizing one or more items may be determined based at least in part on a stability of the stack of items and/or an expected stability such as based on a simulation of the placing of an item. The quantity or amount of spacer material may be determined based at least in part on one or more of (i) a stability (or expected stability) of a stack of items, (ii) a variation (or expected variation) in a flatness or height of the top surface of a layer in the stack of items, (iii) a rigidity (or expected rigidity) in a top surface of a layer in the stack of items (e.g., a rigidity of items forming the top layer), (iv) a packing density (or expected density) of item(s) in the stack of items.

The system may generate a model of one or more expected stacks for the items belonging to the list of items. The model may be generated based at least in part on one or more thresholds such as a fit threshold value or stability threshold value, other packing metric (e.g., density), etc. For example, the system can generate a model of a stack for which an expected stability value satisfies (e.g., exceeds) the stability threshold value. The model and/or simulation of the stacking items may include a determination of whether a use of one or more spacers would improve the fit value, or stability value, other packing metric, and if so, a number of spacers and location at which the spacers are to be placed. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) in connection with palletizing the items on the list of items is generated based at least in part on one or more attributes of the items. In some embodiments, the model of the stack(s) in connection with palletizing N items on the list of items (e.g., a set of N items for which the system has knowledge are to be palletized) is generated based at least in part on one or more attributes of the items.

Various attributes of an item may be obtained before or during the determining of the plan. Attributes may include any one or more of, in any combination, a size of an item, a shape of an item, a type of packaging of an item, an identifier of an item, a center of gravity of an item, a rigidity of an item (or a packaging of an item), a label on the item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

At 330, a determination of whether one or more spacers (or quantity of spacer material) are to be placed is performed. The robotic system may determine whether the one or more spacers are to be placed based at least in part on a plan for palletizing the set of items, the next item, or the next N items.

In response to a determination that one or more spacers are not to be placed at 330, process 300 proceeds to 340 at which items are picked and moved through a (predetermined/planned) trajectory to a location near where the item is to be placed on the corresponding conveyor, and placed at the destination location according to the plan determined and/or updated at 320. Process 300 may then proceed to 360.

In response to a determination that one or more spacers are to be placed at 330, process 300 may proceed to 350 at which one or more spacers are placed according to the plan. In some embodiments, the placing the one or more spacers may comprise obtaining a spacer from a dispenser device. For example, the spacer may be obtained from the dispenser device based at least in part on providing a control signal to the robotic system (e.g., the dispenser device in the robotic system), and the control signal may cause the dispenser device to dispense the spacer (or certain quantity of spacer material).

In some embodiments, the dispenser device may include a mounting hardware configured to mount the device on or adjacent to an end effector of a robotic arm, a communication interface configured to receive the control signal, and an actuator configured to dispense a quantity of spacer material from a supply of spacer material in response to the control signal. The robotic arm may be comprised in a robotic palletization system. In some embodiments, the robotic palletization system may determine that a spacer is to be placed in connection with palletization of one or more items, and generate the control signal to cause the actuator to dispense the quantity of spacer material. The end effector may be a gripper. The gripper may be a suction-based gripper, such as a pneumatic driven gripper.

The quantity of spacer material that may be dispensed and/or used in connection with the palletization may be a predefined quantity. In some embodiments, a control signal provided to the device (e.g., a dispenser of the spacer/spacer material) may indicate the quantity of the spacer material to be dispensed/used as the spacer.

In some embodiments, the supply of spacer material comprises one or more of a larger block of spacer material, a strip of spacer material, and a roll of spacer material. The dispenser device, or a robotic system, may comprises a cutter that is configured to cut the quantity of spacer material from the supply of spacer material. In response to the control signal being provided to the actuator, the actuator may cause the cutter to cut the quantity of spacer material from the supply of spacer material.

In some embodiments, the supply of spacer material comprises a liquid precursor. In response to the control signal being provided to the actuator, the actuator causes the quantity of spacer material to be dispensed onto a surface of a pallet or a stack of items on the pallet. The dispensed precursor may harden after being dispensed onto the surface of the pallet or the stack of items on the pallet. In some embodiments, the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. A fluid may be delivered based on via one or more delivery tubes the distal end of which are in proximity of the dispenser device (e.g., adjacent to, or near, the end effector of the robotic arm). The proximal end of the delivery tube may be operatively connected to a fluid supply.

In some embodiments, the dispenser device dispenses the one or more spacers to the location at which the spacers to located with the stack of items. In some embodiments, the one or more spacers are dispensed to a staging area or to a location near the end effector of the robotic arm or dispenser device, and in response to the one or more spacers being dispense, the robotic arm may be controlled to move the one or more spacers to corresponding locations. The location at which the one or more spacers are dispensed may be determined based at least in part on a cost function associated with the dispensing and moving of the one or more spacers. For example, location at which the one or more spacers are dispensed may be determined to minimize/optimize a cost function, or such that a cost associated with the one or more spacers is less than a predefined maximum cost.

In response to the one or more spacers being placed in the corresponding locations according to the plan, process 300 may proceed to 340.

In the example shown, (re-)planning and plan implementation (320, 330, 340, 350) continue until the high-level objective of providing the items on the list of items is completed (360), at which the process 300 ends. In various embodiments, re-planning (320) may be triggered by conditions such as arrival of an items that is not expected and/or cannot be identified, a sensor reading indicating an attribute has a value other than what was expected based on item identification and/or associated item model information, a stability of the stack of items is determined to be less than a minimum stability threshold value, an indication that a supply of spacer material in the dispenser device (or within the workspace) is less than a minimum spacer supply value, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 4:
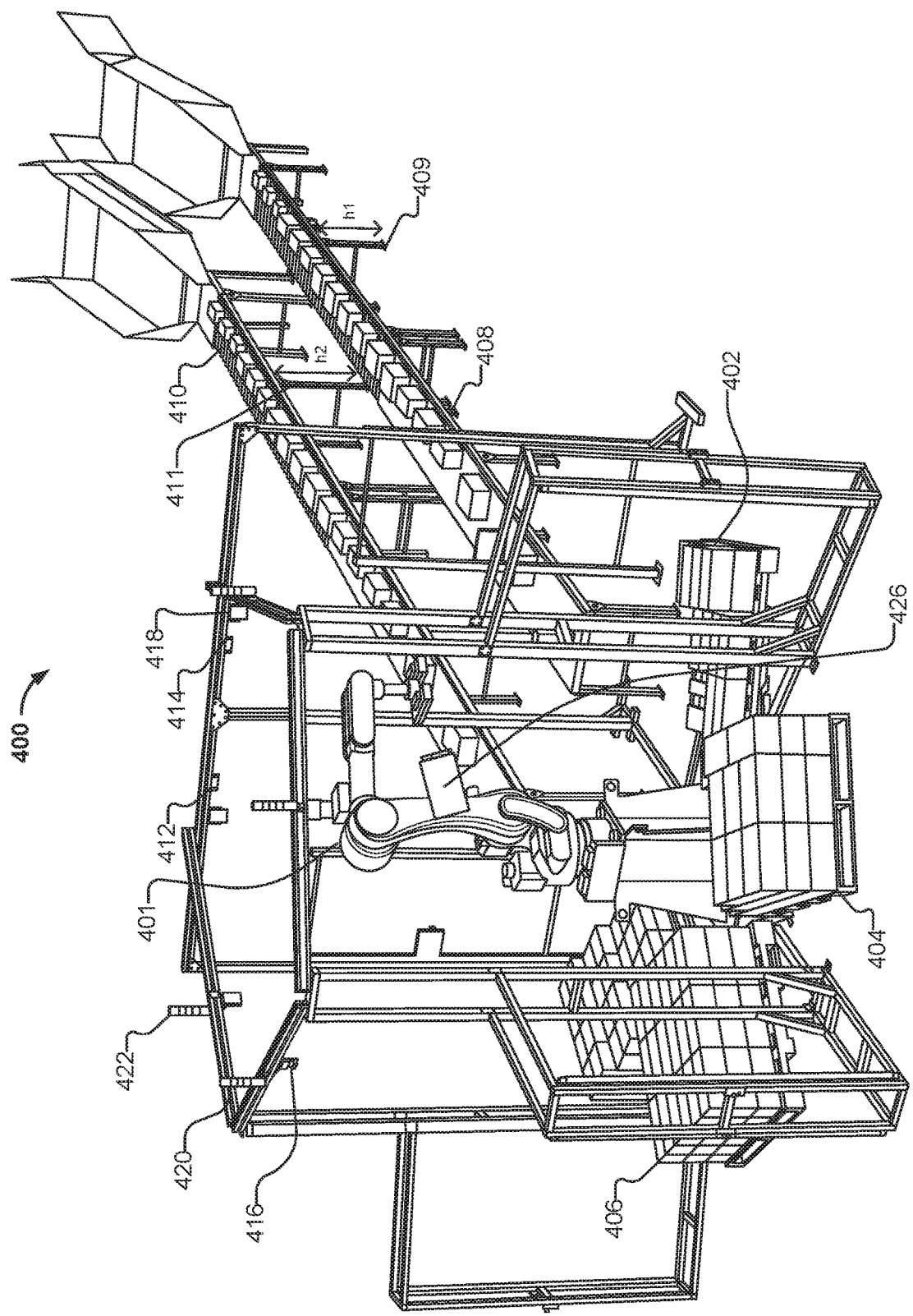
FIG. 4 is a diagram illustrating an embodiment of a robotic system to palletize and/or depalletize heterogeneous items.

FIG. 4 is a diagram illustrating an embodiment of a robotic system to palletize and/or depalletize heterogeneous items. In the example shown, system 400 includes a robotic arm 401. In this example the robotic arm 401 is stationary, but in various alternative embodiments robotic arm 401 may be a fully or partly mobile, e.g., mounted on a rail, fully mobile on a motorized chassis, etc. In other implementations system 400 may include a plurality of robotic arms with a workspace. As shown, robotic arm 401 is used to pick arbitrary and/or dissimilar items from one or more conveyor (or other source) 408 and 410 (e.g., conveyor belts), and the items on a pallet (e.g., platform or other receptacle) such as pallet 402, pallet 404, and/or pallet 406. In some embodiments, other robots not shown in FIG. 4 may be used to push/pull pallet 402, pallet 404, and/or pallet 406 into position to be loaded/unloaded and/or into a truck or other destination to be transported, etc.

As illustrated in FIG. 4, system 400 may comprise one or more predefined zones. For example, pallet 402, pallet 404, and/or pallet 406 are shown as located within the predefined zones. The predefined zones may be denoted by marking or labelling on the ground or otherwise structurally such as via the frame shown in system 400. In some embodiments, the predefined zones may be located radially around robotic arm 401. In some cases, a single pallet is inserted into a predefined zone. In other case, one or pallets are inserted into a predefined zone. Each of the predefined zones may be located within range of robotic arm 401 (e.g., such that robotic arm 401 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 401 such as via conveyor 408 and/or conveyor 410. System 400 may control a speed of conveyor 408 and/or conveyor 410. For example, system 400 may control the speed of conveyor 408 independently of the speed of conveyor 410, or system 400 may control the speeds of conveyor 408 and/or conveyor 410. In some embodiments, system 400 may pause conveyor 408 and/or conveyor 410 (e.g., to allow sufficient time for robotic arm 401 to pick and place the items. In some embodiments, conveyor 408 and/or conveyor 410 carry items for one or more manifests (e.g., orders). For example, conveyor 408 and conveyor 410 may carry items for a same manifest and/or different manifests. Similarly, one or more of the pallets/predefined zones may be associated with a particular manifest. For example, pallet 402 and pallet 404 may be associated with a same manifest. As another example, pallet 402 and pallet 406 may be associated with different manifests.

System 400 may control robotic arm 401 to pick an item from a conveyor such as conveyor 408 or conveyor 410, and place the item on a pallet such as pallet 402, pallet 404, or pallet 406. Robotic arm 405 may pick the item and move the item to a corresponding destination location (e.g., a location on a pallet or stack on a pallet) based at least in part on a plan associated with the item. In some embodiments, system 400 determines the plan associated with the item such as while the item is on the conveyor, and system 400 may update the plan upon picking up the item (e.g., based on an obtained attribute of the item such as weight, or in response to information obtained by a sensor in the workspace such as an indication of an expected collision with another item or human, etc.). System 400 may obtain an identifier associated with the item such as a barcode, QR code, or other identifier or information on the item. For example, system 400 may scan/obtain the identifier as the item is carried on the conveyor. In response to obtaining the identifier, system 400 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 400 may select a pallet on which to place the item based at least in part on a model or simulation of the stack of items on the pallet and/or on a placing of the item on the pallet. System 400 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 401 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 400 comprises one or more sensors and/or sensor arrays. For example, system 400 may include one or more sensors within proximity of conveyor 408 and/or conveyor 410 such as sensor 412, sensor 414, and/or sensor 418. Sensor 418 may be a scanner that scans items (e.g., obtains information of items) as the items pass thereunder on conveyor 408. The one or more sensors may obtain information associated with an item on the conveyor such as an identifier or information on label on the item, or an attribute of the item such as a dimensions of the item. In some embodiments, system 400 includes one or more sensors and/or sensor arrays that obtain information pertaining to a predefined zone and/or a pallet in the zone. For example, system 400 may include a sensor 416 that obtains information associated with pallet 406 or the predefined zone within which pallet 406 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 400 may generate a model of a stack of items on a pallet based at least in part on the information pertaining to the pallet. System 400 may in turn use the model in connection with determining a plan for placing an item a pallet. As another example, system 400 may determine that a stack of items is complete based at least in part on the information pertaining to the pallet.

System 400 may communicate a state of a pallet and/or operation of the robotic arm 401 within a predefined zone. The state of the pallet and/or operation of the robotic arm may be communicated to a user or other human operator. For example, system 400 may include a communication interface (not shown) via which information pertaining to the state of system 400 (e.g., a state of a pallet, a predetermined zone, a robotic arm, etc.) to a terminal such as on demand teleoperation device 122 and/or a terminal used by a human operator. As another example, system 400 may include a status indicator within proximity of a predefined zone, such as status indicator 420 and/or status indicator 422.

Status indicator 420 may be used in connection with communicating a state of a pallet and/or operation of the robotic arm 401 within the corresponding predefined zone. For example, if system 400 is active with respect to the predefined zone in which pallet 406 is located, the status indicator can so indicate such as via turning on a green-colored light or otherwise communicating information or an indication of the active status via status indicator 420. System 400 may be determined to be in an active with respect to a predefined zone in response to determining that robotic arm 401 is actively palletizing one or more items on the pallet within the predefined zone. As another example, if system 400 is inactive with respect to the predefined zone in which pallet 406 is located, the status indicator can so indicate such as via turning on a red-colored light or otherwise communicating information or an indication of the active status via status indicator 420. System 400 may be determined to be inactive in response to a determination that robotic arm 401 is not actively palletizing one or more items on the pallet within the predefined zone, for example in response to a user pausing that predefined zone (or cell), or in response to a determination that a palletization of items on pallet 406 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 400 may use information obtained by one or more sensors within the workspace to determine an abnormal state pertaining to the pallet and/or items stacked on the pallet. For example, system 400 may determine that a pallet is misaligned relative to robotic arm 401 and/or the corresponding predefined zone based at least in part on the information obtained by the sensor(s). As another example, system 400 may determine that a stack is unstable, that items on a pallet are experiencing a turbulent flow, etc. based at least in part on the information obtained by the sensor(s). In response to detecting the abnormal state, system may communicate an indication of the abnormal state such as an on-demand teleoperation device or other terminal used by an operator. In some embodiments, in response to detecting the abnormal state, system 400 may automatically set the pallet and/or corresponding zone to an inactive state. In addition to, or as an alternative to, notifying an operator of the abnormal state, system 400 may perform an active measure. The active measure may include controlling the robotic arm 401 to at least partially correct the abnormal state (e.g., restack fallen items, realign the pallet, etc.). In some implementations, in response to detecting that an inserted pallet is misaligned (e.g., incorrectly inserted to the predefined zone), system 400 may calibrate the process for modelling a stack and/or for placing items on the pallet to correct for the misalignment. For example, system 400 may generate and use an offset corresponding to the misalignment when determining and implementing a plan for placing an item on the pallet. In some embodiments, system 400 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 400 via a network such as a wired network and/or a wireless network. For example, system 400 may comprise a communication interface via which system 400 is connected to one or more networks. In some embodiments, a terminal connected via network to system 400 provides a user interface via which human operator can provide instructions to system 400, and/or via which the human operator may obtain information pertaining to a state of system 400 (e.g., a state of robotic arm, a state of a particular pallet, a state of a palletization process for a particular manifest, etc.). The human operator may provide an instruction to system 400 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In some embodiments, the system palletizes/depalletizes items based at least in part on a cost function (e.g., a cost associated with moving the items). In the example illustrated in FIG. 4, conveyor 408 and conveyor 410 have different heights—conveyor 410 is relatively higher than conveyor 408. For example, the leg 409 to conveyor 408 has a height of h1, and the leg 411 to conveyor 410 has a height h2, and height h2 is larger than height h1. Similarly, in the example illustrated in FIG. 4, the state of the stack of items on pallet 402, pallet 404, and pallet 406 is different—a height of the stacks (e.g., the height at which the top item on the stack rests) is different. As such, in the case of a palletization process, depending on the source location of the item (e.g., conveyor 408 or conveyor 410), and the destination location (e.g., pallet 402, pallet 404, or pallet 406), the distance the item is to be moved may be different. Similarly, a length of a determined path or trajectory for moving an item may be different depending on the source location and/or the destination location. In the case of depalletizing an item from a pallet to a conveyor, the cost of moving an item from the top half of the stack (e.g., a full pallet newly inserted into the system or a predefined max pallet height) to a relatively higher conveyor (e.g., conveyor 410) may be less than moving the item to the relatively lower conveyor (e.g., conveyor 408); and the cost of moving an item from the bottom half of the stack (e.g., relative to a full pallet newly inserted into the system or a predefined max pallet height) to a relatively lower conveyor may be less than moving the item to a relatively higher conveyor.

According to various embodiments, the system determines the source location and/or the destination location based at least in part on a distance between the source location and the destination location. For example, the system may determine a Euclidean distance between a source location and a destination location. In some embodiments, the system determines a set of Euclidean distances corresponding to various permutations or combinations of source locations and destination locations, and the system determines one or more of the source location and the destination location based at least in part on the distance. In some embodiments, the distance between the source location and the destination location is a variable in a cost function, and the source location and/or the destination location is determined based at least in part on a cost of moving the item from the corresponding source location to the corresponding destination location.

According to various embodiments, the source location from which the item is to be picked may be determined based at least in part an attribute of the source location (e.g., a height of the conveyor, a height of the stack, etc.). The attribute of the source location may be used in connection with determining a cost of moving the item from the source location to destination location. For example, the attribute of the source location may impact an amount of work for the robotic arm to move the item from the source location to the destination location, a distance between the item at the source location and the destination location, a length of the path/trajectory along which the item is to travel from the source location to the destination location. In some embodiments, the source location is determined before the item is provided to the robotic arm 401 (e.g., before the item is within range of the robotic arm 401). In an example of palletizing items, the conveyor on which the item is provided to the robotic arm 401 or system 400 may be controlled upstream (e.g., by picking and placing the item on a particular conveyor, by using a gating structure to direct the item, or otherwise moving the item to the determined source location). For example, a system may include a network of conveyors, an item may be placed on a conveyor upstream, and the system may include a gate structure with which the item is selectively directed to various downstream conveyors based at least in part on the determination of the source location. As another example, a system may implement a downstream conveyor selection to determine the conveyor on which the item is placed based on one or more characteristics of the item (e.g., size, packaging type, rigidity, weight, etc.). As another example, the item may be picked from an original source location (e.g., a shelf, a receptacle, etc.) and place the item on conveyor 408. In the foregoing examples, the determination of at least part of the plan for palletizing the items is determined before the item arrives at robotic arm 401 (e.g., before the item is within range of robotic arm 401, and/or before the item is scanned by the sensors such as sensor 412, sensor 414, and/or 418). For example, a control computer may at least loosely determine an order by which the items are to be palletized. The control computer may determine an attribute pertaining to the manner by which the item is to be palletized such as an attribute of the order in which the item is to be palletized, and the control computer may select the conveyor on which the item is to be provided to robotic arm 401 (e.g., determine the source location) based at least in part on the attribute. Examples of the attribute include (i) an indication that the item is to be palletized at a bottom half of the pallet, (ii) an indication that the item is to be palletized at a top half of the pallet, (iii) an indication that the item is to be placed on the stack of items below one or more threshold heights, (iv) an indication that the item is to be placed on the stack of items above one or more threshold height, etc. Various other attributes may be implemented. In some embodiments, the plan for palletizing the item(s) is updated when the item is within range of the robotic arm 401 and/or scanned by sensors that obtain information for items being input to system 400 (e.g., items being input to range of robotic arm 401), such as sensor 412, sensor 414, and/or sensor 418.

In the example of system 400 in FIG. 4, if the item is determined to be moved to pallet 402, then the system may determine that the cost of moving the item from conveyor 408 is lower than if the item were to be moved from conveyor 410. Accordingly, the system may control for the item to be routed to conveyor 408 (e.g., by controlling a gating structure, by picking and placing the item from an original source location onto conveyor 408, etc.). The system may use a then-current state of the stack of items on the pallet in connection with determining the source location. In some embodiments, in response to obtaining a list of items to be palletized, the system generates a simulation or model for stacking the set of items corresponding to the list of items. The simulation or model may be used in connection with determining the source location and/or controlling the moving of the item to the source location for picking and placing by robotic arm 401.

In the example shown, system 400 comprises a dispenser device 426 that is configured to dispense a quantity of spacer material from a supply of spacer material in response to the control signal. Dispenser device 426 may be disposed on robotic arm 401, or within proximity of the workspace (e.g., within a threshold distance of the workspace). For example, dispenser device 426 may be disclosed within the workspace of robotic arm 401 such that dispenser device 426 dispenses spacer material on or around a pallet (e.g., pallet), or within a predetermined distance of end effector of robotic arm 401. In some embodiments, dispenser device 426 comprises a mounting hardware configured to mount dispenser device 426 on or adjacent to an end effector of robotic arm 401. The mounting hardware is at least one of a bracket, a strap, and one or more fasteners, etc. In the example illustrated in FIG. 4, the dispenser device 426 may be disposed on a frame of the workspace (e.g., a frame of the cell in which robot arm 401 operates). In some embodiments, system comprises a plurality of dispenser devices. For example, a plurality of the predefined zones may each of a dispenser device that is used in connection dispensing spacers/spacer material in connection with palletizing items on a pallet within that corresponding predefined zone.

In some embodiments, dispenser device 426 may comprise a biasing device/mechanism that biases supply material within dispenser device 426 to be ejected dispensed from dispenser device 426. Dispenser device 426 may include a gating structure that is used to control the dispensing of spacer material (e.g., to prevent supply material to be dispensed without actuation of the gating structure, and to permit dispensing of the spacer material to be dispensed in response to actuation).

Dispenser device 426 may comprise a communication interface configured to receive a control signal. For example, dispenser device 426 may be in communication with one or more terminals such as a control computer. Dispenser device 426 may communicate with the one or more terminals via one or more wired connections and/or one or more wireless connections. In some embodiments, dispenser device 426 communicates information to the one or more terminals. For example, dispenser device 426 may send to the control computer an indication of a status of dispenser device 426 (e.g., an indication of whether dispenser device 426 is operating normally), an indication of a type of spacer material comprised in dispenser device 426, an indication of a supply level of the spacer material in dispenser device 426 (e.g., an indication of whether the dispenser device is full, empty, half full, etc.). The control computer (or other terminal in connection with the control computer) may use the information communicated by dispenser device 426 to provide a notification or indication pertaining to the dispenser device (e.g., an indication of a low or empty amount of remaining supply material, a jam in the dispenser, etc.). The control computer may be used in connection with controlling dispenser device 426 to dispense a quantity of spacer material. For example, the control computer may determine that a spacer is to be used in connection with palletizing one or more items, such as to improve a stability of expected stability of the stack of items on pallet 402, 404, and/or 406. The control computer may determine the quantity of spacer material (e.g., a number of spacers, an amount of spacer material, etc.) to use in connection with palletizing the one or more items. For example, the quantity of spacer material to use in connection with palletizing the one or more items may be determined based at least in part on determining a plan for palletizing the one or more items.

In some embodiments, dispenser device 426 dispenses the one or more spacers to the location at which the spacers to located with the stack of items. In some embodiments, the one or more spacers are dispensed to a staging area or to a location near the end effector of robotic arm 401 or dispenser device 426, and in response to the one or more spacers being dispense, robotic arm 401 may be controlled to move the one or more spacers to corresponding locations. The location at which the one or more spacers are dispensed may be determined based at least in part on a cost function associated with the dispensing and moving of the one or more spacers. For example, location at which the one or more spacers are dispensed may be determined to minimize/optimize a cost function, or such that a cost associated with the one or more spacers is less than a predefined maximum cost. As an example, the location at which the one or more spacers may be on a corresponding pallet (e.g., in connection with palletizing items on pallet 402, a spacer may temporarily be placed/staged at a location on the pallet 402 or corresponding predefined zone, and the spacer may be subsequently moved to the appropriate location).

In some embodiments, dispenser device 426 comprises an actuator configured to dispense a quantity of spacer material from a supply of spacer material in response to the control signal. In response to determining that a spacer/spacer material is to be used in connection with palletizing one or more items, the control computer may generate the control signal to cause the actuator to dispense the quantity of spacer material. The control signal may comprise an indication of the quantity of spacer material to be used as the spacer.

According to various embodiments, a spacer or a spacer material is rigid block. For example, spacer or a spacer material may be a rigid block of foam. In some embodiments, a spacer or a spacer material comprises polyurethane.

In some embodiments, the supply of spacer material comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material comprises one or more of a larger block of spacer material, a strip of spacer material, and a roll of spacer material. Dispenser device 426 or a system 400 may comprises a cutter that is configured to cut the quantity of spacer material from the supply of spacer material. In response to the control signal being provided to the actuator, the actuator may cause the cutter to cut the quantity of spacer material from the supply of spacer material.

In some embodiments, the supply of spacer material comprises a liquid precursor. In response to the control signal being provided to the actuator, the actuator causes the quantity of spacer material to be dispensed onto a surface of a pallet or a stack of items on the pallet. The dispensed precursor may harden after being dispensed onto the surface of the pallet or the stack of items on the pallet.

In some embodiments the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. In some embodiments, the extruded material is filled with a gel.

In various embodiments, a robotically controlled dispenser tooling or machine fills the void between and/or adjacent to boxes to prepare the surface area for the next box/layer being placed. In some embodiments, system 400 may use a robotic arm 401 to pick/place predefined cut material and/or may dynamically trim the spacer material to fit the need of the surface area of the next item being placed. In some embodiments, the robotically controlled dispenser device 426, or robotic palletization system comprising the robotically controlled dispenser, comprises a device to trim to size a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The dispenser device 426 may place (e.g., eject, dispense, etc.) the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The dispenser device 426 may dispense a predetermined amount (e.g., a correct amount or an expected amount) of spacer material to correct or improve the surface area discrepancy between boxes or items on the layer (e.g., on the upper surface of the layer) to prepare the surface area for a next box or item.

In various embodiments, elements of system 400 may be added, removed, swapped out, etc. In such an instance, a control computer initializes and registers the new element, performs operational tests, and begins/resumes kitting operations, incorporating the newly added element, for example.

Figure 5A:
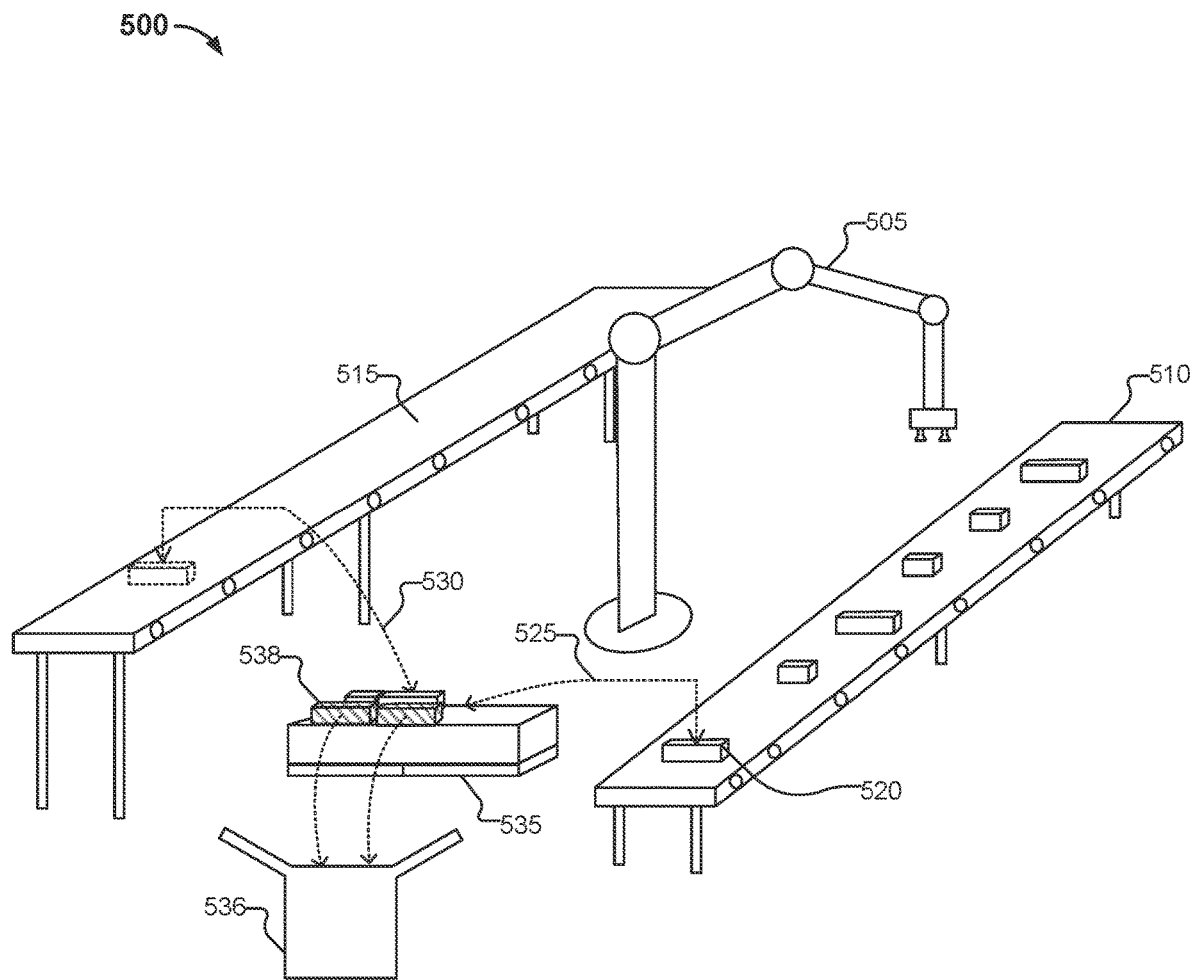
FIG. 5A is a diagram illustrating an example of robotic system to palletize and/or depalletize items according to various embodiments.

FIG. 5A is a diagram illustrating an example of robotic system to palletize and/or depalletize items according to various embodiments. In the example illustrated in FIG. 5A, system 500 comprises a robotic arm 505 that palletizes/depalletizes one or more items from one or more conveyors such as conveyor 510 and/or conveyor 515.

According to various embodiments, system 500 comprises a plurality of conveyors or other locations with respect to which items can be moved in connection with palletization/depalletization. In the example illustrated in FIG. 5A, system 500 comprises conveyor 510 and conveyor 515. Conveyor and 510 and conveyor 515 have different corresponding heights—for example, conveyor 510 is has a smaller height than conveyor 515. In connection with palletization/depalletization of items with respect to pallet 535, robotic arm 505 moves items to/from conveyors. In some embodiments, the conveyor used in connection with the palletization/depalletization is determined based at least in part on an attribute of the conveyor. Examples of attributes of the conveyor include height of the conveyor, relative height of the conveyor, a stack height threshold, etc. Various other attributes pertaining to the conveyor may be used in connection with determining a plan/strategy for palletization/depalletization of items with respect to pallet 535. A control computer of system 500 (not shown) may determine the conveyor to use in connection palletization/depalletization of an item (or a set of items) based at least in part on a determined cost associated with moving an item to/from the corresponding conveyor. In the example illustrated in FIG. 5A, robotic arm 505 is moving items from a conveyor (e.g., conveyor 510) to a pallet 525. System 500 may determine that a cost associated with moving item 520 from conveyor 510 to pallet 535 (e.g., along path 525) is less than a cost associated with moving an item from conveyor 515 to pallet 535 (e.g., along path 530).

In some embodiments, before sending an item along a conveyor for palletization by robotic arm 505, system 500 determines a cost associated with moving item 520 from conveyor 510 to pallet 535, and a cost associated with moving an item from conveyor 515 to pallet 535. The respective costs of moving the item from the conveyors 510 and 515 may be determined based on a current state of the stack of items on pallet 535 and/or an expected state of the stack of items by the time the item is expected to be carried within range of robotic arm 505 and/or an expected time at which robotic arm 505 is to move the item from the conveyor to the pallet 535. In response to determining the costs associated with moving the item from the conveyors to the pallet, system may determine the conveyor along which the item is to be carried (e.g., the source location) based on such conveyor corresponding to a lower cost of moving the item to the pallet 535. In response to determining the source location, system 500 provides the item on the corresponding conveyor (e.g., conveyor 510). In some embodiments, the cost of moving an item from a conveyor to a pallet is a distance between the source location (e.g., the conveyor) and the destination location (e.g., a location on pallet 535 or stack on the pallet 535). The distance can be determined as the Euclidean distance between the source location and the destination location.

In some embodiments, the conveyor along which the item is to be carried to robotic arm 505 is determined based on a state of the stack of the pallet in comparison to a stack height threshold. As an example, the stack height threshold may be preset as mid-point of a maximum pallet height. Using the example illustrated in FIG. 5A, in the case that a height of a stack (or an expected destination location of the item on the stack) is below the stack height threshold, in response to system 500 determining that height of a stack (or an expected destination location of the item on the stack) is below the stack height threshold, system 500 determines to provide the item along conveyor 510 (e.g., that conveyor 510 corresponds to the source location with respect to such item) for palletization. Conversely, in some examples, in the case that a height of a stack (or an expected destination location of the item on the stack) is above the stack height threshold, system may determine to provide the item along conveyor 515 for palletization. In examples of depalletization, if the height of a stack is above the stack height threshold, system 500 may determine conveyor 515 to be the destination location; and if the height of a stack is below the stack height threshold, system 500 may determine conveyor 510 to be the destination location. In some implementations, the stack height threshold used in connection with palletization may be the same as the stack height threshold used in connection with depalletization. In some embodiments, the stack height threshold for palletization is different from the stack height threshold for depalletization.

According to various embodiments, during a depalletization of items from pallet 535, system 500 may determine that the stack of items comprises one or more spacers or spacer material (e.g., interspersed among items such as product that is to be depalletized). In response to determining that the stack of items comprises a spacer/spacer material, system 500 may determine a plan to move/remove the spacers. The plan for moving the spacers may include determining a stage in the depalletization process at which the spacer is to be moved (e.g., determining to move the spacer in a manner that does not cause the stack of items to become unstable or otherwise in a manner that de-stabilizes the stack of items, such as beyond a threshold pertaining to stability). In some embodiments, system 500 picks spacers/spacer material such as spacer 538 from the pallet 535 and places the spacers/spacer material into receptacle 536. As an example, spacers/spacer material may be recycled such as in connection with a later palletization process, or otherwise repurposed.

Figure 5B:
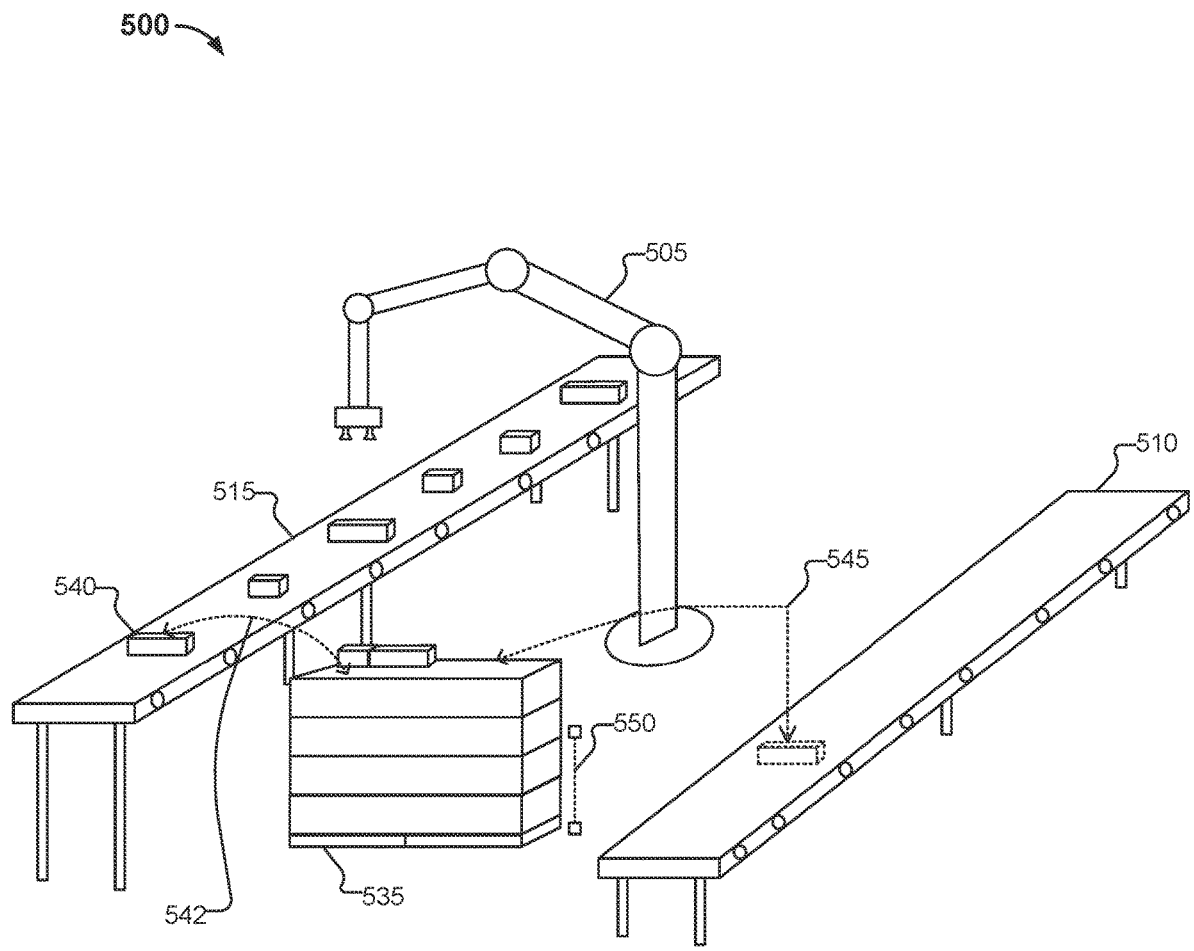
FIG. 5B is a diagram illustrating an example of robotic system to palletize and/or depalletize items according to various embodiments.

FIG. 5B is a diagram illustrating an example of robotic system to palletize and/or depalletize items according to various embodiments. In the example illustrated in FIG. 5B, system 500 comprises a stack on pallet 535 that is relatively higher than the stack on pallet 535 illustrated in FIG. 5A.

In connection with palletization/depalletization of item 540, system 500 may determine the conveyor to/from which item 540 is to be moved. The determination of the conveyor to use in connection with the palletization/depalletization may be based at least in part on an attribute of the conveyor, such as a height of the conveyor (or the height of the conveyor in relation to a stack height threshold 550).

In some embodiments, system 500 may determine that the cost of moving item 540 to/from conveyor 515 (e.g., along path 542) than the cost of moving item 540 to/from conveyor 510 (e.g., along path 545). In response to determining the cost of moving item 540 to/from conveyor 515 being the minimum cost (or at least less than the cost of moving the item to/from conveyor 510), system 500 uses conveyor 515 in connection with the palletization/depalletization of item 540.

In some embodiments, system 500 may use a distance (e.g., a Euclidean distance) between the conveyor and the stack on pallet 535 as a basis for determining the conveyor to use in connection with the palletization/depalletization of item 540. For example, the distance between the item on conveyor 515 and the location on the stack on pallet 535 is less than the distance between a location on conveyor 510 and the location on the stack on pallet 535. Accordingly, system 500 may determine to use conveyor 515 in connection with the palletization/depalletization of item 540.

In some embodiments, system 500 may determine the conveyor to use in the palletization/depalletization of item 540 based at least in part on a current state of a stack of the pallet (or expected state of the stack when the item will be moved), a stack height threshold 550, and an attribute of the conveyor (e.g., a height of the conveyor, a relative height of the conveyor, etc.). In the example illustrated in FIG. 5B, the height of the stack of items on pallet 535 larger than the stack height threshold 550. Accordingly, system 500 may determine to move the item to/from conveyor 515. Conversely, if the height of the stack of items on pallet 535 was lower than stack height threshold 550, system 500 may determine to move the item to/from conveyor 510 (e.g., based on conveyor 510 having a lower height than conveyor 515, etc.).

According to various embodiments, the robotic system stores a predefined maximum pallet height. In some implementations, the predefined maximum pallet height is between 1.5 m and 2.1 m. In some implementations, the predefined maximum pallet height is 1.5 m. In some implementations, the predefined maximum pallet height is 2.1 m. The maximum pallet height may be configured by a user/administrator or may be determined based on at least in part on length of the robotic arm or a height at which the robotic arm can accurately and/or stably position an item on a stack (e.g., a maximum height at which the robotic arm can articulate/orientate a wrist of the robot such that the end effector (e.g., in the case of a suction cup based end effector, etc.) is orthogonal to the ground. One or more height thresholds may be set based at least in part on the predefined maximum pallet height, and the one or more height thresholds may be used in connection with determining the conveyor to be used to pick and/or place items. For example, a first height threshold may be set to be a height that is two-thirds (⅔) the predefined maximum pallet height. In response to determining that the height of the stack on the pallet (e.g., pallet 535) exceeds the first height threshold, the system may use the conveyor having a larger height (e.g., conveyor 515) in connection with picking and/or placing an item. As another example, a second height threshold may be set to be a height that is one-third (⅓) the predefined maximum pallet height. In response to determining that the height of the stack on the pallet (e.g., pallet 535) is below the second height threshold, the system may use the conveyor having a smaller height (e.g., conveyor 510) in connection with picking and/or placing an item. In some embodiments, in response to determining that a height of the stack is between the first height threshold and the second height threshold, the system may use either conveyor 510 or conveyor 515 in connection with picking and/or placing an item (e.g., the system may use other variables in a cost function to determine the height, such as a distance to the destination location, etc.). Other relative heights may be used to set the first height threshold and/or second height threshold. In some implementations, the first height threshold is set to be three quarters (¾) the predefined maximum pallet height and/or the second height threshold is set to be one quarter (¼) the predefined maximum pallet height. In some embodiments, the first height threshold and the second threshold may be preset based at least in part on a distance (e.g., a travel distance) with respect to the various conveyors and the corresponding conveyor heights.

Figure 6A:
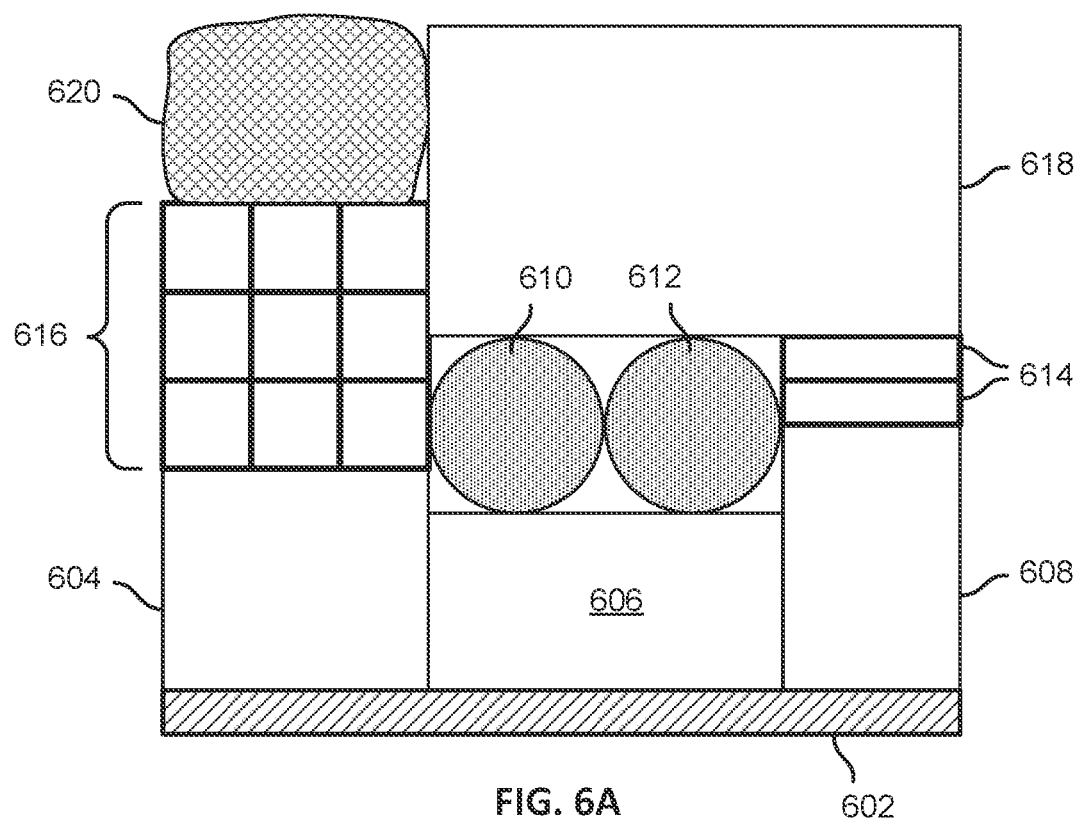
FIG. 6A is a diagram illustrating an example of a pallet as assembled in an embodiment of a robotic system to palletize and/or depalletize heterogeneous items.

FIG. 6A is a diagram illustrating an example of a pallet as assembled in an embodiment of a robotic system to palletize and/or depalletize heterogeneous items. In various embodiments, the items shown in FIG. 6A as stacked on pallet 602 may have been stacked by a robotic system, such as robotic system 100 of FIG. 1A and/or system 400 of FIG. 4, according to a computer-determined (and/or updated) plan, as in the process 200 of FIG. 2.

In the example shown, items 604, 606, and 608 are stacked in a first (bottom-most) layer, with items 610, 612, 614, and 616 stacked in a layer on top of items 604, 606, and 608. Items 618 and 620 have been stacked on top.

In various embodiments, the items as shown may have been selected and designated to be placed as shown in FIG. 6A based on item identification and/or attributes, e.g., as determined and/or measured based on image, weight, and/or other sensor data. For example, items 604, 606, and 608 may have been placed in the bottom layer, as shown, based on their (relative) size, weight, rigidity, strength, and/or other indication of ability (of item and/or packaging) to support weight stacked on top.

The placement, orientation, etc., of each item is determined in various embodiments by applying one or more heuristics, algorithms, or other tools and/or techniques. For example, each item is added at least in part by determining a location within the entire pallet and/or in a layer currently being stacked and/or arranged so as to provide a relatively (more) flat top surface to form the basis for a next layer, to minimize stack surface area, to minimize current layer perimeter, etc. In various embodiments, one or more of the following heuristics may be used: place next item to maintain center of mass close to the center of the pallet; maintain a clear motion path for the robotic arm for subsequent items; maintain visibility of the cameras to all top layer boxes or unboxed items; etc. In some embodiments, one or more of the aforementioned heuristics may be used in connection with determining a value pertaining to stability of a stack of items, etc.

In the example shown, items 610 and 612 are round (at least in cross-section), and in some embodiments their shape would be taken into consideration in selecting a location to place them. For example, an interior location in which items 610 and 612 are constrained by other adjacent items, as shown in FIG. 6A, may be selected over a location on the edge or end of a layer.

Items 618 and 620 may have been selected to be placed on top, in various embodiments, based on one or more attributes, such as their weight (or density), ability to support weight stacked on top of them, etc.

In some embodiments, one or more spacers or spacer material may be used in connection with improving a metric of the stack of items. The metric may include one or more of stability, packing density, number of items possible to stack on a pallet, etc. As an example, if item 614 were not available in the set of N items to be stacked, the placing of item 618 on items 610 and 612 may be unstable. As such, the robotic system may obtain a spacer or spacer material to be used to improve the stability. For example, the robotic system may obtain a spacer in the size and/or shape of items 614 and place the spacer in the location at which item 614 is stacked. Placement of a spacer in such a location in the absence of item 614 may improve stability such as by forming a level top layer surface among the spacer and items 610 and 612. Placement of the spacer may also cause the variation in the height of the top surface of the layer to be reduced.

Figure 6B:
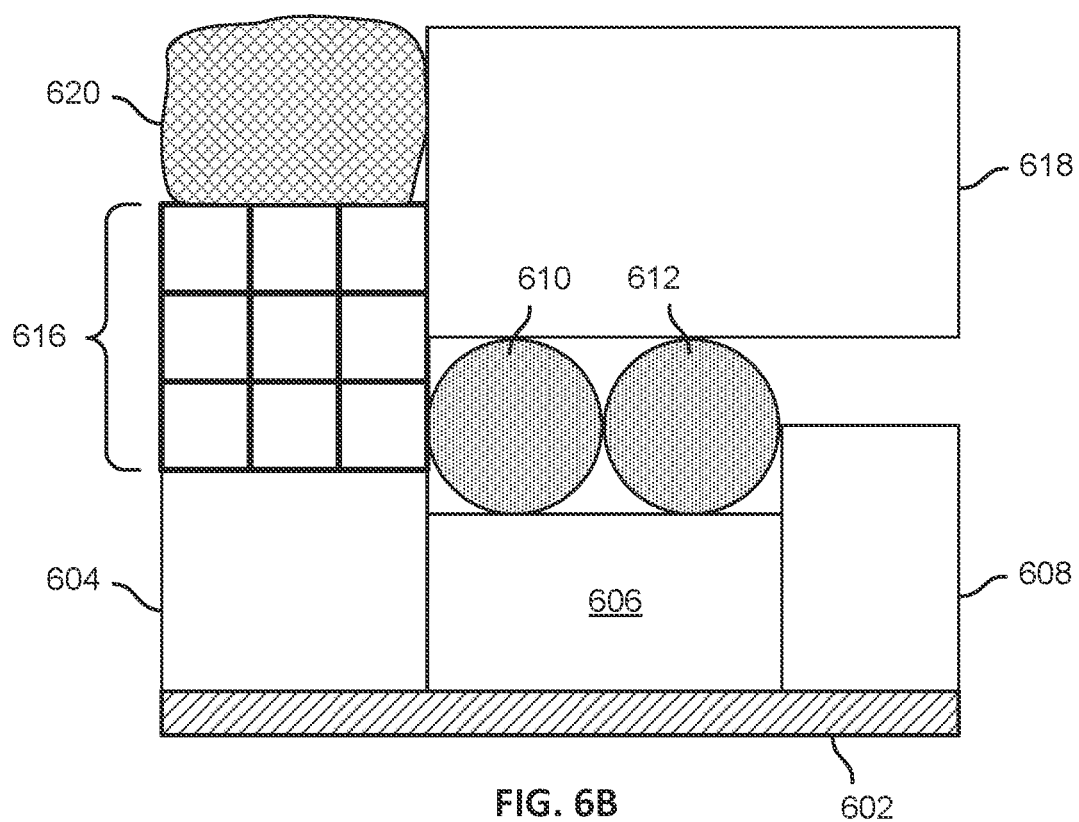
FIG. 6B is a diagram illustrating an example of a pallet as assembled in an embodiment of a robotic system to palletize and/or depalletize heterogeneous items.

FIG. 6B is a diagram illustrating an example of a pallet as assembled in an embodiment of a robotic system to palletize and/or depalletize heterogeneous items. In this example, the items 614 included in the example as shown in FIG. 6A are omitted. In various embodiments, a plan to stack items as shown in FIG. 6B may be generated by a control computer, such as control computer 118 of FIG. 1A or a control computer comprised in system 400 of FIG. 4A. In the example shown, an algorithmically generated plan may consider the item 618 stacked on items 610, 612 to be in a stable position. For example, there may be no computed net moment about any point or axis that would lead a control computer to determine the position as shown is not stable. In practice, however, slight deviation from plan in the placement of items on pallet 602 could result in the item 618 not being in a stable position once stacked on items 610, 612, for example. In some embodiments, a robotic arm and end effector (e.g., suction, gripper) used to place item 618 includes sensors and logic to detect instability. For example, image data may be processed and may indicate the items is leaning to the right, as shown. Or, prior to releasing the item 618 force sensors in the end effector may be used to detect the item would not be stable if released. For example, if the item gives way (or provides resistance unevenly) when pressed down but not yet released, in various embodiments the system determines the item is not stable. In some embodiments, the robotic system dynamically updates the model of the stack such as in response to obtaining information pertaining to stability/instability of the stack or item placed on the stack, or in response to placing the item, etc.

In various embodiments, detection of unexpected instability triggers responsive action. For example, other items (e.g., items 614 as in FIG. 6A) may be placed in position to further support the item that was not stable. Or, the item may be shifted to a different nearby position (e.g., snugged left in the example shown), to see if the item would be stable in the new position. Or, the item may be removed from the stack and moved to a buffer or staging area in which the item is temporarily stored until the robotic system determines a more ideal destination location (e.g., as additional items are stacked on the pallet and a space in which the item would better fit or result in better stability is formed). In various embodiments, if automated processing fails to determine a resolution, human intervention (e.g., via teleoperation, manually, etc.) may be triggered. In some embodiments, the responsive action performed in response to a detection of an unexpected instability may include the obtaining and placement of one or more spacers or spacer material. The one or more spacers may be precut in certain predefined shapes/sizes, or the robotic system may size/shape the spacer according to the plan for using the spacer. For example, the robotic system may cut the spacer from an aggregate/precursor block or roll of spacer material, etc.

Figure 6C:
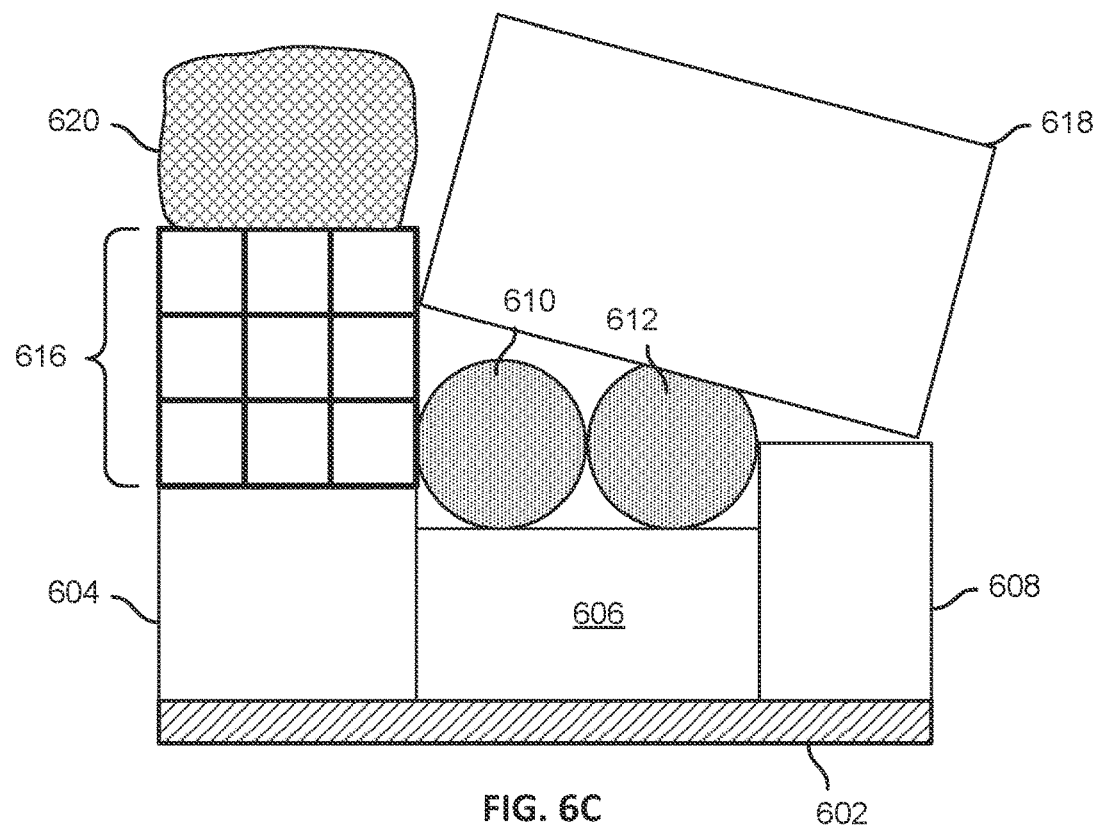
FIG. 6C is a diagram illustrating an example of a pallet as assembled in an embodiment of a robotic system to palletize and/or depalletize heterogeneous items.

FIG. 6C is a diagram illustrating an example of a pallet as assembled in an embodiment of a robotic system to palletize and/or depalletize heterogeneous items. In this example, the items 614 included in the example as shown in FIG. 6A are omitted. As illustrated in FIG. 6C, the stack of items is not stable. Item 618 has pivoted around item 612 and is no longer flat/planar in the stack of items.

Figure 6D:
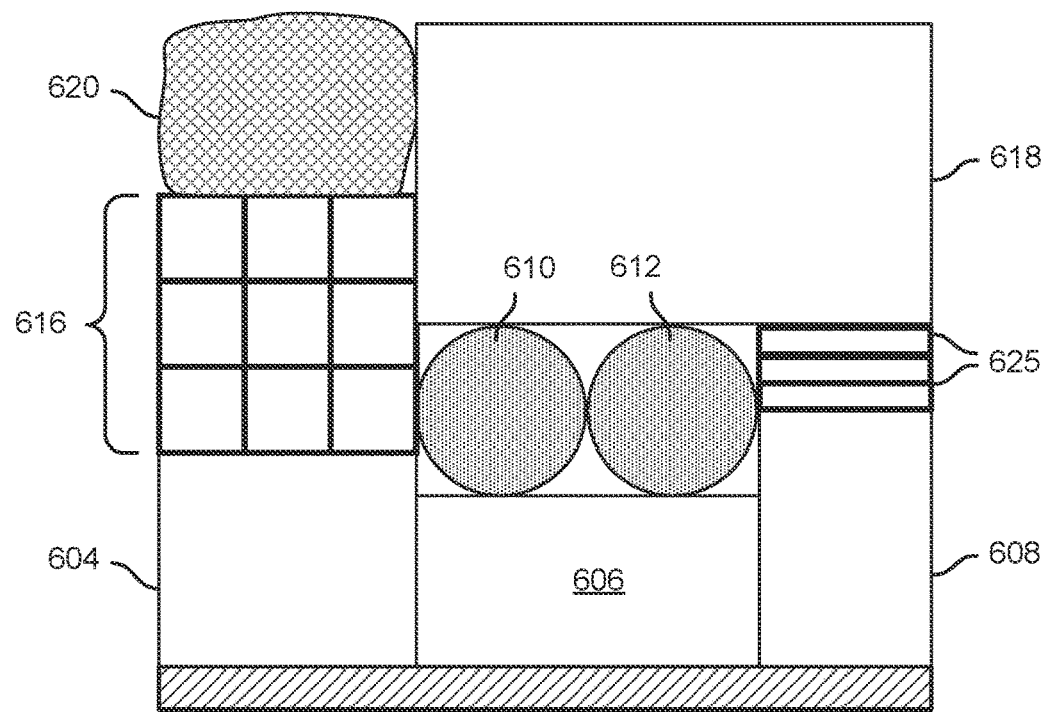
FIG. 6D is a diagram illustrating an example of a pallet as assembled in an embodiment of a robotic system to palletize and/or depalletize heterogeneous items.

FIG. 6D is a diagram illustrating an example of a pallet as assembled in an embodiment of a robotic system to palletize and/or depalletize heterogeneous items. In this example, the spacers/spacer material 625 has been used in connection with palletizing item 618, etc. The quantity of spacers/spacer material 625 has been selected/determined based on a variation of the height of the top surface of item 608 relative to top surface of item 610 and/or 612. For example, the quantity of spacers/spacer material 625 may be selected in order to form a substantially flat (e.g., a part of the layer corresponding to a top surface of the spacers 625 is substantially level with a top surface or point of item 610 and/or 612 at which item 618 is to be placed). In some embodiments, a determination to place spacers 625 and/or a quantity of spacers 625 may be performed in connection with the placement of item 618. The computer system (e.g., the robotic palletization system) may determine the quantity of spacers/spacer material 625 to place based on an attribute of item 618 that is to be placed, and a model of a current stack such as a height of top surface of items 608, 610, and/or 612. In some embodiments, the determination of the plan for placing item 618 may be further based on items 616 and 620 (e.g., the model of the stack of items). The computer system (e.g., control computer 118) may determine that item 618 is to be placed over items 610, 612, and 608 and adjacent to items 616 and 620 based at least in part on an attribute of item 618 (e.g., a size such as length/width of item 618). In response to determining that item 618 is to be placed on items 610, 612, and 608 and adjacent to items 616 and 620, the computer system may determine that placement of item 618 at such a location would cause the stack of items to be unstable (e.g., item 618 would not be stably placed). For example, the computer system may determine that the stack of items would be unstable based on a model of the stack of items and/or a simulation of the item on the stack of item (e.g., an expected model of the stack of items after placement of item 618). In some embodiments, in response to determining that the stack of items would be unstable, the computer system may determine to use a spacer in connection with the item 618 (e.g., determine a location at which to place the spacer, an amount of spacer to place, etc.).

As illustrated in FIG. 6D, the spacers used (e.g., in connection with palletization of item 618) may be a plurality of spacers such as pre-cut blocks.

Figure 6E:
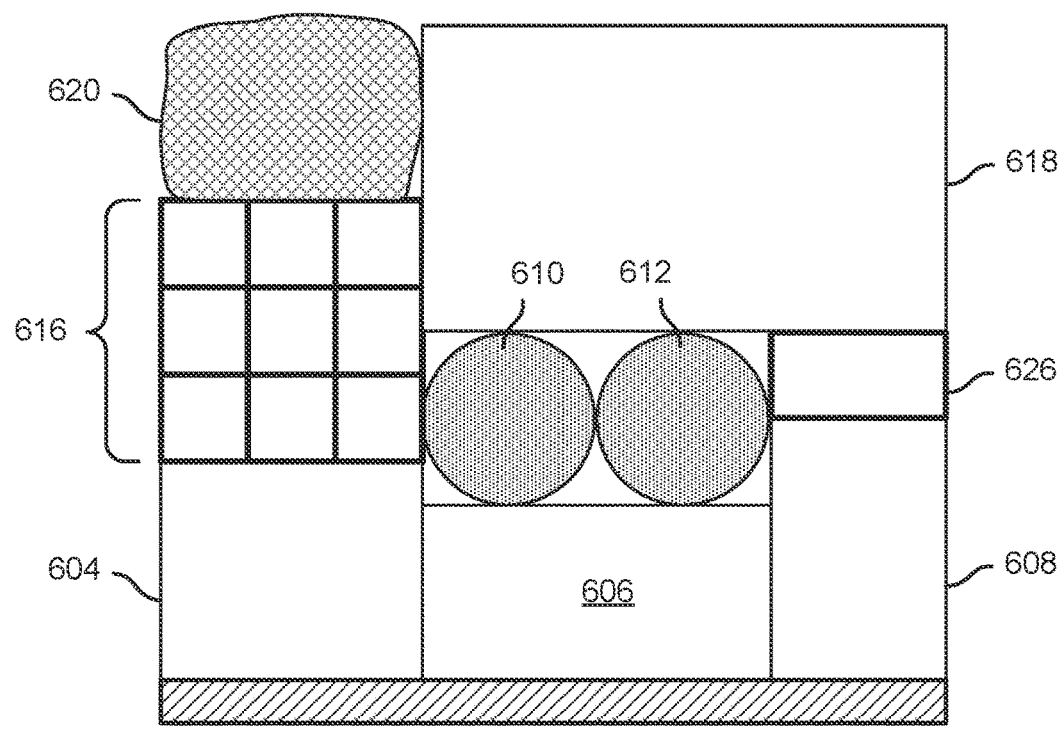
FIG. 6E is a diagram illustrating an example of a pallet as assembled in an embodiment of a robotic system to palletize and/or depalletize heterogeneous items.

FIG. 6E is a diagram illustrating an example of a pallet as assembled in an embodiment of a robotic system to palletize and/or depalletize heterogeneous items. In this example, item 626 (e.g., a spacer) is used in contrast to spacers 625 in FIG. 6D. As illustrated, item 626 (e.g., a spacer) may be a single block such as a precut block or a block that is sized (e.g., cut) by the robotic system (e.g., a tooling of the robotic system such as a cutter on a dispenser device). As an example, item 626 (e.g., a spacer) may be inflated (e.g., with air and/or other fluid) to obtain a spacer of a desired size.

Figure 6F:
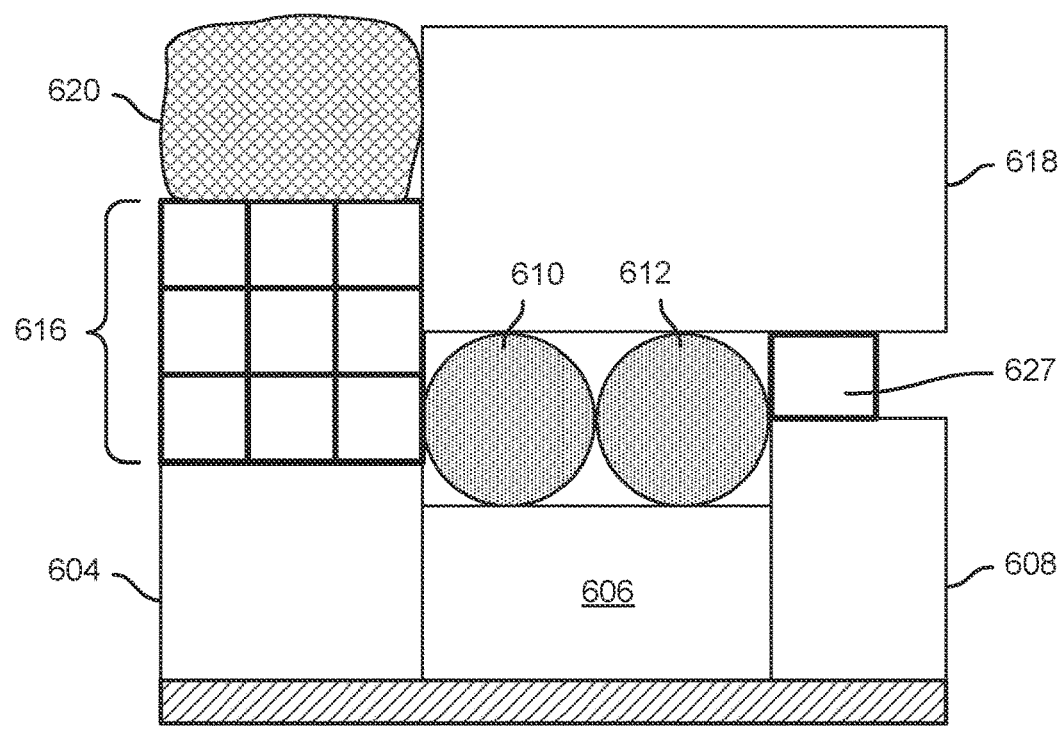
FIG. 6F is a diagram illustrating an example of a pallet as assembled in an embodiment of a robotic system to palletize and/or depalletize heterogeneous items.

FIG. 6F is a diagram illustrating an example of a pallet as assembled in an embodiment of a robotic system to palletize and/or depalletize heterogeneous items. In this example, item 627 (e.g., a spacer) is used in contrast to spacers 626 in FIG. 6E. As illustrated, item 627 may be a smaller spacer that is a size that is determined to cause/form sufficient stability of the stack of items. For example, width of item 627 is smaller than item 626 of FIG. 6E. Item 626 may be sized to provide support of item 618 above the layer of item 608. However, the control computer may determine that an item having the width of item 626 is not necessary in order to attain a stability that is equal to or exceeds a minimum stability threshold.

Figure 6G:
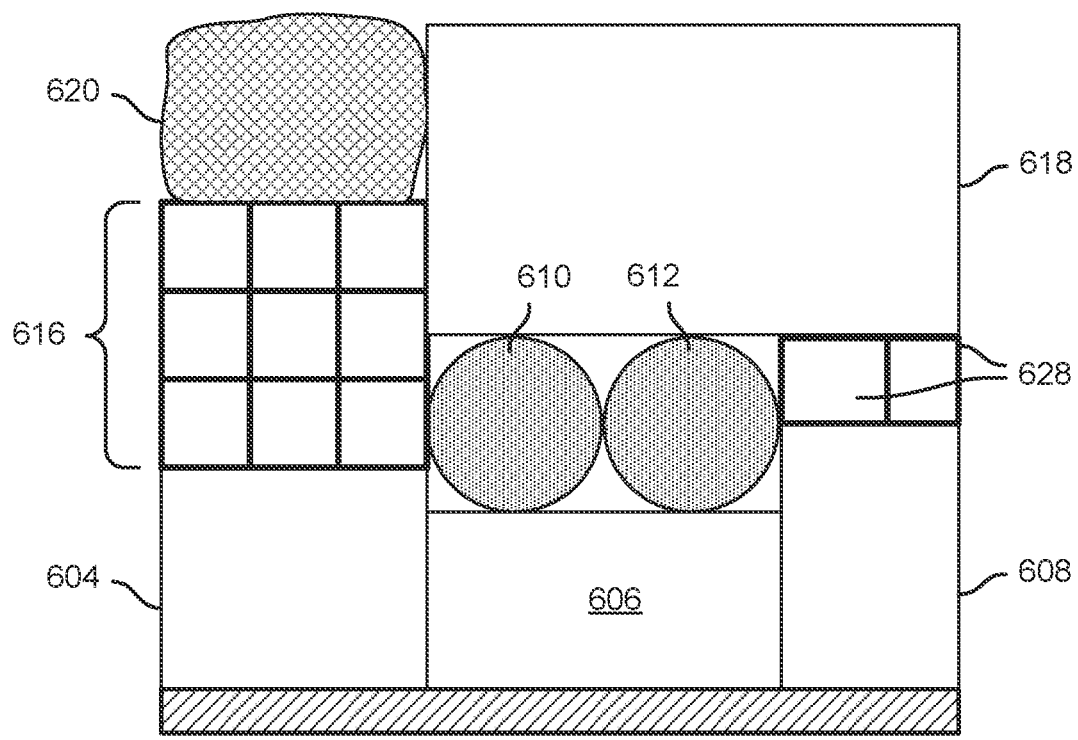
FIG. 6G is a diagram illustrating an example of a pallet as assembled in an embodiment of a robotic system to palletize and/or depalletize heterogeneous items.

FIG. 6G is a diagram illustrating an example of a pallet as assembled in an embodiment of a robotic system to palletize and/or depalletize heterogeneous items. In this example, spacers 628 is used in contrast to spacer 626 in FIG. 6E and spacer 626 in FIG. 6F. As illustrated, spacers 628 may be a plurality of blocks that are combined to provide support over substantially an entire top surface of item 608. In some implementations, the spacers 628 may be precut blocks (e.g., various size blocks may be provided by one or more dispensing devices). In some implementations, at least one block is cut to size (e.g., the individual spacers of spacers 628 are different sizes).

Figure 6H:
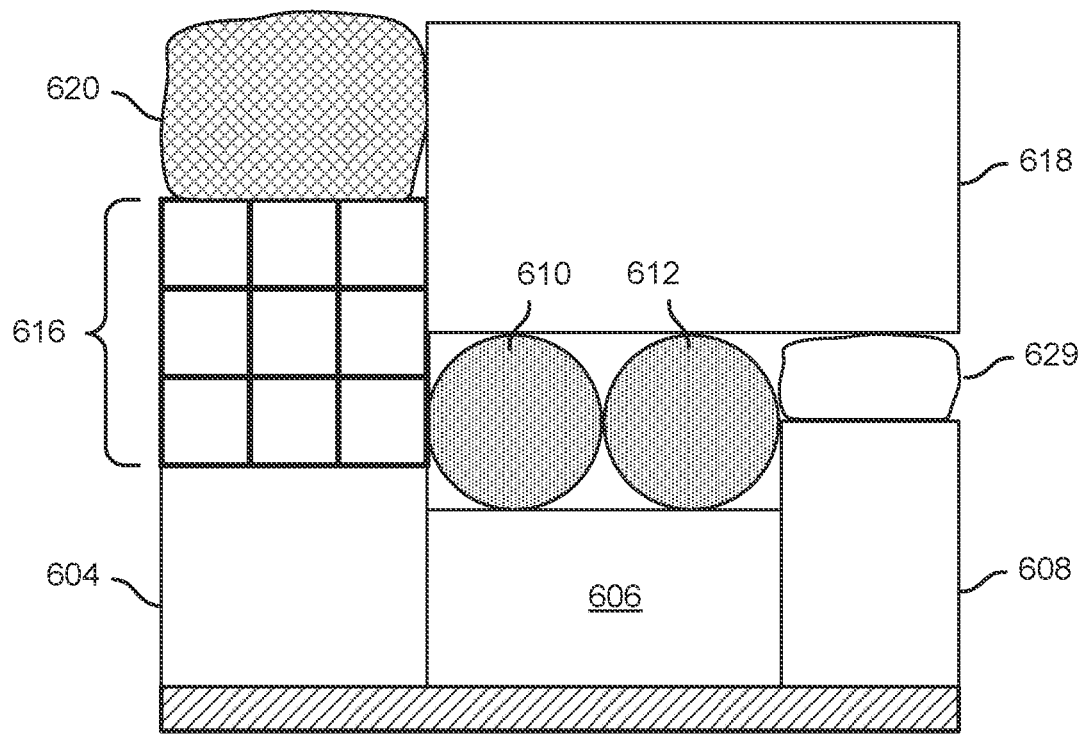
FIG. 6H is a diagram illustrating an example of a pallet as assembled in an embodiment of a robotic system to palletize and/or depalletize heterogeneous items.

FIG. 6H is a diagram illustrating an example of a pallet as assembled in an embodiment of a robotic system to palletize and/or depalletize heterogeneous items. In this example, spacer 629 is used in contrast to spacer 626 in FIG. 6E and spacer 626 in FIG. 6F. As illustrated, spacer 629 may be a polybag or other extruded material that may be inflated or filled to a desired/sufficient size and/or rigidity. Spacer 629 may be filled with one or more fluids. Fluids may include water, air, a gas, etc. In some implementations, spacer 629 may be at least partially filled with a gel.

Figure 7A:
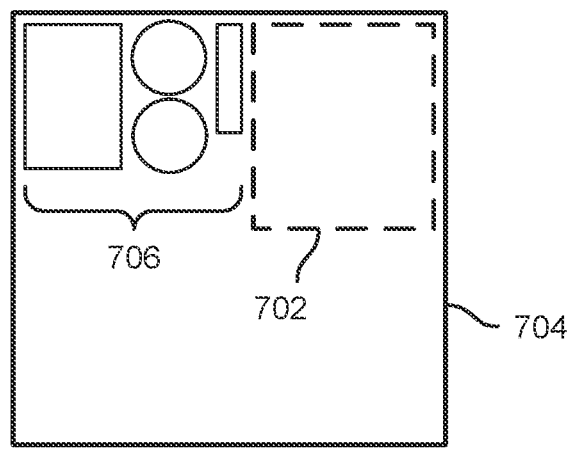
FIG. 7A is a diagram illustrating an example of item placement on a pallet in an embodiment of a robotic system to palletize and/or depalletize heterogeneous items.

FIG. 7A is a diagram illustrating an example of item placement on a pallet in an embodiment of a robotic system to palletize and/or depalletize heterogeneous items. In the example shown, a location 702 has been determined to place an item (not shown in FIG. 6A) on a pallet 704 in a position adjacent to previously placed items 706. For example, the location 702 may have been determined based on item attributes (size, weight, dimensions, etc.), as in 210 of FIG. 2.

Figure 7B:
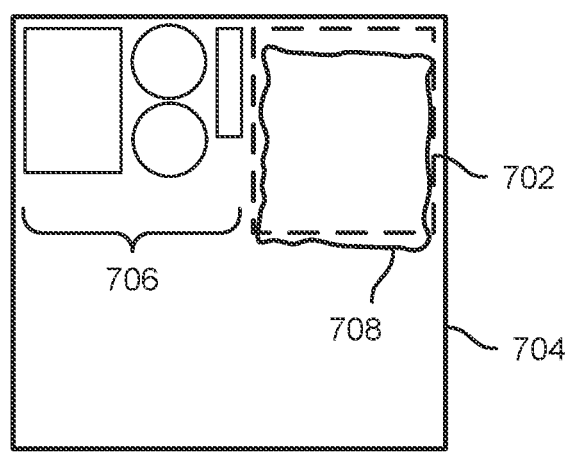
FIG. 7B is a diagram illustrating an example of item placement on a pallet in an embodiment of a robotic system to palletize and/or depalletize heterogeneous items.

FIG. 7B is a diagram illustrating an example of item placement on a pallet in an embodiment of a robotic system to palletize and/or depalletize heterogeneous items. In the example shown, the item 708 has been moved to a first order of accuracy to a position at or near the intended location 702. In this example, the item 708 has a slightly irregular outer texture, which may have resulted in imperfect picking and/or placement of the item at or near location 702. In some embodiments, variations and/or inconsistencies in the image data and/or other sensor data received concerning one or more of location 702, pallet 704, items 706, and item 708 may have resulted in the imperfect placement of item 708 as shown in FIG. 7B.

Figure 7C:
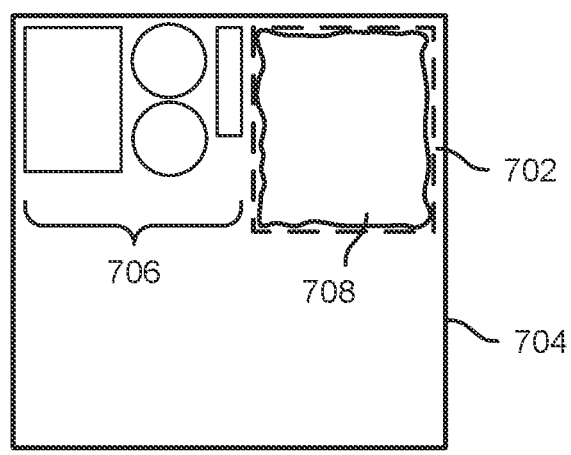
FIG. 7C is a diagram illustrating an example of item placement on a pallet in an embodiment of a robotic system to palletize and/or depalletize heterogeneous items.

FIG. 7C is a diagram illustrating an example of item placement on a pallet in an embodiment of a robotic system to palletize and/or depalletize heterogeneous items. In the example shown, the item 708 has been snugged into a location at or near planned location 702 to a second order of accuracy. In various embodiments, second order sensors, such as force sensors embodied in/on a robotic arm and/or end effector, are used to snug an item into a more tightly fitted position in a stack. For example, the robotic arm may be used to snug an item, such as item 708, to a position more close and in (more complete) contact with adjacent items (e.g., items 706) and/or other structures, such as side walls (in the case of a pallet or trolley that has one or more side walls, for example). According to various embodiments, a machine learning process is implemented to update the strategies and/or plans for performing active measures such as applying pressure to snug the item into position. The machine learning process may be updated/improved dynamically in response to the strategy and/or plan being implemented by one or more robotic systems.

Figure 7D:
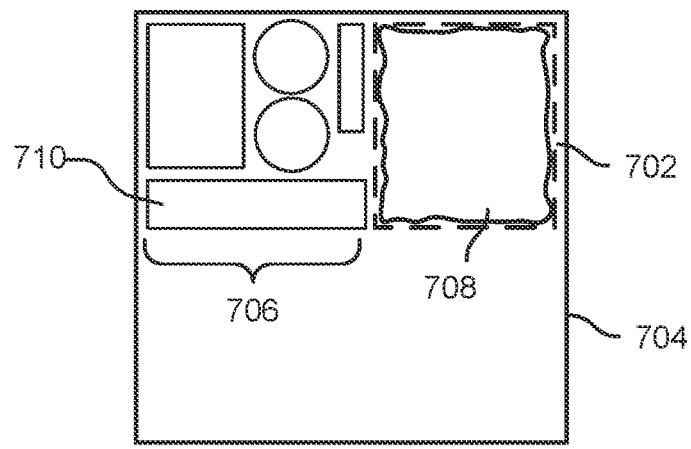
FIG. 7D is a diagram illustrating an example of item placement on a pallet in an embodiment of a robotic system to palletize and/or depalletize heterogeneous items.

FIG. 7D is a diagram illustrating an example of item placement on a pallet in an embodiment of a robotic system to palletize and/or depalletize heterogeneous items. In the example shown, the item 708 has been snugged into a location at or near planned location 702 to a second order of accuracy. In addition, a spacer 710 has been placed within 706 and adjacent to 708. Spacer 710 may be selected/sized based at least in part on a height of a top layer of item 708 and/or items within 706. For example, if the items in 706 have a same top layer height as item 708, then spacer 710 may be selected and placed to form a level top layer across items 706 and 708 (e.g., such that a larger item may be placed widthwise across pallet 704). As another example, if the items in 706 have a different top layer height as item 708, then spacer 710 may be selected and placed to form a level top layer across items 706 (e.g., such that an item may be placed adjacent to item 708, and over items 706 and spacer 710). Spacer 710 may comprise a single pre-cut block.

Figure 7E:
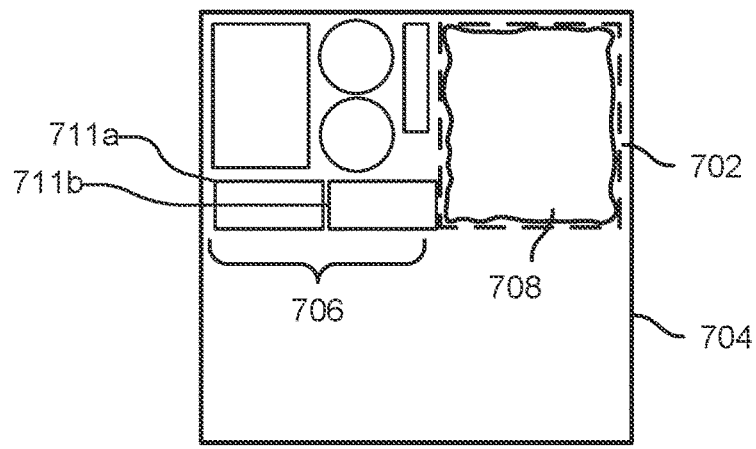
FIG. 7E is a diagram illustrating an example of item placement on a pallet in an embodiment of a robotic system to palletize and/or depalletize heterogeneous items.

FIG. 7E is a diagram illustrating an example of item placement on a pallet in an embodiment of a robotic system to palletize and/or depalletize heterogeneous items. In the example shown, the item 708 has been snugged into a location at or near planned location 702 to a second order of accuracy. In addition, spacer 711 and spacer 711*b* have been placed within 706 and adjacent to 708. Spacer 711 and spacer 711*b* may be selected/sized based at least in part on a height of a top layer of item 708 and/or items within 706. Spacer 711 and spacer 711*b* may respectively comprise a single pre-cut block. In some implementations, spacer 711 and spacer 711*b* may be cut by a cutting or sizing device in the robotic palletization system.

Figure 7F:
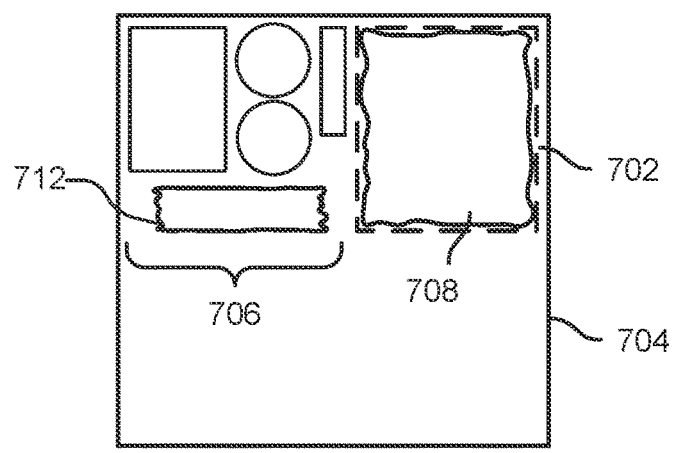
FIG. 7F is a diagram illustrating an example of item placement on a pallet in an embodiment of a robotic system to palletize and/or depalletize heterogeneous items.

FIG. 7F is a diagram illustrating an example of item placement on a pallet in an embodiment of a robotic system to palletize and/or depalletize heterogeneous items. In the example shown, the item 708 has been snugged into a location at or near planned location 702 to a second order of accuracy. In addition, spacer 712 has been placed within 706 and adjacent to 708. Spacer 711 and spacer 711*b* may be selected/sized based at least in part on a height of a top layer of item 708 and/or items within 706. As illustrated, spacer 712 may be a polybag or other extruded material that may be inflated or filled to a desired/sufficient size and/or rigidity. Spacer 629 may be filled with one or more fluids. Fluids may include water, air, a gas, etc. In some implementations, spacer 629 may be at least partially filled with a gel.

Figure 8A:
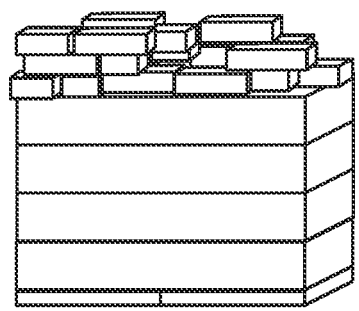
FIG. 8A is a diagram illustrating an example of item placement on a pallet in an embodiment of a robotic system to palletize and/or depalletize heterogeneous items.

FIG. 8A is a diagram illustrating an example of item placement on a pallet in an embodiment of a robotic system to palletize and/or depalletize heterogeneous items. In the example illustrated in FIG. 8A, a pallet is provided in which the items on the top few layers of the pallet are placed without spacers and/or spacer material. As illustrated, the degree of variability in the top surfaces of each of the top few layers is relatively high. In addition, as an item is placed on a higher layer, the item may not be fully supported.

Figure 8B:
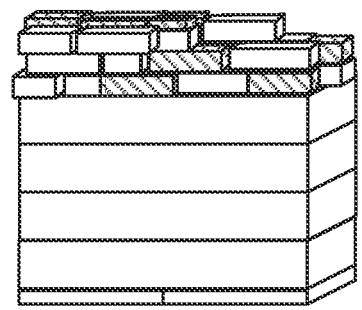
FIG. 8B is a diagram illustrating an example of item and spacer placement on a pallet in an embodiment of a robotic system to palletize and/or depalletize heterogeneous items.

FIG. 8B is a diagram illustrating an example of item and spacer placement on a pallet in an embodiment of a robotic system to palletize and/or depalletize heterogeneous items. In the example illustrated in FIG. 8B, a pallet is provided in which one or more spacers or spacer material is used in connection with palletizing items on the top few layers. As illustrated, the items and spacers provide a higher packing density and the use of spacers/spacer material cause a lower degree of variability in the heights of the top surfaces of the various layers. In addition, as items are placed on a layer, the spacers and/or spacer material provide further support. The stability of the stack of items is thus improved by use of the spacers and/or spacer material.

Figure 9A:
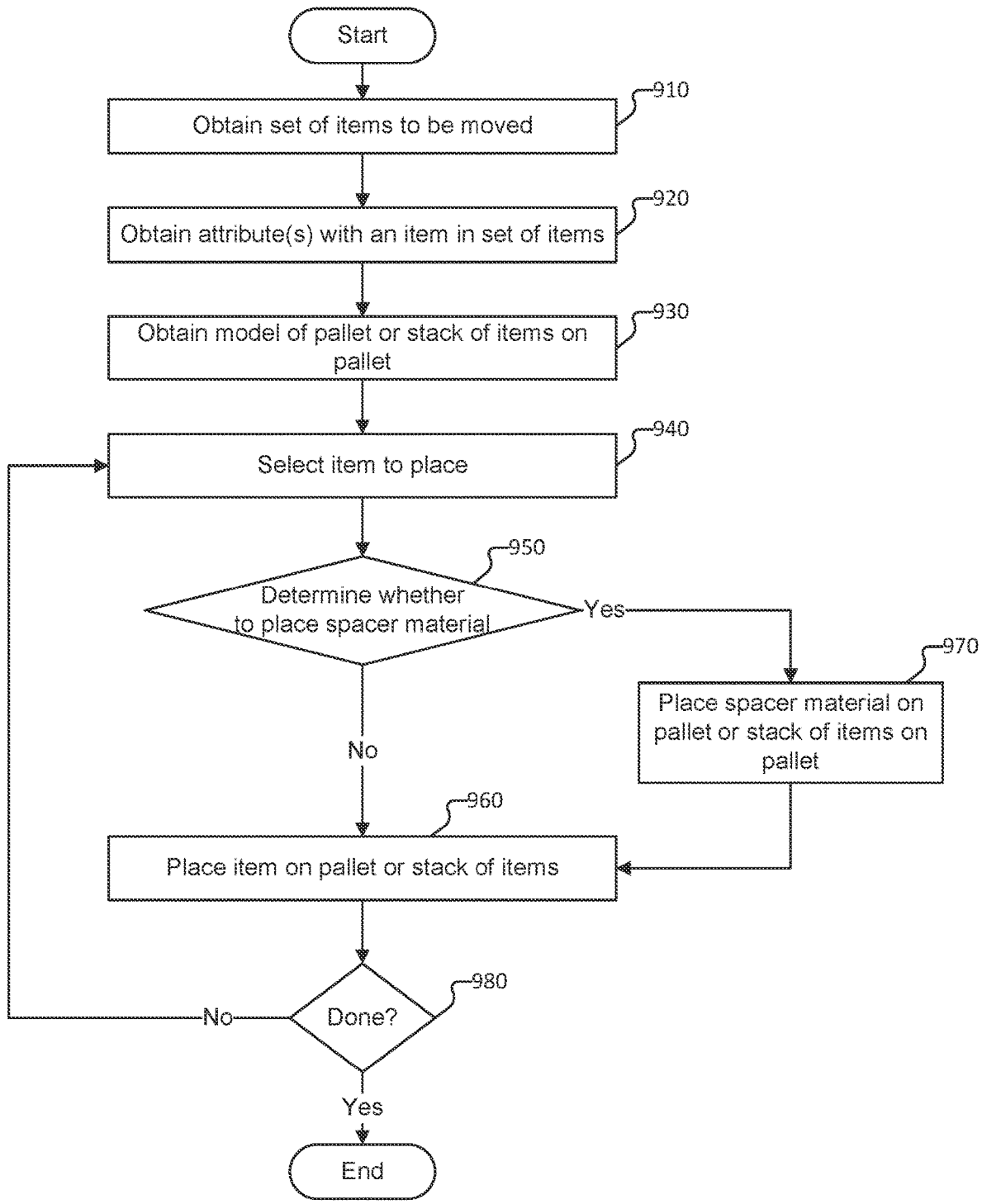
FIG. 9A is a flowchart illustrating a method for palletizing an item according to various embodiments.

FIG. 9A is a flowchart illustrating a method for palletizing an item according to various embodiments.

At 910, a set of items to be moved is obtained. In some embodiments, a robotic palletization system obtains an indication of a set of items to be palletized. The indication of the set of items may be a list, a manifest, etc. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

In some embodiments, the set of items to be moved corresponds to a subset of the set of items to be palletized for an order/manifest. For example, the system may receive an indication of the next N items to be palletized. Referring to the robotic palletization system illustrated in FIG. 4, the set of N items may correspond to the set of items that are currently being moved to within range of the robot arm (e.g., being moved to the workspace). For example, one or more sensors (e.g., a sensor array, other image sensor, etc.) may be disposed at an end of the conveyor(s) and the one or more sensors may obtain one or more attributes pertaining to an item (e.g., as the item is carried on the conveyor or chute that provides the item to the conveyor, and past the range of the one or more sensor). The one or more attributes may comprise an identifier such as a barcode, a QR code, etc. with which the item may be identified. In response to obtaining the one or more attributes pertaining to the item, the system may associate the one or more attributes with the item such as by storing the association in a mapping of attributes to items. In some embodiments, the next N items to be palletized corresponds to the set of items on the conveyors being carried to the robotic system in addition to a set of items in a buffer or queue within the workspace (e.g., items that the robotic system has buffered until a more optimal location on a pallet is formed for placement of the item thereon). The mapping of attributes to items may be stored in a data structure (e.g., a data structure that is accessible by the robotic system).

At 920, one or more attributes associated with at least one item in the set of items is obtained. In some embodiments, the one or more attributes associated with the item are determined based at least in part on the model of the item in the workspace. The model of the item on the workspace may include a relative location of the item with respect to other items in the workspace (e.g., an order in which the item was delivered on the conveyor(s), etc.). In some embodiments, the one or more attributes associated with the at least one item is obtained from a mapping of attributes to items. In some embodiments, the robotic system determines an attribute of an item based at least in part on identifying the item such as by an identifier on the item (e.g., a barcode, a label, a QR code, a logo, etc.), a shape or size (e.g., such as in the case of a set of known items of varying sizes or shapes), etc., and obtaining information in the model pertaining to the item based at least in part on the identifier. The one or more attributes that are obtained in connection with the at least one item may be attributes that are to be used in connection with determining or updating a plan for picking and placing the item. In some cases, the robotic system obtains attributes of a first item within the workspace in connection with determining a plan for moving a second item (e.g., to assess whether or how the first item within the workspace would impact moving of the second item).

In various embodiments, the computer system (e.g., a control computer) uses item model data in a library stored on and/or accessible to computer system to identify an item and/or its attributes, e.g., based on image and/or other sensor data. The computer system uses a model corresponding to an item to determine and implement a plan to stack the item, along with other items, in/on a destination, such as a pallet. In various embodiments, the item attributes and/or model are used to determine a strategy to grasp, move, and place an item in a destination location (e.g., a determined location at which the item is determined to be placed as part of a planning/replanning process to stack items in/on the pallet or stack of items).

At 930, a model of the pallet or stack of items on the pallet is obtained.

In the context of palletizing one or more items, robotic palletization system may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. The robotic palletization system may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected values for certain characteristics of the pallet/stack of items. For example, the expected values may include one or more of expected fits, expected stability (e.g., a stability metric) that is expected to result from placement of the item at the different locations, a packing density, an expected top surface height, an expected cost of moving the item to the corresponding destination location, etc. The robotic palletization system may select a destination location for which the expected fit and/or expected stability satisfies (e.g., exceeds) a corresponding threshold value. Additionally, or alternatively, the robotic palletization system may select a destination location that optimizes the expected fit (e.g., of the item on the stack) and/or expected stability (e.g., of the stack). In some embodiments, the modelling/simulation of the placement of the item includes the modelling/simulation of placing the item at one or more destination locations in connection with using one or more spacers or spacer material. The selection of the of the destination location at which an item is to be placed may be based at least in part on one or more expected values pertaining to the placement of the item and/or state of the stack of items of placement, and the set of possible destination locations or iterations of the modelling/simulating of the placement of the item from which the destination location/plan is selected includes models/simulations in which one or more spacers/spacer material is used (e.g., to improve the expected stability of the item or stack of items).

In the context of de-palletizing one or more items from a pallet (e.g., a stack on the pallet), the robotic system may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, the robotic system may use the model to determine whether removal of an item is expected to cause stability of the state of the pallet (e.g., the stack) to drop below a threshold stability. The robotic system may simulate removal of one or more items from the pallet and select an order from removing items from the pallet that optimizes the stability of the state of the pallet (e.g., the stack). The robotic system may use the model to determine a next item to remove from the pallet. For example, the robotic system may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, the robotic system may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a robotic palletization system implements a machine learning process to model a state of a pallet such as to generate a model of a stack on the pallet. The machine learning process may include an adaptive and/or dynamic process for modeling the state of the pallet. The machine learning process may define and/or update/refine a process by which robotic palletization system generates a model of the state of the pallet. The model may be generated based at least in part on input from (e.g., information obtained from) one or more sensors in robotic palletization system such as one or more sensors or sensor arrays within workspace of a robot (e.g., a robotic arm). The model may be generated based at least in part on a geometry of the stack, a vision response (e.g., information obtained by one or more sensors in the workspace), and the machine learning processes, etc. The robotic palletization system may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator). In some embodiments, the robotic palletization system may use the model in connection with determining whether using one or more spacers/spacer material is expected to improve the state of the stack (e.g., packing density, stability, top surface flatness/variability, etc.). For example, the robotic palletization system may determine whether placing a spacer contemporaneously with placing the next item on the stack of items is expected to improve the state of the stack (e.g., after the item is placed).

According to various embodiments, a machine learning process is implemented in connection with improving grasping strategies (e.g., strategies for grasping an item). The robotic palletization system may obtain attribute information pertaining to one or more items to be palletized/de-palletized. The attribute information may comprise one or more of an orientation of the item, a material (e.g., a packaging type), a size, a weight (or expected weight), or a center of gravity, etc. The robotic palletization system may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, the robotic palletization system may use the information pertaining to the item (e.g., the attribute information, destination location, etc.) to determine a strategy for picking the item. The picking strategy may include an indication of a picking location (e.g., a location on the item at which the robotic arm is to engage the item such as via the end effector). The picking strategy may include a force to be applied to pick the item and/or a holding force by which the robotic arm is to grasp the item while moving the item from a source location to the destination location. The robotic palletization system may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes). The model for determining the destination location and trajectory and/or strategies for placing the item at the destination location may be updated to better reflect strategies that were successful and/or strategies that were not successful, including an association of the strategies and/or historical information with the item subject to such strategy or one or more attributes of such an item.

In some embodiments, a model of items on a pallet may be generated. For example, the model may be generated for the stack of items on a pallet. The model may be updated as a new item is added to the pallet (e.g., placed on the pallet). Alternatively, or additionally, the model may be updated at predefined time intervals that may be configurable by a user/administrator. The model of items with respect to a particular pallet may be modeled each time an item is determined to be picked/placed by a robotic arm, and/or each time the robotic system determines that the item is associated with a manifest corresponding to one or more pallets. However, in some embodiments, the model of items with respect to a pallet may be cached and obtained in response to a determination that an item associated with a manifest is to be moved. The robotic system may obtain the cached model and update the model in response to a determination that one or more other items have been placed on the pallet since the model was generated. In some embodiments, the robotic system updates and caches the model after the robotic arm places an item on the pallet to avoid the model having to be computed/updated at a time that a next item is to be placed on the pallet.

In some embodiments, the robotic system uses the corresponding models of items with respect to the pallets in connection with determining the pallet or stack on which to place the item. For example, the robotic system may simulate/model the placing of the item on one or more of the pallets on which the item may be placed, and determine one or more expected characteristics associated with the pallet or items on the pallet if the item were placed on the pallet. The one or more characteristics associated may comprise one or more of a metric pertaining to a stability of the items on the pallet (e.g., a stability of the stack of item), a metric pertaining to a density of the items on the pallet, a fit of the item relative to other items on the pallet, etc.

In some embodiments, the robotic system uses the corresponding models of items with respect to the pallets in connection with determining whether to use a spacer or spacer material in connection with placing one or more items on the stack. For example, the robotic system may simulate/model the placing of the item on one or more of the pallets on which the item may be placed and one or more spacers, and determine one or more expected characteristics associated with the pallet or items on the pallet if the item and one or more spacers were placed on the pallet. The one or more characteristics associated with the pallet or items on the pallet may comprise one or more of a metric pertaining to a stability of the items on the pallet (e.g., a stability of the stack of item), a metric pertaining to a density of the items on the pallet, a fit of the item relative to other items on the pallet, etc. The robotic system may simulate different plans/strategies for placing the item and/or one or more items such as simulating placement of the item at different locations or one or more spacers at different locations, or in a different sequence, etc. The robotic system may identify a best or optimal plan for placing an item (e.g., a destination location, a number of spacers to use and a location for the spacers, if any, a sequence in placing the item and spacers, if any, etc.). In some embodiments, a plan that has a cost function value that is less than a maximum cost threshold, or a plan that has a stability metric value that exceeds a corresponding minimum stability threshold value, is selected as a plan. For example, a good enough plan for placing the item is selected (e.g., to reduce computational time and cost of simulating large numbers of possible outcomes).

In various embodiments, 3D cameras, force sensors, and other sensors and/or sensor arrays are used to detect and determine attributes of items (and/or spacers or spacer material) to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In various embodiments, a library of item types, respective attributes, and grasp strategies is used to determine and implement a strategy to pick and place each item and/or spacer or spacer material. The library is dynamic in some embodiments. For example, the library may be augmented to add newly encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic palletization system as disclosed herein may engage in a process to gather and store (e.g., add to library) attributes and/or strategies to identify and pick/place an item of unknown or newly discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high-level plan to pick and place items on or in a pallet is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

In some embodiments, in response to determining that no suitable locations on one or more pallets corresponding manifest to which the item belongs currently exist, the robotic system may determine to pick and place the item in a buffer or a staging area. The buffer or staging area may be a preset area within the workspace in which items are at least temporarily stored until the robotic system determines that an ideal location on one of the one or more pallets exists (e.g., a location for which criteria pertaining to stability, fit, and/or efficiency, etc. are satisfied). The robotic system may determine that placing one or more upstream items (e.g., items to be delivered via the conveyor within a threshold time and/or threshold number of items) on the pallet before the current item would result in a better stack (e.g., better fit, stability, efficiency, etc.). In response to such a determination, the robotic structure may control the robotic arm to pick and place the one or more upstream items before picking and placing the current item. As an example, the current item may be moved temporarily to the buffer/staging area while, or until such time that, the robotic arm stacks the one or more upstream items.

The robotic palletization system may comprise one or more sensors or sensor arrays that obtain information pertaining to one or more of a plurality of predefined zones. The one or more sensors or sensor arrays may obtain information pertaining to a pallet disposed within a predefined zone (e.g., an identifier associated with the pallet, a state of the pallet, etc.) and/or a stack of items on the pallet. For example, the one or more sensors or sensor arrays may obtain information from which a stack of one or more items on the pallet in the predefined zone may be modeled. The robotic palletization system may use the information obtained by the one or more sensors or sensor arrays to determine an orientation of a pallet in a corresponding predefined zone, to determine whether an inserted pallet is properly oriented, or otherwise determine to calibrate the robotic palletization system with respect to the pallet inserted into corresponding predefined zone. As an example, in response to determining that the robotic palletization system is to be calibrated with the respect to the pallet, the robotic palletization system may provide a notification to a terminal that the pallet is to be reoriented (e.g., a notification that requests/alerts a human operator to reorient the pallet). As another example, in response to determining that the robotic system is to be calibrated with the respect to the pallet, the robotic system may determine an offset of a current orientation of the pallet (e.g., with respect to a proper orientation of the pallet), and determine a plan or strategy for placing items on the pallet based at least in part on the offset of the current orientation.

The robotic palletization system may store one or more items (e.g., item(s) for an order) in a buffer or staging area while one or more other items are stacked on a pallet. As an example, the one or more items may be stored in the buffer or staging area until such time that the robotic palletization system determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack would is expected to satisfy (e.g., exceeds) a threshold fit or threshold stability, and/or in connection with determining the threshold fit or threshold stability (e.g., the thresholds against which a simulation or model are measured to assess whether to place the item on the stack).

The robotic system may determine a plan for moving the item, including the destination location and information pertaining to use of a spacer (e.g., number of spacers to be used, location of spacer(s), etc.), as corresponding to a plan having the highest corresponding composite score among the different simulations/models for placing the item on the pallet. In some embodiments, the plan for moving the item is determined based at least in part on the simulations and a cost function. For example, a set of plans for which the composite score satisfies (e.g., exceeds) a threshold value may be determined, and the robotic system may select, from among the set of plans, the plans having the most efficient result (e.g., lowest cost) with respect the cost function as the plan used in connection with placing the item. In some embodiments, the set of plans from which the plan (e.g., destination location, number of spacers, location of spacers, etc.) is selected is determined based at least in part on (i) each of the plans having corresponding characteristics that satisfy minimum characteristic values (e.g., characteristic values for fit, stability, efficiency, etc.), and (ii) each of the destination locations having a composite score that satisfies the threshold composite score value.

The stability of the items on a pallet may be impacted by one or more attributes associated with an item. The attributes may include a shape of an item, a center of gravity of an item (or an expected center of gravity of the item), a type of packing (e.g., a cardboard box, a polybag, etc.), a weight of the item, an indication that the item is fragile, etc. As an example, an item that is relatively light or an irregular shaped item may cause a stack of items to be relatively unstable if the item is placed at a lower part of the stack. In the case of an item that is a pillow, the stability of a stack of items may be improved by placing the pillow at the top or near the top of the stack compared to placement of the pillow at the bottom or near the bottom/middle of the stack. The robotic palletization system may obtain one or more attributes associated with an item. For example, the robotic palletization system may obtain the one or more attributes when the item is provided on the conveyor (e.g., as the item is brought within proximity of the robotic arm), or when the item is determined to be the next item to be picked up from the conveyor. In some embodiments, the obtaining the one or more attributes comprises obtaining (e.g., scanning) one or more identifiers on the item, such as a bar code, a QR code, a near field communication label/tag, etc. Attributes may be pre-stored in association with the item, the type of item, etc. For example, in response to obtaining an identifier associated with the item, the robotic system may perform a look up against a mapping of items (or identifiers of items) to attributes. In some embodiments, an attribute is obtained by one or more upstream sensors or computers and stored in association with the item. The robotic system may retrieve from a data structure the attributes associated with an item that were obtained by the one or more upstream sensors. A sensor or sensor array may be used in connection with determining a size of the item. The sensor or sensor array may be disposed on or around the conveyor, or within the workspace of the robotic arm. Additionally, or alternatively, the robotic system may determine one or more attributes associated with the item in response to picking up the item. For example, a weight of the item may be determined in response to picking up the item via one or more sensors such as a force sensor, or a current sensor, or other sensor that measures an amount of work expended to lift the item, etc. As another example, the robotic arm may move the item within a threshold range/area of one or more sensors that may obtain an identifier associated with the item (e.g., a barcode on the item), and the identifier may be used to obtain a pre-stored attribute.

The one or more attributes associated with an item may be used to determine the plan for picking/placing the item. For example, the robotic palletization system may determine a trajectory along which the item is to be moved from a source location (e.g., a location on the conveyor) to the destination location (e.g., the location on the pallet on which the item is to be placed). As another example, the one or more attributes associated with the item may be used in connection with determining the destination location as simulating the placing of the item at different locations on the pallet, or at different locations on different pallets for the corresponding manifest.

In some embodiments, the robotic palletization system determines the plan for moving an item, including the destination location and information pertaining to use of a spacer (e.g., number of spacers to be used, location of spacer(s), etc.) based on an efficiency or cost function associated moving the item from the source location to the destination location. As an example, the robotic palletization system may determine the plan based on an optimization of the efficiency or cost function. As another example, the robotic palletization system may determine the plan such that a minimum efficiency threshold and/or a minimum value threshold of a cost function is satisfied by the corresponding moving of the item from the source location to the destination location. One or more values pertaining to an efficiency of a plan may include an expected time for the robotic arm to move the item, a difference in height between the source location and the destination location, a distance (e.g., a Euclidian distance, etc.) between the source location and the destination location, etc. In some embodiments, a cost function comprises one or more variables pertaining to the picking/placing of the item at the destination location, an expected stability of the stack of items on the pallet (e.g., after the item is placed at the destination location), a measure of fit of the item at the destination location, a number of pallets to be used to palletize all items corresponding to a particular manifest, a number of spacers or amount of spacer material expected to be used, etc. The cost function may include one or more weightings for the one or more variables included in the cost function. The variables included in determining the cost of moving an item may include one or more of (i) an amount of time the robotic arm is expected to take to move the item from the source location to the destination location, (ii) an amount of work that the robotic arm is expected to exert to move the item, (iii) a distance that the item is to be moved, (iv) a path or trajectory along which the item is to be moved, etc., (v) downstream conveyance availability, (vi) one or more characteristics of the item to be moved or an item(s) at the destination location, including item size, item weight, item packaging type, item rigidity, flatness and/or surface uniformity of a destination location surface, a characteristic of item(s) at the destination location (size, weight, packaging types, rigidity, etc.), etc. Various other variables may be included in determining the cost associated with moving the item such as costs associated with the use of spacers or spacer material (e.g., a number of spacers or amount of spacer material expected to be used, etc.). The order of moving a set of items may be determined based on an aggregated cost of moving the set of items (e.g., the individual cost of moving an item in the set of items may be determined, and an aggregated cost of moving the set of items may be determined based on the individual costs). In some embodiments, the variables included in determining a cost of moving an item (e.g., a variable in the cost function) may have different weightings. For example, the time and/or work associated with lifting an item may be greater than the time and/or work associated with lowering an item. Accordingly, even if the distance between lifting an item to a certain location is the same as lowering the item to a different location, the cost associated with moving the item to the different locations may be different.

According to various embodiments, the system determines a plan for moving an item or a set of items based at least in part on an optimization of a cost of moving the item or the set of items subject to one or more conditions. The one or more conditions may include conditions or rules that the system with which the system complies in moving items. Examples of conditions may include one or more (i) a collision between the item and another item/object is avoided during moving, (ii) the item is moved within a predefined area (e.g., to avoid the robotic arm operating in an area reserved for humans or for another robot), (iii) a stability threshold of a stack of items at source location and/or destination location such as based on the moving of the item, (iv) a speed at which the robotic arm moves, (v) a time that the robotic arm is expected to take to move the item, (vi) a likelihood that the item is moved successfully, (vii) a stability of force between the end effector of the robotic arm and the item (e.g., a stability of the grip on the item), etc. Various other conditions may be used in connection with bounding the system for moving.

In some embodiments, a pallet may be deemed to be associated with a robotic arm if the pallet is currently in a predefined zone for the robotic arm and/or planned to be inserted into a predefined zone at a future time when a predefined zone is available. In such as case, the robotic system may determine that the item is to be placed on such a to-be inserted pallet, and the robotic system may determine the plan for picking and placing the item to comprise picking the item from the conveyor and placing the item in a buffer or staging area until such time that the corresponding pallet is inserted into the predefined zone and the item is determined to be placed on such pallet.

According to various embodiments, a set of paths or trajectories for picking and placing an item is determined, and the path or trajectory along which the item is to be moved is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be moved, a destination location at which the item is to be picked, a probability of success that the item is to picked and placed at the destination location according to the particular path or trajectory, an indication of whether another item or object within the workspace intersects with the particular path or trajectory, an indication that a region or area in the workspace is restricted intersects with the particular path or trajectory, etc. In some embodiments, the probability of success that the item is to be picked and placed at the destination location according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability or exceeds a threshold number or percentage of other paths or trajectories within the subset.

According to various embodiments, an item to be palletized/depalletized, a source location from which an item is to be obtained, and/or a destination location may be determined based at least in part on a cost (e.g., a result of a cost function) with moving the item. The cost may be a determined based at least in part on a predefined cost function, which may include one or more variables pertaining to the picking and placing the item. The robotic palletization system may determine an item to be palletized/depalletized, a source location from which an item is to be obtained, and/or a destination location in a manner that optimizes a cost of moving the item and/or that moving an item satisfies one or more cost value thresholds.

At 940, an item to be placed is selected. In some embodiments, the robotic palletization system selects an item to be placed from the set of items to be moved. The item may be selected based at least in part on an order in which the items are moved to the workspace (e.g., to within range of the robot arm). The item may be selected based at least in part on an attribute of the item. For example, the robot system may simulate/model the placement of a subset of items and determine the item to select based on a result of the simulation/model (e.g., that the placement of the selected item may result in a more optimal or cost-effective stack of items).

At 950, a determination of whether to place spacer material is performed. In some embodiments, the robotic palletization system determines whether to place a spacer or spacer material based at least in part on the plan for moving the item (or for moving the previous item, such as if the plan indicated that a spacer or spacer material was to be placed subsequent to the item, etc.). The plan for moving the item may be determined based at least in part on an attribute of the item. For example, the plan for moving the item may be determined in response to a simulation/modelling of the placement of the item. In response to (or in connection with) determining the plan for moving the item, the robotic palletization system determines whether the plan for moving the item includes the use/placement of a spacer or spacer material. For example, determination of whether to place spacer material may be based at least in part on a determination that the use of a spacer or spacer material is expected to improve a state of the stack of items, such as a packing density, a stability, a variation in heights of a top surface of a layer, etc.

In response to a determination that spacer material it not to be placed at 950, process 900 proceeds to 960. At 960, the item is placed on the pallet or stack of items. The robotic system may place the item on the pallet or stack of items based at least in part on the plan for moving the item (e.g., in accordance with a grasping strategy, a trajectory, etc.). In response to placing the item on the pallet or stack of items, process 900 proceeds to 980.

In response to a determination that spacer material is to be performed at 950, process 900 proceeds to 970 at which the spacer material is placed on the pallet or stack of items on the pallet. The robotic system may place the spacer or spacer material on the pallet or stack of items based at least in part on the plan for moving the spacer or spacer material (e.g., in accordance with a grasping strategy, a trajectory, etc.). The plan for moving the spacer or spacer material may be a subset of the plan for moving the item (or for moving the previous item).

In response to a determination that the spacer material has been placed, process 900 proceeds to 960.

In response to placing the item on the pallet or stack of items at 960, process 900 proceeds to 980 at which the robotic system determines whether the placing/palletizing of the items in the set of items is complete. In the example shown, selecting the item to place, determining whether to place spacer material, placing the item, and placing the spacer material as applicable (940, 950, 960, and 970) continue until the high-level objective of palletizing the set of the items is completed (980), at which the process 900 ends. In various embodiments, re-planning may be triggered by conditions such as arrival of an items that is not expected and/or cannot be identified, a sensor reading indicating an attribute has a value other than what was expected based on item identification and/or associated item model information, a stability of the stack of items is determined to be less than a minimum stability threshold value, an indication that a supply of spacer material in the dispenser device (or within the workspace) is less than a minimum spacer supply value, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 9B:
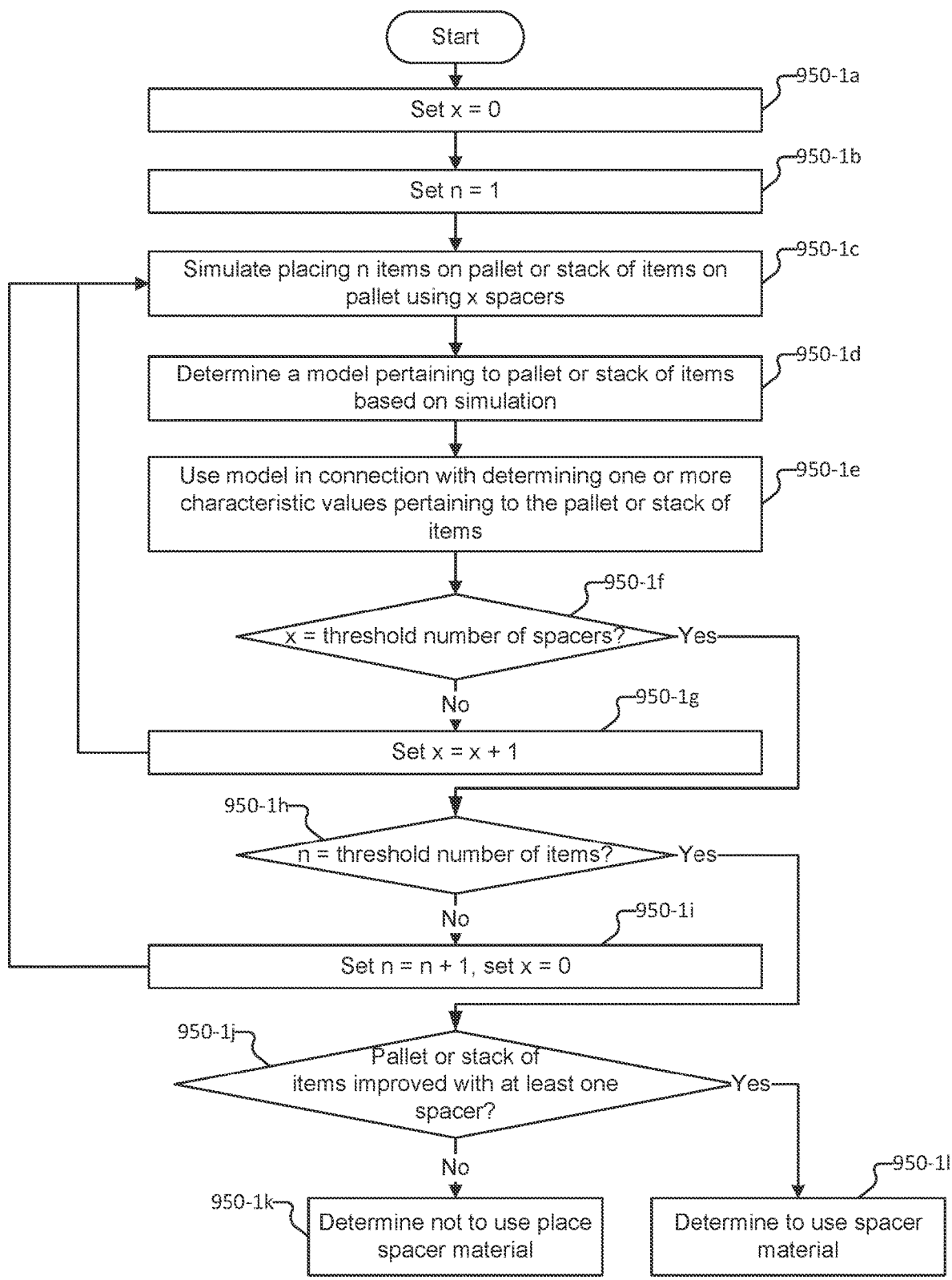
FIG. 9B is a flowchart illustrating a method for palletizing an item according to various embodiments.

FIG. 9B is a flowchart illustrating a method for palletizing an item according to various embodiments. Process 950-1 of FIG. 9B may be implemented in connection with process 900 of FIG. 9A, such as in connection with 950 of process 900.

At 950-1a, x is set equal to zero. The variable x may be used in connection with iteratively simulating placement of an item and 0 or more spacers. In some embodiments, the variable x corresponds to a number of spacers used in the simulation, etc. The variable x may be an integer that is equal to or greater than 0.

At 950-1b, n is set equal to 1. The variable n may be used in connection with iteratively simulating placement of the n items. In some embodiments, the variable x corresponds to a number of spacers used in the simulation, etc. The variable n may be an integer that is equal to or greater than 1 and less than N, which is an integer representing a number of items to be palletized.

At 950-1c, a simulation of placing n items on the pallet or stack of items using x spacers (or x quantity of spacer material) is performed. In some embodiments, the robotic palletization system simulates placing the item(s) and spacer(s) based at least in part on the model of the stack of items (e.g., a model corresponding to a current state of the pallet or stack of items). The simulation of the placing n items on the pallet or stack of items using x spacers may include determining one or more plans for moving the item(s) and/or spacer(s), and simulating the placement of the item(s) and/or spacer(s) in accordance with the corresponding one or more plans.

At 950-1d, a model pertaining the pallet or stack of items is determined based at least on the simulation. In some embodiments, an updated model including the simulated placed item(s) and/or spacer(s) is generated based on the simulation. The model may be updated using a machine learning algorithm or process.

At 950-1e, one or more characteristics pertaining to the pallet or stack of items is determined based at least in part on the model. For example, the model generated in response to simulation of the placing of item(s) and/or spacer(s) to the stack of items is used in connection with determining one or more characteristics pertaining to the pallet or stack of items. The one or more characteristics pertaining to the pallet or stack of items may include characteristic values or measures for fit (e.g., of the item relative to other items on the pallet), stability, packing density, efficiency, cost.

At 9501-f, the system determines whether x is equal to the threshold number of spacers. In some embodiments, the threshold number of spacers is predefined such as by a user or administrator. In some embodiments, the threshold number of spacers is determined based at least in part on a cost function associated with use of spacers in connection with placing an item. For example, if a cost of using x spacers exceeds (or is within a defined amount) of a maximum cost value, then the system may determine that the threshold number of spacers has been reached.

In response to a determination that x does not equal the threshold number of spacers at 950-1f, process 950-1 proceeds to 950-1g at which x is incremented, and 950-1c, 950-1d, 950-1e, and 950-f are iteratively performed until x equals the threshold number of spacers.

In response to a determination that x is equal to the threshold number of spacers at 950-1f, process 950-1 proceeds to 950-1h at which the system determines whether n is equal to the threshold number of items. In some embodiments, the threshold number of items is predefined such as by a user or administrator. The threshold number of items may be set to be N, corresponding to the number of items in the buffer or for which the system has knowledge that are forthcoming for palletization. In some embodiments, the threshold number of items is determined based at least in part on a cost function associated with performing a simulation. For example, the deeper or further out the system computes potential outcomes for placing items (e.g., the greater the number the items for which the system computes possible outcomes) the greater the time to complete such computation/simulation, and the greater the computational power required for such computation/simulation.

In response to a determination that x does not equal the threshold number of items at 950-1h, process 950-1 proceeds to 950-1i at which n is incremented, and 950-1c, 950-1d, 950-1e, 950-f, 950-g, and 950-h are iteratively performed until n equals the threshold number of items.

In response to a determination that n is equal to the threshold number of items at 950-1h, process 950-1 proceeds to 950-1j at which the system determines whether the pallet or stack of items is improved with the use of at least one spacer. In some embodiments, the robotic palletization system may determine to use the at least one spacer in connection with placing the item selected at 940 of process 900 based at least in part on the simulation of the placement of selected item and future items iteratively performed using different numbers of spacers. The result of the models/simulation may be used in the determining whether the pallet or stack of items is improved with the at least one spacer.

In some embodiments, the determination of whether the pallet or stack of items is improved with the use of at least one spacer is based at least in part on a comparison between (i) a result of the simulation of one or more items (e.g., n items) with no spacers with, and (ii) a result of one or more simulation of one or more spacers. The result of the simulation may be an updated model and/or one or more characteristics pertaining to the pallet or stack of items of the corresponding model. The one or more one or more characteristics pertaining to the pallet or stack of items may include characteristic values or measures for fit (e.g., of the item relative to other items on the pallet), stability, packing density, efficiency, cost.

In response to a determination that the pallet or stack of items is not improved with at least one spacer at 950-1j, process 950-1 proceeds to 950-1k at which the robotic palletization system determines to not use spacer material. In some embodiments, at 950-1k, the robotic palletization system may provide to 950 of process 900 of FIG. 9A an indication of that spacer material is not to be used in connection with palletizing the selected item.

In response to a determination that the pallet or stack of items is improved with at least one spacer at 950-1j, process 950-1 proceeds to 950-11 at which the robotic palletization system determines to use spacer material. In some embodiments, at 950-11, the robotic palletization system may provide to 950 of process 900 of FIG. 9A an indication of whether to use spacer material and an indication of a quantity or amount of spacers/spacer material. The robotic system may also provide an indication of a location at which the spacer(s) and/or spacer material is to be placed. In some embodiments, a plan for placing the spacer(s) and/or spacer material is provided to 950 of process 900 of FIG. 9A.

Figure 9C:
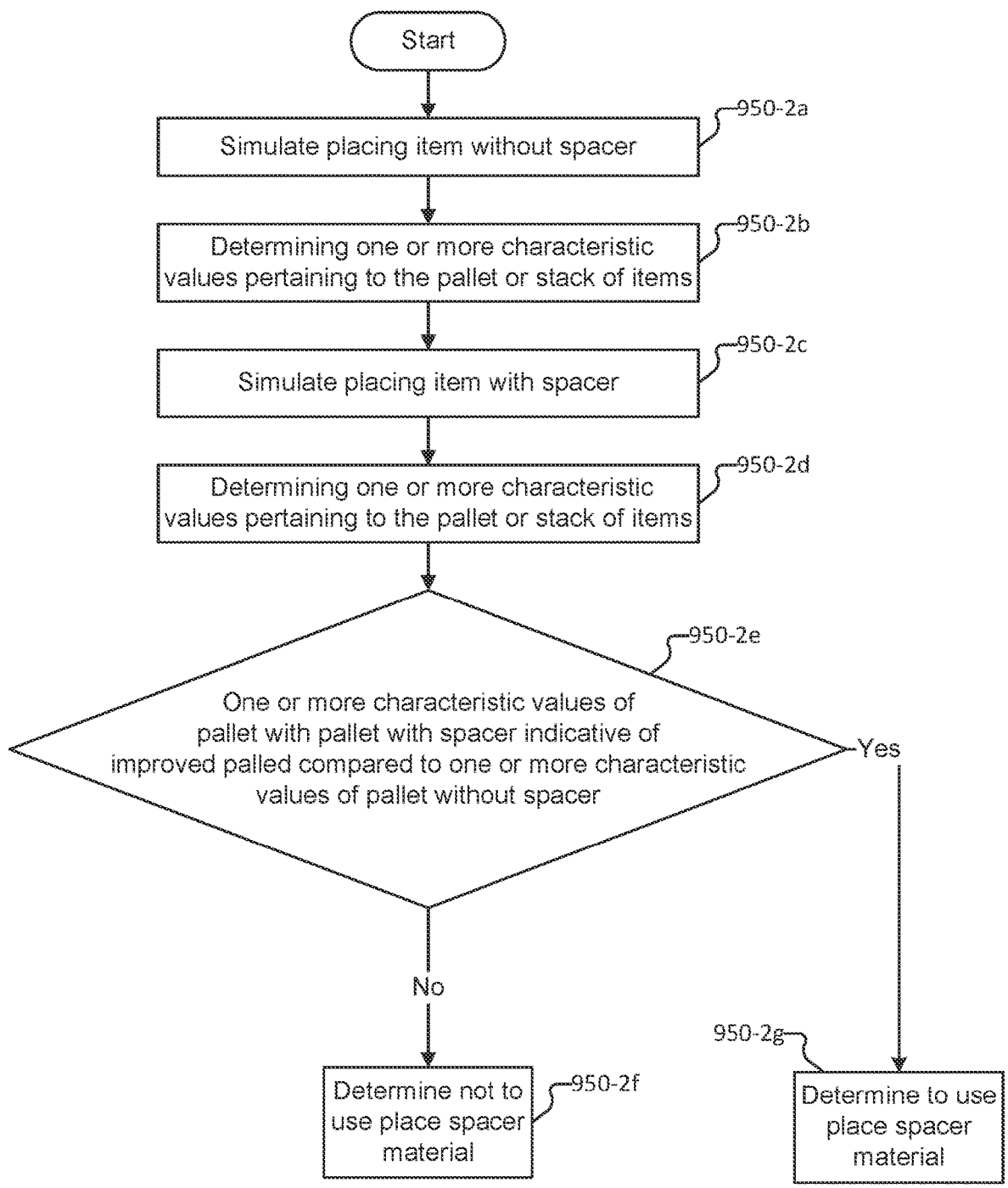
FIG. 9C is a flowchart illustrating a method for palletizing an item according to various embodiments.

FIG. 9C is a flowchart illustrating a method for palletizing an item according to various embodiments. Process 950-2 of FIG. 9C may be implemented in connection with process 900 of FIG. 9A, such as in connection with 950 of process 900.

At 950-2a, a simulation of placing the item without a spacer (or spacer material) is performed. The simulation of the placing the item without the spacer may include obtaining a model pertaining to a current state of the pallet or stack items, simulating the placement of the item, and determining an updated model. The updated model may be indicative of an expected state of the pallet or stack of items after the item has been placed.

At 950-2b, a first set of one or more characteristic values pertaining to the pallet or stack of items is determined. The first set of one or more characteristics pertaining to the pallet or stack of items may include characteristic values or measures for fit (e.g., of the item relative to other items on the pallet), stability, packing density, efficiency, cost. In some embodiments, the one or more characteristic values are obtained based at least in part on the updated model (e.g., the updated model generated at 950-2b, which may also be referred herein as the updated model without spacer).

At 950-2c, a simulation of placing the item with one or more spacers (or spacer material) is performed. The simulation of the placing the item with the one or more spacers may include obtaining a model pertaining to a current state of the pallet or stack items, simulating the placement of the item and one or more spacers and determining an updated model (which may also be referred to herein as updated model with spacer). The updated model may be indicative of an expected state of the pallet or stack of items after the item and one or more spacers have been placed. In some embodiments, the simulation is performed in connection with the palletization of the item in conjunction with a single spacer or a predetermined amount of spacer material. In some embodiments, the simulation is performed in connection with the palletization of the item in conjunction with a predefined plurality of spacers. In some embodiments, the simulation is performed in connection with the palletization of the item in conjunction with a best estimate of a number of spacers or amount of spacer material to use. The best estimate of a number of spacers or amount of spacer material to use may be determined based on a machine learning process that is trained using historical information pertaining to the use of spacer(s) and the palletization of items, and/or the stability of a stack of items.

At 950-2d, a second set of one or more characteristic values pertaining to the pallet or stack of items is determined. The second set of one or more characteristics pertaining to the pallet or stack of items may include characteristic values or measures for fit (e.g., of the item relative to other items on the pallet), stability, packing density, efficiency, cost. In some embodiments, the second set of one or more characteristic values are obtained based at least in part on the updated model with spacer.

At 950-2e, the first set of one or more characteristic values are compared with the second set of one or more characteristics values in connection with determining whether the second set of one or more characteristics values are indicative of an improved pallet or stack of items. In some embodiments, the robotic palletization system determines whether the use of one or more spacers is expected to result in an improved pallet or stack of items based at least in part on a comparison of the first set of one or more characteristic values and the second set of one or more characteristic values.

In some embodiments, the comparison of the first set of one or more characteristic values and the second set of one or more characteristic values includes determining a first composite score corresponding to the first set of one or more characteristic values, and a second composite score corresponding to the second set of one or more characteristic values. The first composite score and the second composite score may respectively aggregate the corresponding characteristics values (e.g., according to a cost or goodness function). The determining a composite score corresponding to the set of one or more characteristic values may include obtaining weightings for the one or more characteristic values, determining weighted one or more characteristic values based on the weightings and the one or more characteristic values, and determining the composite score based on the weighted one or more characteristic values (e.g., summing the weighted one or more characteristic values).

In response to determining that the second set of one or more characteristics values are not indicative of an improved pallet or stack of items (e.g., that the use of a spacer did not improve the expected pallet or stack of items) at 950-2e, process 950-2 proceeds to 950-1f at which the robotic palletization system determines to not use spacer material. In some embodiments, at 950-2f, the robotic palletization system may provide to 950 of process 900 of FIG. 9A an indication of that spacer material is not to be used in connection with palletizing the selected item.

In response to determining that the second set of one or more characteristics values are indicative of an improved pallet or stack of items (e.g., that the use of a spacer did not improve the expected pallet or stack of items) at 950-2e, process 950-2 proceeds to 950-1g at which the robotic palletization system determines to use spacer material. In some embodiments, at 950-2g, the robotic palletization system may provide to 950 of process 900 of FIG. 9A an indication of whether to use spacer material and an indication of a quantity or amount of spacers/spacer material. The robotic system may also provide an indication of a location at which the spacer(s) and/or spacer material is to be placed. In some embodiments, a plan for placing the spacer(s) and/or spacer material is provided to 950 of process 900 of FIG. 9A.

Figure 10A:
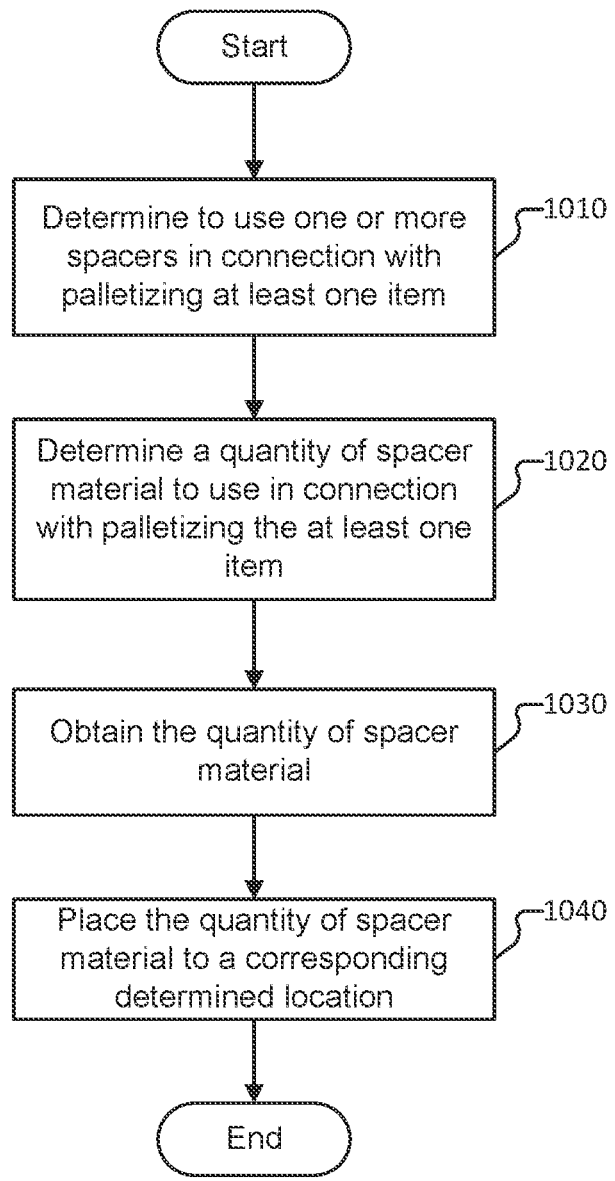
FIG. 10A is a flowchart illustrating a method for placing a spacer in connection with palletizing one or more items according to various embodiments.

FIG. 10A is a flowchart illustrating a method for placing a spacer in connection with palletizing one or more items according to various embodiments. In some embodiments, process 1000 of FIG. 10A may be performed in connection with a palletizing of a set of items.

At 1010, one or more spacers are determined to be used in connection with palletizing at least one item. In some embodiments, the robotic palletization system determines that one or more spacers are to be used in connection with palletizing at least one item based at least in part on a determination that the use of the one or more spacers is expected to improve the stack of items (e.g., a stability of the stack, a packing density of the stack, a variation in top surfaces of one or more layers, etc.). The determination that one or more spacers are to be used in connection with palletizing at least one item is based at least in part on a simulation placing of the item. The robotic system may further determine a model of an expected stack of items and one or more characteristic values pertaining to the expected stack of items. The one or more characteristic values pertaining the expected stack of items may correspond to one or more measures of goodness of the expected stack of items.

At 1020, a quantity of spacer material to use in connection with palletizing the at least one item is determined. The quantity of spacers/spacer material may be selected/determined based on a variation (e.g., an expected variation) of the height of the top surface of item relative to top surface of another item. For example, the quantity of spacers/spacer material may be selected in order to form a substantially flat. The quantity of the spacer material to use may be based on one or more simulations of palletizing the at least one item using different amounts/quantities of spacer material, and selecting the amount/quantity of spacer material for which the expected stack of items was best (e.g., most stable, most cost effective while satisfying a minimum stability threshold, etc.).

At 1030, the quantity of spacer material is obtained. In some embodiments, the robotic palletization system controls a dispensing device to dispense the quantity of spacer material. For example, the robotic palletization system may provide a control signal to the dispenser device (e.g., dispenser device 126 of robotic system 100) to cause an actuator to cause the quantity of spacer material to be dispensed. In some implementations, the quantity of spacer material may be dispensed to the robot arm (e.g., the robot arm may grab the spacer material from the dispenser device, or the dispenser device may dispense the spacer material within proximity of an end effector of the robot arm, which thereafter engages the spacer material). In some implementations, the quantity of spacer material may be dispensed to a predefined location within the workspace of the robot arm. In some implementations, the quantity of spacer material may be dispensed to a location indicated in connection with the control signal to dispense the spacer material. In some embodiments, the robotic palletization system sizes the spacer material (e.g., uses tooling to cut the spacer material from a precursor such an aggregate block of spacer material, or inserts a fluid into a precursor to cause the spacer material to expand to a desired size/shape).

At 1040, the quantity of spacer material is placed at a corresponding determined location. In some embodiments, the robotic palletization system may determine a plan for placing the quantity of spacer material. The plan for placing the quantity of spacer material may be determined as part of a plan for palletizing the at least one item (e.g., the placing the quantity of spacer material may be a subroutine/part of the plan for palletizing the at least one item). In some embodiments, the robotic palletization system may determine the plan for placing the quantity of spacer material in response to a determination that the one or more spacers are to be used. For example, an active measure performed in response to a detection that a stack of items is unstable or does not satisfy a minimum stability threshold may include determining to use one or more spacers to improve the stability of the stack of items. The plan for placing the spacer material may include a grasping strategy, a trajectory, and a destination location at which the spacer material is to be placed.

Figure 10B:
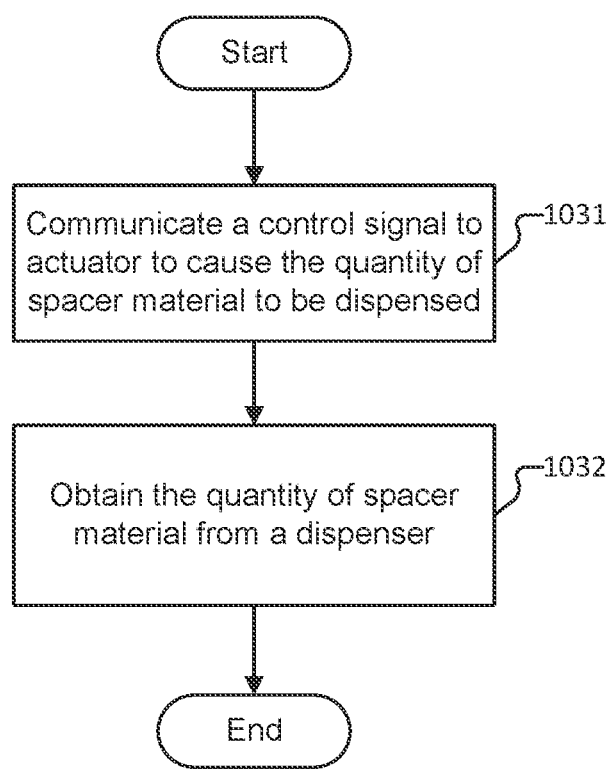
FIG. 10B is a flowchart illustrating a method for obtaining a spacer in connection with palletizing one or more items according to various embodiments.

FIG. 10B is a flowchart illustrating a method for obtaining a spacer in connection with palletizing one or more items according to various embodiments. 1030 of FIG. 10B may be implemented in connection with 1030 of FIG. 10A.

At 1031, a control signal is communicated to an actuator to cause the quantity of spacer material to be dispensed.

At 1032, the quantity of spacer material is obtained from the dispenser (e.g., the dispenser device). The obtaining the quantity of spacer material from the dispenser may comprise obtaining the spacer material from a location to which the dispenser dispensed the quantity of spacer material.

Figure 10C:
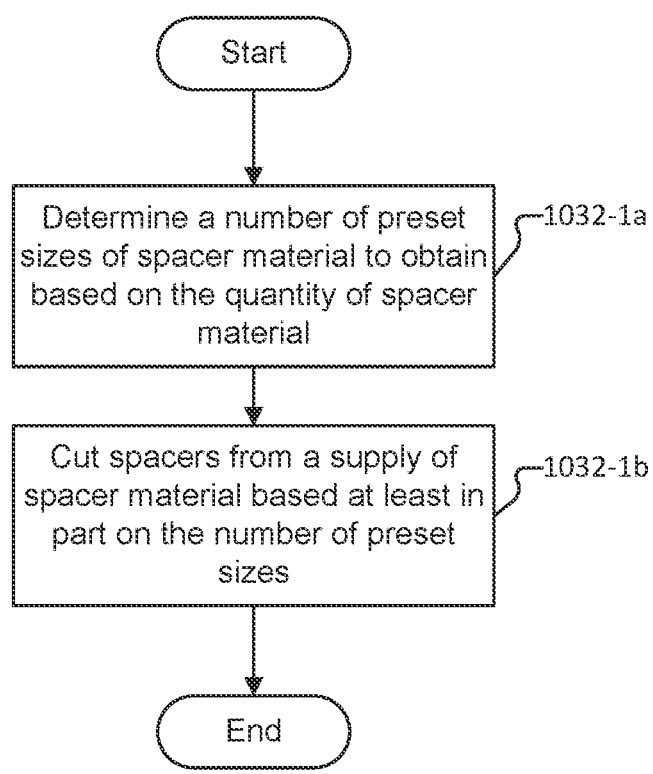
FIG. 10C is a flowchart illustrating a method for obtaining a spacer in connection with palletizing one or more items according to various embodiments.

FIG. 10C is a flowchart illustrating a method for obtaining a spacer in connection with palletizing one or more items according to various embodiments. 1032-1 of FIG. 10C may be implemented in connection with 1032 of 1030 of FIG. 10B.

At 1032-1, a number of preset sizes of spacer material to obtain is determined based at least in part on the quantity of spacer material. In response to determining a quantity of spacer material to use in connection with palletizing the at least one item, the robotic palletization system may determine the number of preset sizes of spacer material correspond to the quantity of spacer material. For example, if the dispenser device comprises a plurality of precut blocks of a particular size, the robotic palletization system may determine the number of precut blocks required to obtain the quantity of spacer material. In some embodiments, the determining the quantity of spacer material corresponds to determining a number of precut blocks (e.g., precut spacers).

At 1032-1b, spacers are cut from a supply of spacer material based at least in part on the number of preset sizes. In some embodiments, in response to determining the number of preset sizes of spacer material to be obtained, the robotic palletization system controls a tooling or device to cut the number of preset sizes of spacer material from a supply of spacer material (e.g., a precursor block of spacer material, a roll of space material, etc.).

Figure 10D:
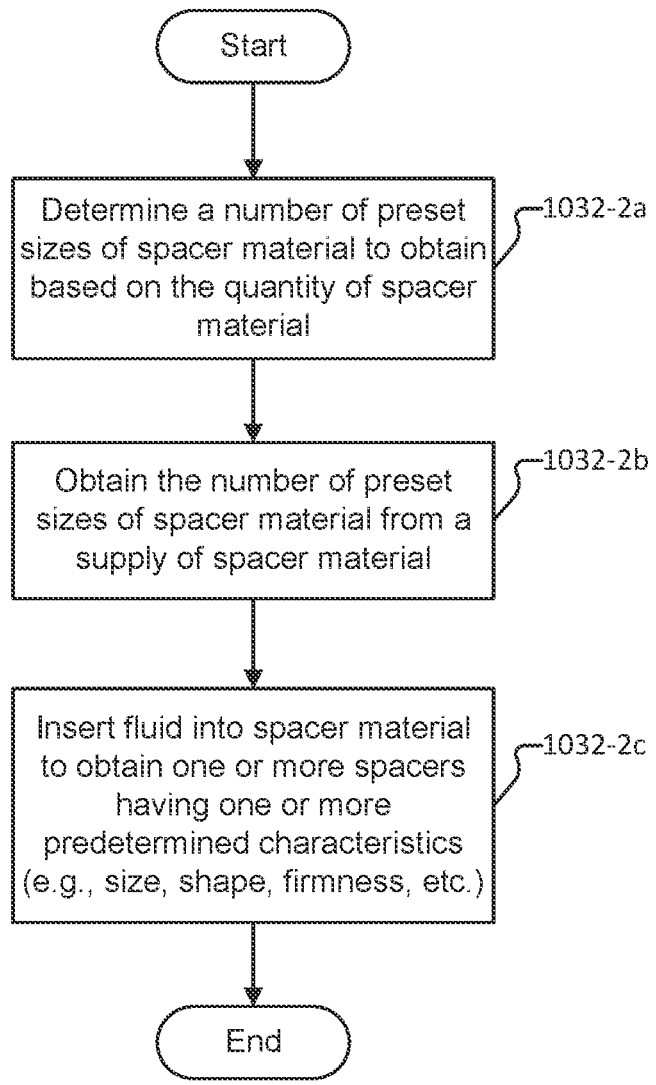
FIG. 10D is a flowchart illustrating a method for obtaining a spacer in connection with palletizing one or more items according to various embodiments.

FIG. 10D is a flowchart illustrating a method for obtaining a spacer in connection with palletizing one or more items according to various embodiments. 1032-2 of FIG. 10D may be implemented in connection with 1032 of 1030 of FIG. 10B.

At 1032-2a, a number of preset sizes of spacer material to be obtained is determined based at least in part on the quantity of spacer material. In response to determining a quantity of spacer material to use in connection with palletizing the at least one item, the robotic palletization system may determine the number of preset sizes of spacer material correspond to the quantity of spacer material. The number of preset sizes of spacer material may be based at least in part on a mapping of preset size of spacer material to size of spacer (e.g., a size of the spacer after inflation using a fluid, gel, etc.). For example, if the dispenser device comprises a plurality of pre-sized extruded material such as delated polybags, the robotic palletization system may determine the number of deflated polybags that may be inflated to obtain the quantity of spacer material. In some embodiments, the robotic palletization system comprises a model for obtaining a spacer (e.g., a spacer material) from a precursor of spacer material.

At 1032-2b, the number of preset sizes of spacer material are obtained from a supply of spacer material.

At 1032-2c, a fluid is inserted into a spacer material to have one or more predetermined characteristics. In some embodiments, the fluid comprises one or more of a gas such as air, etc., a liquid such as water or other solution, etc. The one or more predetermined characteristics may comprise one or more of a size, a shape, a firmness, etc.

Figure 11A:
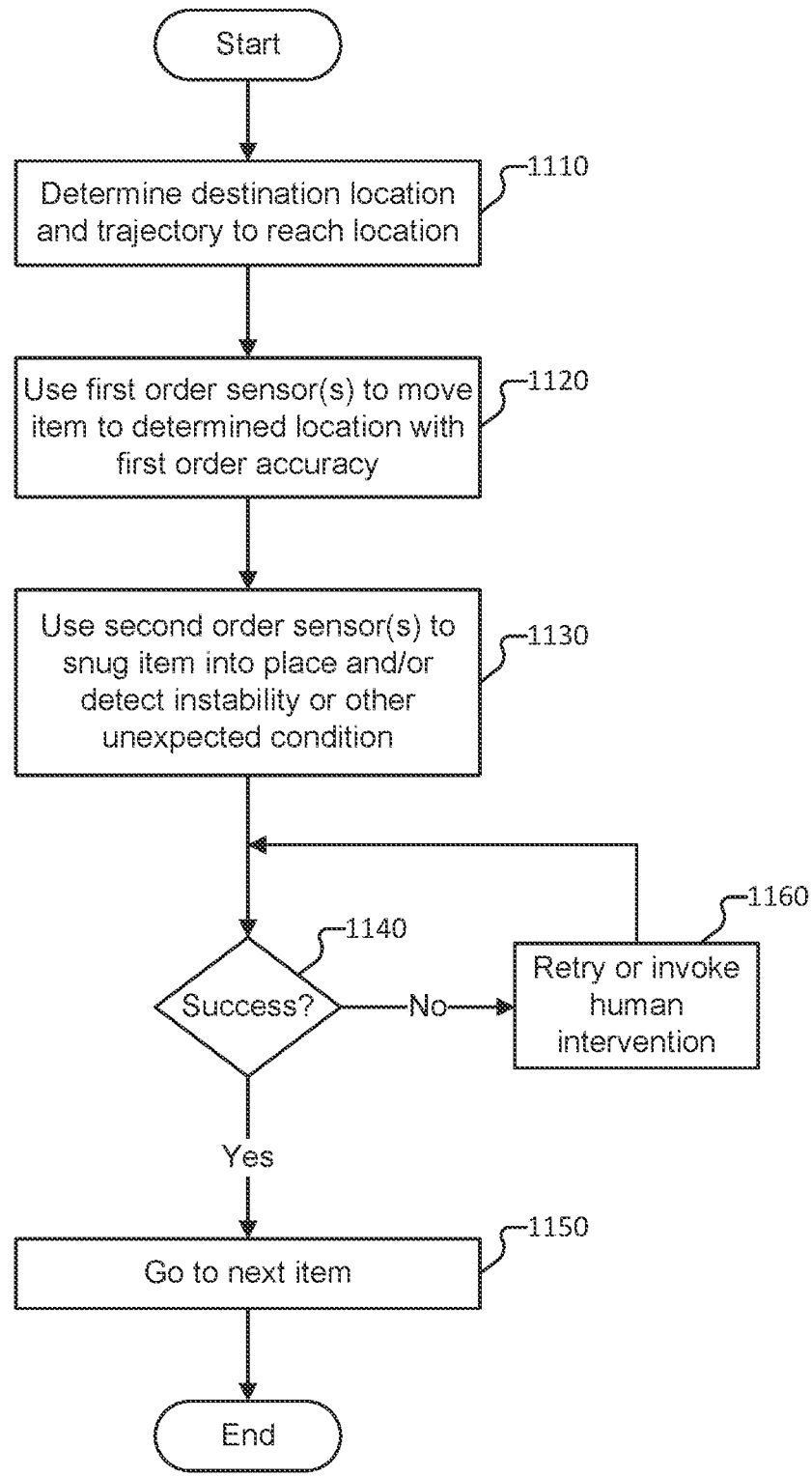
FIG. 11A is a flow chart illustrating an embodiment of a process to place an item on a pallet.

FIG. 11A is a flow chart illustrating an embodiment of a process to place an item on a pallet. In various embodiments, the process 1100 is performed by a control computer, such as control computer 118 of FIG. 1A and/or a control computer of system 400 of FIG. 4A, e.g., to pick and place successive items according to a plan.

In the example shown, at 1110 a destination location and trajectory to reach the location are determined for a next item to be picked and placed. For example, a predetermined (e.g., according to a plan) and/or a dynamically determined (e.g., based on item identification, sensor data, locations of previously placed items, etc.) location and a trajectory or path along which the item is to be moved to that location may be determined. At 1120, one or more first order sensors (e.g., image data) are used to move the item to the destination location with first order accuracy (e.g., as in the example shown in FIG. 7B). At 1130, one or more second order sensors (e.g., force sensors) are used to snug the item into place (as in FIG. 7C) and/or to detect instability (as in FIG. 5B) or other unexpected conditions. If the item is determined at 1140 to have been placed successfully, at 1110 processing continues with a next item, with respect to which a next iteration of the process 1100 is performed. If the item is determined at 1140 not to have been placed successfully (e.g., item not in expected location as determined by image data, item not stable, stack not stable, etc.), then at 1160 the system tries again via automated processing to securely place the item, e.g., if a further strategy to attempt to do so is available, and/or human intervention is invoked (e.g., via on demand teleoperation) until the item is determined at 1140 to have been placed successfully.

In some embodiments, at 1160, the robotic palletization system determines whether to use a spacer in connection with placing the item or to improve the detected instability. In response to determining to use a spacer, the robotic palletization system may determine a plan for placing the spacer, and implement the plan for placing the spacer.

In various embodiments, a robotic palletization system as disclosed herein is configured to make and/or update dynamically a plan to place and stack items. For example, the next item(s) to be placed may not be known ahead of time, and adjustments to the plan may be required. For example, if soft and/or fragile items have been placed or planned to be placed in a lower layer and heavier items are detected to be arriving (next), the plan may be adjusted dynamically to buffer (set aside in a staging area) the soft and/or fragile items, allowing the heavier items to be placed in the lower level first. In some embodiments, if the soft and/or fragile items have already been placed (e.g., on the pallet), the items may be removed to the buffer (staging) area to allow the heavier items to be placed in the lower level in their place.

According to various embodiments, a machine learning process may be used in connection with updating the process or model for determining the destination location and trajectory and/or strategies for placing the item at the destination location. For example, the model for determining the destination location and trajectory and/or strategies for placing the item at the destination location to better reflect strategies that were successful and/or strategies that were not successful, including an association of the strategies and/or historical information with the item subject to such strategy or one or more attributes of such an item.

Figure 11B:
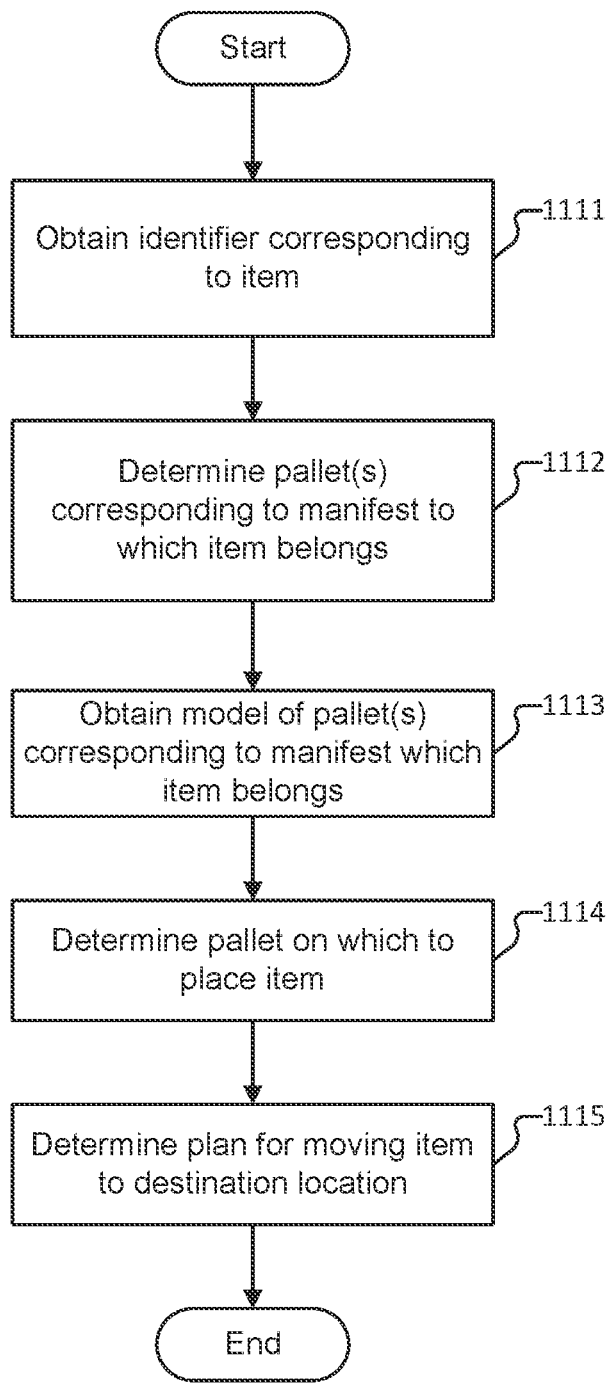
FIG. 11B is a flow chart illustrating an embodiment of a process to determine a plan for moving an item on a pallet.

FIG. 11B is a flow chart illustrating an embodiment of a process to determine a plan for moving an item on a pallet. In some embodiments, process 1110 of FIG. 11B corresponds to, or is implemented in connection with, 1110 of process 1100 of FIG. 11A. Process 1110 is performed by a control computer, such as control computer 118 of FIG. 1A and/or a control computer of system 400 of FIG. 4A, e.g., to determine a plan for picking/placing an item.

At 1111, an identifier corresponding to an item is obtained. In some embodiments, the system obtains the identifier based at least in part on information obtained by one or more sensors. For example, the identifier may be a barcode, a QR code, a near field communication label, etc., one or more sensors in the workspace such as a sensor (e.g., scanner) at an input to the system may obtain the information pertaining to the identifier. The sensor at the input to the system may be a sensor located within proximity of a conveyor that carries the items to the system. In some embodiments, the identifier corresponding to the item is obtained from a data structure such as a mapping of trays or conveyor slot to items and/or item identifiers. The data structure may have been set by an upstream system that retrieved the items and provided the items for palletization.

At 1112, one or more pallets corresponding to a manifest to which the item belongs is determined. In some embodiments, the system may use the identifier corresponding to the item in connection with determining the manifest to which the item belongs. For example, the system may perform a lookup with respect to a mapping of item identifiers to manifests, etc. In response to determining the manifest to which the item belongs, the system may determine the one or more pallets corresponding to the manifest. As an example, if a manifest of items comprises a sufficiently large number of items so that all items on the manifest do not fit on a single pallet, the system may determine a plurality of pallets on which the item may be placed (and still satisfy fulfillment of the manifest with respect to the item). As another example, if the system simultaneously stacks items on a plurality of pallets, the system may determine which one or more pallets of the plurality of pallets correspond to the manifest.

At 1113, a model of at least one of the one or more pallets corresponding to the manifest to which the item belongs are determined. According to various embodiments, the system obtains a model for each of the pallets corresponding to the manifest. The system may obtain the model for pallets that correspond to the manifest and for which the system is actively palletizing items on the pallets (e.g., predefined zone in which the pallet is located is not paused or set to inactive).

In some embodiments, the system may obtain a cached model pertaining to a pallet (e.g., a model of the stack of items on the pallet). As an example, cached model may comprise a current model of the stack of items on the pallet. As another example, the cached model may comprise a model according to a previous state of the stack of items on the pallet. In response to a determination that the cached model corresponds to a previous state of the stack of items on the pallet, the system may generate a new model corresponding to a current state of the stack of items on the pallet, or update the cached model to correspond to the current state.

In some embodiments, the system generates the model for the at least one of the one or more pallets corresponding to the manifest to which the item belongs. The system may generate a model of a stack of items on a pallet based at least in part on the information obtained by one or more sensors in the workspace such as a sensor that obtains information pertaining to the predefined zone in which the pallet is located.

At 1114, a pallet on which to place the item is determined. In some embodiments, the pallet on which to place the item is determined based at least in part on the corresponding model pertaining to the pallet. The pallet may be determined based at least in part on an updated model or simulation in connection with assessing an expected stack of items if the item were to be placed on the pallet. In the case of a plurality of pallets corresponding to the manifest to which the item belongs, the system may select a pallet on which to place the item based on a determination that the item fits best on the pallet (e.g., on the stack of items), etc.

According to various embodiments, the system may determine the pallet on which to place the item based at least in part on a state of the pallet and/or a state of the plurality of pallets. The system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

The system may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. The system may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. The system may select a destination location for which the expected fit and/or expected stability satisfies (e.g., exceeds) a corresponding threshold value. Additionally, or alternatively, system may select a destination location that optimizes the expected fit (e.g., of the item on the stack) and/or expected stability (e.g., of the stack).

At 1115, a plan for moving the item to a destination location is determined. In some embodiments, in response to determining the pallet on which to place the item, the system determines a destination location on the pallet at which to place the item. The system may also determine a plan for moving the item such as picking the item from the input (e.g., the conveyor) and placing the item at the destination location (e.g., on the pallet). The system may determine the plan for moving the item based at least in part on one or more attributes of the item and/or the model of the pallet (e.g., a current state/properties of the pallet such as a state of the stack of items on the pallet). The plan for moving the item may be determined based at least in part on an expected cost of moving the item from the source location to the destination location (e.g., the cost of moving the item along the path/trajectory), etc. In some embodiments, the plan for moving the item is based at least in part on a state of the stack of items on the pallet and an attribute of the source location (e.g., a height of the conveyor).

According to various embodiments, the determining the plan for moving the item to the destination location may include performing a plurality of simulations respectively including simulation the placement of the item with different numbers of spacers (e.g., zero or more spacers), the number of spacers placed in different locations, etc., and determining the plan for moving the item based on a determination of the best plan, or a subset of plans that satisfy one or more minimum criteria (e.g., less than a maximum cost threshold, better than a minimum stability threshold, etc.). The determining the plan for moving the item to the destination location may include determining a plan for placing a spacer in connection with placing the item at the destination location item.

Figure 11C:
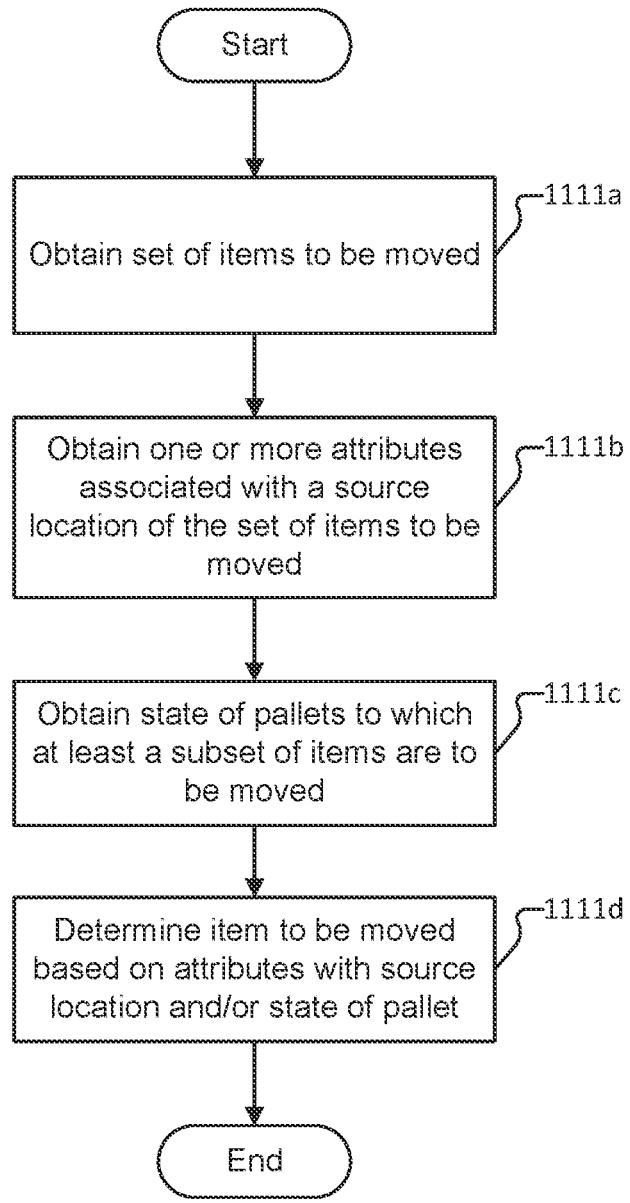
FIG. 11C is a flow chart illustrating an embodiment of a process to determine to an item to move to a pallet.

FIG. 11C is a flow chart illustrating an embodiment of a process to determine to an item to move to a pallet. In some embodiments, process 1111 of FIG. 11C corresponds to, or is implemented in connection with, 1111 of process 1110 of FIG. 11B. Process 1111 is performed by a control computer, such as control computer 118 of FIG. 1A and/or a control computer of system 400 of FIG. 4A, e.g., to determine a plan for picking/placing an item.

At 1111a, a set of items to be moved is obtained. For example, the system may obtain a manifest for the set of items to be moved. The manifest may correspond to an order or shipment to be provided to a customer, etc. The manifest may include identifiers corresponding to the various items to be moved.

At 1111b, one or more attributes associated with a source location (or possible source location) from which the items are to be moved to a pallet are obtained. The attributes may include a position, a height, a relative height (e.g., relative to a stack height threshold, to a current or expected state of the pallet, etc.), etc. Various other attributes of the source location may be obtained.

At 1111c, one or more states of a set of pallets to which at least a subset of the items are to be moved are obtained. In some embodiments, the items on the manifest may be simultaneously (e.g., concurrently or contemporaneously) palletized. A state of the possible pallets to which items for the manifest may be moved is obtained. The state of a pallet may be a current state of the pallet, or an expected state of the pallet such as a state of the pallet at a particular time. The particular time for determining the expected state of the pallet may be the time at which the item is expected to be moved to the pallet, a time when the item is expected to reach the robotic arm for palletization, etc. The state of the pallet may correspond to a height of the pallet, a model or simulation of the stack on the pallet, a stability of the pallet, etc.

At 1111d, an item to be moved is determined based at least in part on an attribute of the source location and a state of the pallet. In some embodiments, the system determines an order in which a subset or set of items from the manifest are to be palletized based at least in part on an attribute of the source location and a state of the pallet. The item to be moved may be further determined based at least in part on an attribute of the item (e.g., height). The attribute of various items may be used in connection with determining to move the item in order to take into account the corresponding costs of moving the items, and an expected stability of the stack (e.g., the order in which the items are palletized may impact characteristics of the stack such as stability, density, etc.).

Figure 12A:
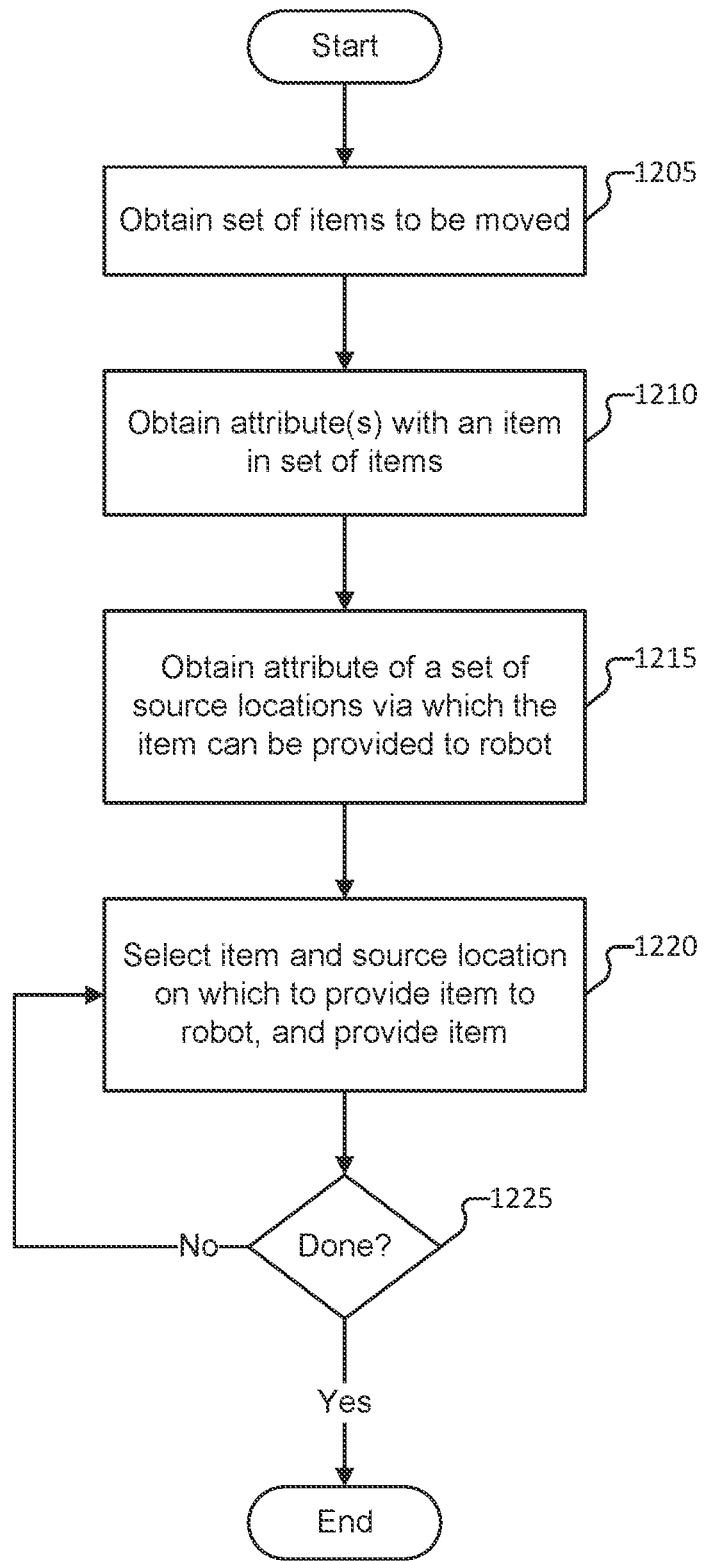
FIG. 12A is a flowchart illustrating an embodiment of a process of providing an item to a robot for the robot in connection with palletization.

FIG. 12A is a flowchart illustrating an embodiment of a process of providing an item to a robot for the robot in connection with palletization. Process 1200 may be implemented by system 400 of FIG. 4.

At 1205, a set of items to be moved is obtained. For example, the system may obtain a manifest for the set of items to be moved. The manifest may correspond to an order or shipment to be provided to a customer, etc. The manifest may include identifiers corresponding to the various items to be moved.

At 1210, one or more attributes associated with an item in the set of items is obtained. As an example, the one or more attributes may be obtained from a mapping of attributes to items (e.g., a mapping of attributes to identifiers of items). As another example, the one or more attributes may be obtained based at least in part on sensor data. The sensor data may be obtained using one or more sensors within a workspace of the robotic system.

The attribute of various items may be used in connection with determining an order in which to provide the items, and/or in determining a source location to which the item is to be provided for palletization. The attribute of the various items may be used to compute the costs of moving the various items from different source locations to a destination location (e.g., a location on the stack on the pallet). In some embodiments, the attributes of the various items are used to model or simulate palletization of a stack of item and/or determining one or more expected attributes of the stack associated with moving the item to the stack. The expected attributes of the stack may include a density, a stability, a height, a shape or profile, a center of gravity, a rigidity, etc.

At 1215, an attribute of a set of source locations via which the item can be provided to a robot are obtained. For example, as illustrated in system 400 of FIG. 4A, a plurality of conveyors may be used to provide items to robotic arm 401. The various source locations (e.g., conveyors) in the system may have different attributes, and an attribute of a particular location may be used in connection with determining a source location. The attribute of a source location may include a location (e.g., a relative location to the robotic, an absolute location), a height, a speed at which the conveyor carries items, a relative height (e.g., a height relative to stack height threshold, a height relative to a current height of the stack on a pallet), an indication of whether the location is to be used if the current/expected height of the stack is less than the stack height threshold, etc.

At 1220, an item and source location on which the item is to be provided to the robot is selected, and the item is provided. In some embodiments, the system models or simulates the stack or palletization of the set of items on one or more pallets. The system may provide the items based on an expected stack of the pallet (e.g., items to form the base or towards the bottom of the stack may be provided before items that are to be stacked towards the top of the stack). In some embodiments, the order in which the items are palletized or provided to the robot, and the source location from which the item is provided to the robot is determined based at least in part on the cost of moving the item from the selected source location to the destination location on the corresponding pallet. For example, the system may determine the source location based on a minimization/optimization of the costs of moving the item to the destination location. As an illustrative example, in the case that the stack of items is below a certain height such as a stack height threshold or that the location of the item in the stack is to be below the certain height, the system may determine to provide the items to the source location having a relatively lower height so as to reduce the distance/cost associated with moving the item from the source location to the destination location. As another illustrative example, in the case that the stack of items is above a certain height such as a stack height threshold or that the location of the item in the stack is to be above the certain height, the system may determine to provide the items to the source location having a relatively larger height so as to reduce the distance/cost associated with moving the item from the source location to the destination location.

In the example shown, the selecting of the item and source location and the providing of the item continue until all the items in the set of items (or items to be palletized) is completed (1225), at which the process 1200 ends.

Figure 12B:
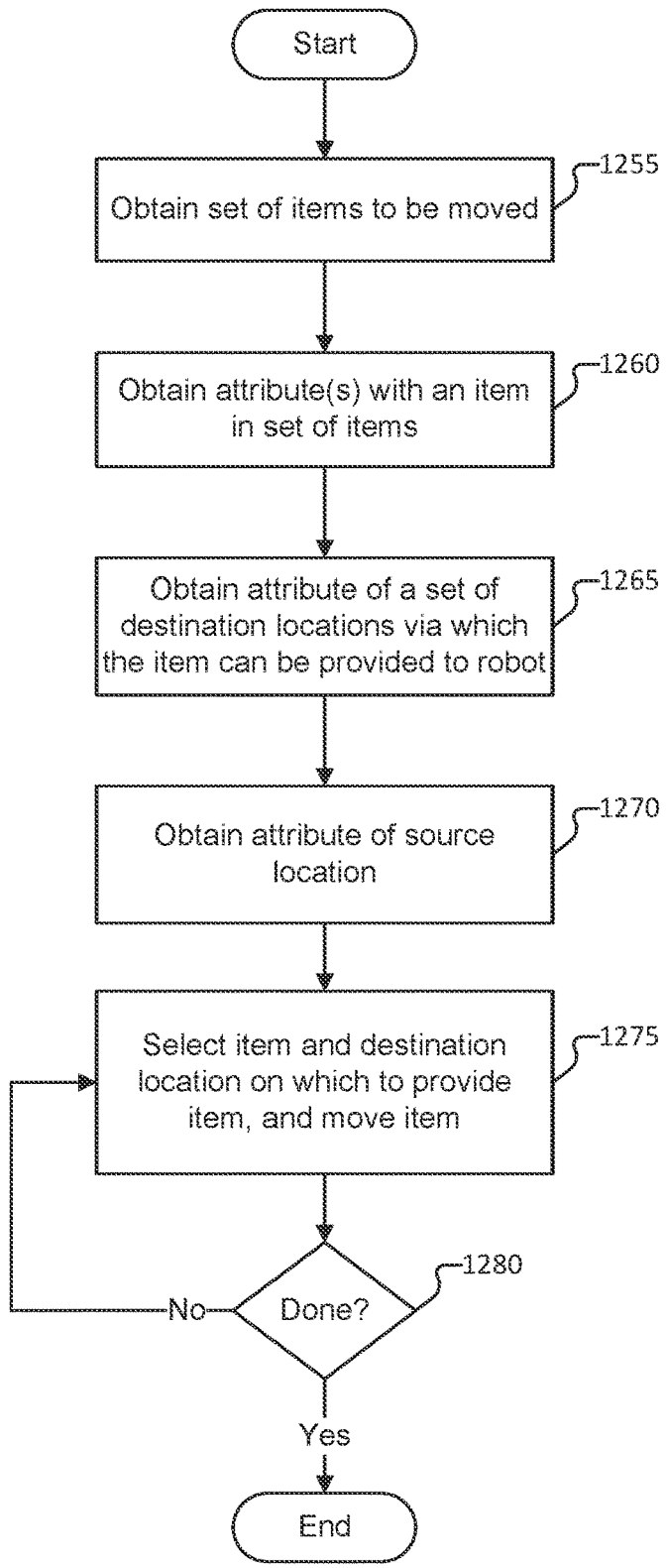
FIG. 12B is a flowchart illustrating an embodiment of a process of depalletizing an item.

FIG. 12B is a flowchart illustrating an embodiment of a process of depalletizing an item. Process 1250 may be implemented by system 400 of FIG. 4.

At 1255, a set of items to be moved is obtained. For example, the robotic palletization system may obtain a manifest for the set of items to be moved. The manifest may correspond to an order or shipment to be provided to a customer, etc. The manifest may include identifiers corresponding to the various items to be moved.

At 1260, one or more attributes associated with an item in the set of items is obtained. As an example, the one or more attributes may be obtained from a mapping of attributes to items (e.g., a mapping of attributes to identifiers of items). As another example, the one or more attributes may be obtained based at least in part on sensor data. The sensor data may be obtained using one or more sensors within a workspace of the robotic palletization system.

The attribute of various items may be used in connection with determining an order in which to provide the items, and/or in determining a source location to which the item is to be provided for palletization/depalletization. The attribute of the various items may be used to compute the costs of moving the various items from different source locations to a destination location (e.g., a location on the stack on the pallet). In some embodiments, the attributes of the various items are used to model or simulate palletization of a stack of item and/or determining one or more expected attributes of the stack associated with moving the item to the stack. The expected attributes of the stack may include a density, a stability, a height, a shape or profile, a center of gravity, a rigidity, etc.

At 1265, an attribute of a set of destination locations via which the item can be provided to a robot are obtained. For example, as illustrated in system 400 of FIG. 4, a plurality of conveyors may be used to provide items to robotic arm 401. The various destination locations (e.g., conveyors) in the system may have different attributes, and an attribute of a particular location may be used in connection with determining a destination location. The attribute of a destination location may include a location (e.g., a relative location to the robotic, an absolute location), a height, a speed at which the conveyor carries items, a relative height (e.g., a height relative to stack height threshold, a height relative to a current height of the stack on a pallet), an indication of whether the location is to be used if the current/expected height of the stack is less than the stack height threshold, etc.

At 1270, an attribute of the source location is obtained. In some embodiments, the system obtains a state of the stack of items on the pallet. For example, the attribute of the source location may include a height of stack of items and/or an indication of whether the stack of items is higher than a stack height threshold. The obtaining the attribute of the source location may include generating a model/simulation of the stack using sensor data.

At 1275, an item and destination location on which the item is to be provided to the robot is selected, and the item is moved. In some embodiments, the system models or simulates the stack or palletization of the set of items on one or more pallets. The robotic palletization system may move the items based at least in part on a model of the stack of items. For example, the robotic palletization system may determine the item to move based on a current stability of the stack, an expected stability of the stack after the item is removed from the stack, etc. In some embodiments, the order in which the items are depalletized, and/or the destination location to which the item is moved, are determined based at least in part on the cost of moving the item from the selected source location to the destination location (e.g., the selected conveyor). For example, the robotic palletization system may determine the source location based on a minimization/optimization of the costs of moving the item to the destination location. As an illustrative example, in the case that the stack of items is below a certain height such as a stack height threshold, the system may determine to move the items to the source location having a relatively lower height (e.g., a lower conveyor) so as to reduce the distance/cost associated with moving the item from the source location to the destination location. As another illustrative example, in the case that the stack of items is above a certain height such as a stack height threshold, the robotic palletization system may determine to move the items to the destination location having a relatively larger height so as to reduce the distance/cost associated with moving the item from the source location to the destination location.

In the example shown, the selecting of the item and source location and the providing of the item continue until all the items in the set of items (or items to be palletized) is completed (1280), at which the process 1250 ends.

Figure 13:
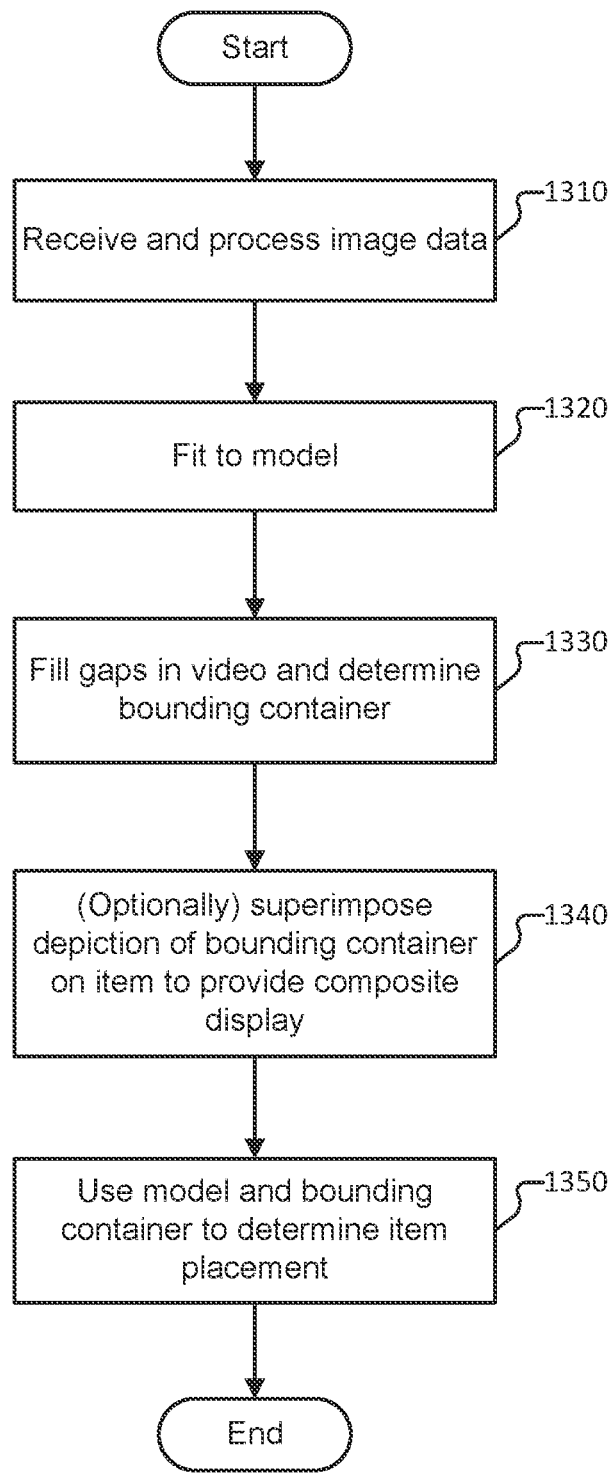
FIG. 13 is a flow chart illustrating an embodiment of a process to place items on a pallet.

FIG. 13 is a flow chart illustrating an embodiment of a process to place items on a pallet. In various embodiments, the process 1300 is performed by a control computer, such as control computer 118 of FIG. 1A and/or control computer of system 400 of FIG. 4A, based on sensor data, such as image data generated by sensors in the workspace such as cameras 112, 114, and 116. In various embodiments, the process 1300 is used to determine item attributes and placement dynamically, e.g., based on item size and shape as determined based at least in part on image data.

In the example shown, at 1310 image data is received and processed. For example, image data from two or more cameras may be received and merged to generate a composite set of points in three-dimensional space.

At 1320, image data received and processed at 1310 is fitted to a model. For example, the composite set of points may be compared to corresponding data comprising a library of item models and a "best fit" or "best match" model may be determined. In some embodiments, the library of item models is dynamically updated based at least in part on a machine learning process that uses information from historical models and results of implementation of such models to improve or update.

At 1330, gaps in the image data are filled, e.g., using data from the best fit model, and a bounding container (e.g., a bounding "box" for an item that is rectangular or nearly so in all dimensions) is determined for the item.

Optionally, at 1330, a graphical depiction of the bounding container is superimposed on the composite and/or raw image of the item (e.g., raw video) to provide a composite display, e.g., to a human user monitoring the operation.

At 1350, the model determined at 1320 and the bounding container determined at 1330 are used to determine a destination location at which to place the item (e.g., on a pallet). In some embodiments, the bounding container may be displayed in the determined placement location, e.g., in a visual display and/or representation of the operation to pick and place the item.

Figure 14:
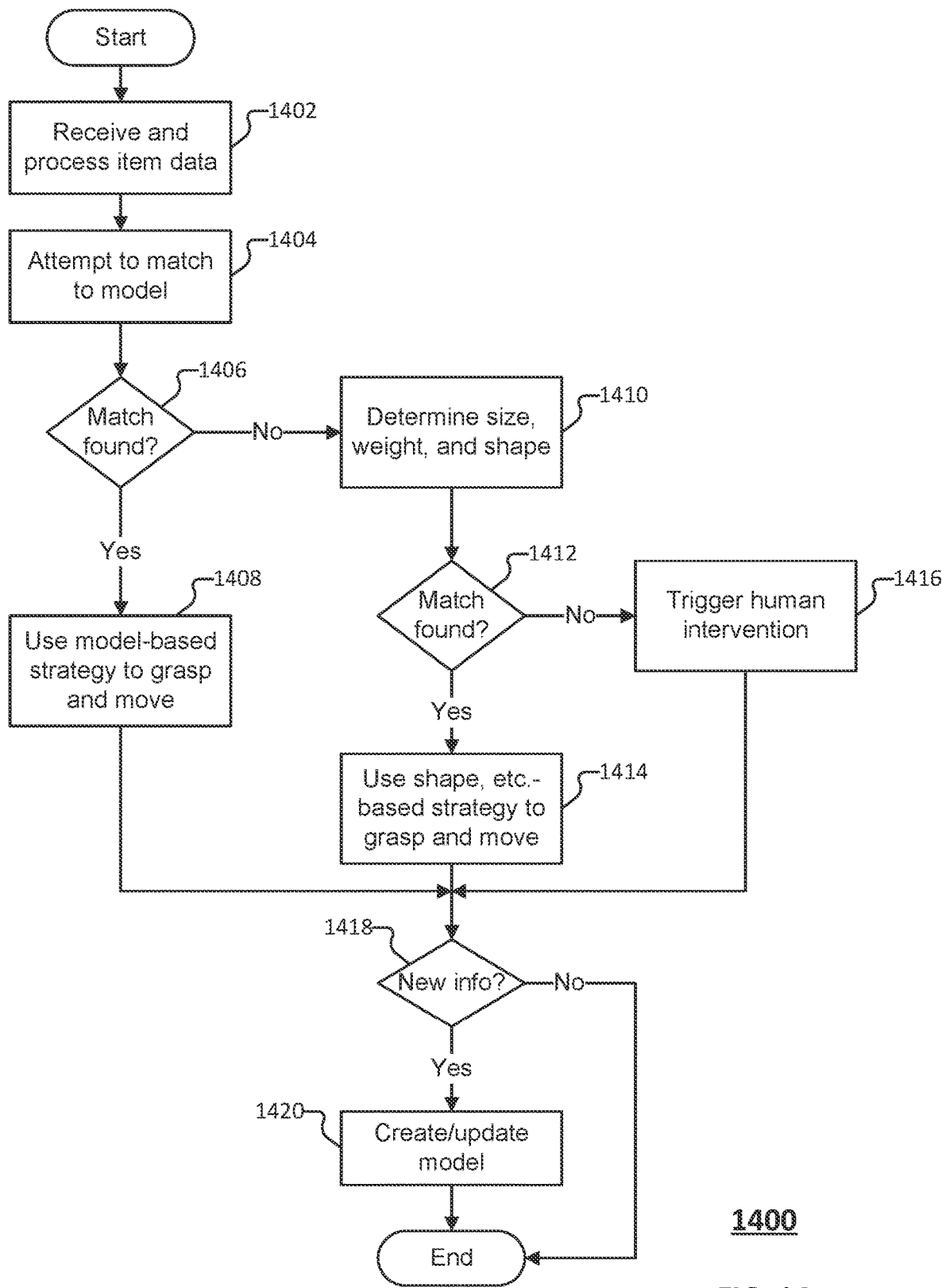
FIG. 14 is a flow chart illustrating an embodiment of a process to place an item on a pallet.

FIG. 14 is a flow chart illustrating an embodiment of a process to place an item on a pallet. In various embodiments, the process 1400 is performed by a control computer, such as control computer 118 of FIG. 1A and/or control computer of system 400 of FIG. 4A. In the example shown, at 1402 item data is received and processed. Example of item data include without limitation image data, optical or other scanner output, item weight, item identifier, item size, etc.

At 1404, an attempt is made to match the item data to a model, e.g., a model comprising a library of item models. The library of item models may be dynamically updated such as via a machine learning process. For example, markings on the item or its packaging may be read to identify the item and look up an item-specific model. In some embodiments, sensor readings may point in different directions. In some embodiments, outlier (e.g., an item that is not statistically relevant) and/or randomly selected sensor data may be removed from consideration to determine whether the remaining data can be match (e.g., with a prescribed degree of confidence) to an item model. If so, the sensor data from that sensor is discarded and a match is determined at 1406 to have been found.

If a match to an item-specific model is determined at 1406 to have been found, based on the data received at 1402, a strategy based on that model is used at 1408 to determine a strategy to grasp, pick up, move, and/or place the item.

If it is determined at 1406 that a match to an item-specific model cannot be found, at 910 the size, weight, shape, type of packaging, center of gravity, and/or other attributes of the item are determined and attempted to be matched to a model associated with items of that size, weight, shape, etc. If at 1412 it is determined that a match to such a model has been found, at 1414 the determined model is used to determine a strategy to grasp, pick up, move, and/or place the item. Otherwise, at 1416 human intervention is triggered, e.g., to manually input a strategy and/or an item identification to be mapped to a strategy, and/or to complete all or part of the operation with respect to the item by teleoperation, manually, etc.

At 1418 it is determined whether processing the item has generated additional or new information about the item and/or item type. If so, at 1420 the new information is used to generate and/or update a model for the item and/or item type. New information may include a measured weight, a center of gravity, a type of packaging, etc. If no new information has been developed and/or once such information has been reflected in any applicable model(s), the process ends.

In some embodiments, detection of a new item or item type triggers a discovery process in which attributes of the item may be determined and determined more fully or precisely. For example, the system may use the robotic arm to pick up the item and hold it in different locations and/or at different orientations to generate (additional) images or views of the item to be used to model or more completely model the item.

In various embodiments, a robotic system to palletize and/or depalletize heterogeneous items as disclosed herein includes a robotic arm with a suction-based, gripper-type, or other end effector at the operative end. The end effector in various embodiments may include on or more sensors used to palletize and/or depalletize heterogeneous items as disclosed herein. For example, the end effector may include image sensors used to facilitate first order picking and placing of an item and one or more force sensors to facilitate snugging items into place, e.g., adjacent to other items, sidewalls, and/or other structures. In another example, in some embodiments a suction-based end effector may include air pressure sensors to detect when a secure grasp has been made with the object surface and/or to detect when the object is losing contact or shearing off.

According to various embodiments, process 1400 may be implemented in connection with determining a strategy for grasping the item, etc. The model corresponding to the item may be comprised in the plan for moving the item from the source location (e.g., the conveyor) to the destination location.

Figure 15:
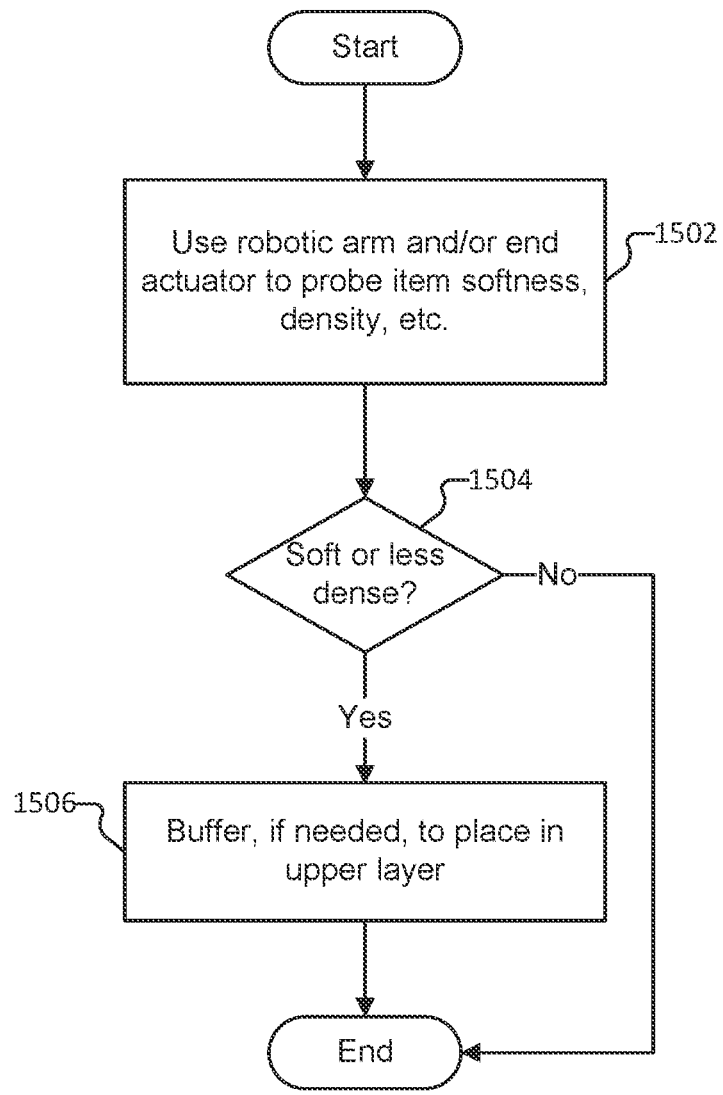
FIG. 15 is a flow chart illustrating an embodiment of a process to use a robotic arm to determine an attribute of an item to be stacked on a pallet.

FIG. 15 is a flow chart illustrating an embodiment of a process to use a robotic arm to determine an attribute of an item to be stacked on a pallet. In various embodiments, the process 1500 of FIG. 15 may be implemented by a control computer, such as control computer 118 of FIG. 1A and/or a control computer of system 400 of FIG. 4. In the example shown, at 1502 a robotic arm and/or end effector is used to probe an item to determine one or more attributes of the item, for example how soft, heavy, dense, etc., the item is. For example, if the item gives to light pressure it is determined to be soft. If the item is light for its size, as determined based on image data, the item is determined to be less dense. If at 1404 the item has been determined to be soft and/or less dense (e.g., less than a softness/density threshold), the item is buffered at 1506, if needed, to be placed in an upper layer of the stack. Buffering the item may include moving and placing the item in the buffer or staging area at least temporarily until the system determines that a new space at which the item may be placed (e.g., based at least in part on attributes of the item such as size, type of packing, rigidity, softness, etc.). If the item is not determined at 154 to be soft or less dense, the item is added to the stack without buffering at 1506.

Figure 16:
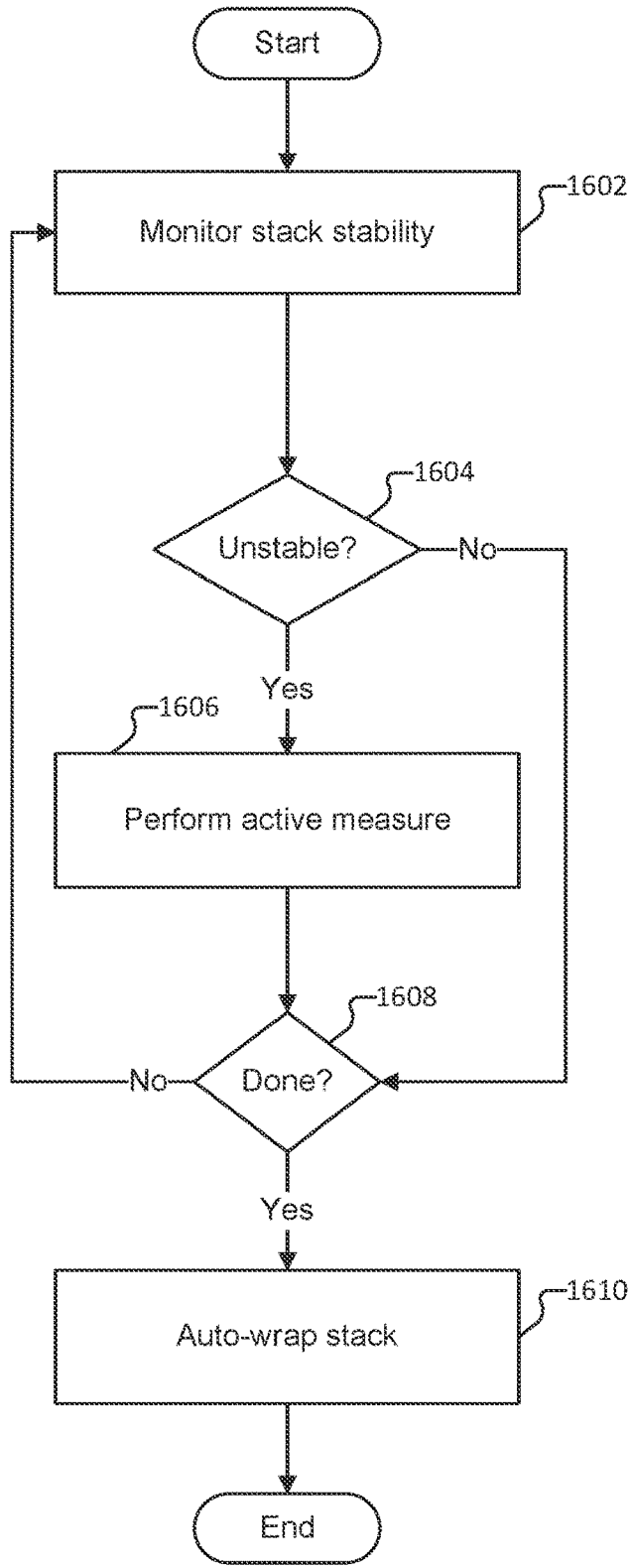
FIG. 16 is a flow chart illustrating an embodiment of a process to use a robotic arm to detect and respond to instability in a set of items as stacked on a pallet.

FIG. 16 is a flow chart illustrating an embodiment of a process to use a robotic arm to detect and respond to instability in a set of items as stacked on a pallet. In various embodiments, the process 1600 of FIG. 16 may be implemented by a control computer, such as control computer 118 of FIG. 1A and/or a control computer of system 400 of FIG. 4A. In various embodiments, the process 1600 is used to detect stack instability, e.g., based on internal (e.g., force) and/or external (e.g., image) sensor data.

In the example shown, stack stability is monitored at 1602. For example, cameras in the workspace/environment may be used to detect that the stack has started to lean, crumble, slide, etc. Or, force sensors on the robotic arm and/or end effector may be used to detect that the stack or a portion thereof has become unstable such as when the robotic arm is placing an item on the stack. If at 1604 it is determined the stack has become unstable, at 1606 an active measure is performed.

The active measure may improve the stability of the stack or otherwise remove an abnormality of the stack. An example of the active measure includes automatically wrapping the partial stack, e.g., in plastic, to prevent slippage and reinforce the stability and structure of the stack. Another example of the active measure includes controlling the robotic arm to remove an item that has slipped/fallen from the stack and placing the item back on the stack (in the former location that the item occupied, or a new location in which the item is determined to better fit or to correspond to improved stability of the stack), or alternatively, the robotic arm moves/places the item to a buffer or staging area until such time that the system determines that a new location at which the item is to be placed is formed (e.g., that satisfies various criteria such as satisfying one or more thresholds pertaining to fit, density, stability, etc.). Another example of the active measure includes communicating a notification to a human operator such as via sending a notification to a terminal of the human operator and displaying a notification on a user interface of the terminal to alert the human operator of the instability or abnormality.

According to various embodiments, the active measure is determined/selected based at least in part on a model of the stack. For example, the system may generate an updated model of the stack based at least in part on information obtained by a sensor in the workspace/environment. The system may determine a cause of the instability and determine a plan to remediate the instability. For example, if the system determines that the instability is caused by a particular item, the system may control the robotic arm to remove the particular item (or a set of items that includes the particular items), and restack the particular item (or at least a subset of the set of items that were removed). The system may update the models for moving/placing items based on the detected instability, etc.

In some embodiments, the active measure may include determining whether to place a spacer or spacer material on the stack of items, and in response to determining whether to place a spacer or spacer material on the stack of items, determining a plan to place the spacer/spacer material on the stack of items, and implementing the plan to place the spacer/spacer material. In some embodiments, the plan to place the spacer/spacer material may include inserting the spacer into a cavity or other location on the stack of items. In some embodiments, the plan to place the spacer/spacer material may include removing one or more items from the stack of items, placing one or more spacers at one or more spacer locations, and re-stacking the one or more items that were removed from the stack of items.

If the stack is not determined (again) at 1604 to have become unstable, and in any event once the entire stack (e.g., pallet or other receptacle) has been completed (1608), the stack and/or remaining unwrapped portion thereof is wrapped automatically at 1610 and the process ends.

Various methods/processes have been described herein. Various steps in the various methods/processes may be performed in different orders than those described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A device, comprising:
 a mounting hardware configured to mount the device on or adjacent to an end effector of a robotic arm;
 a communication interface configured to receive a control signal; and
 an actuator configured to dispense a quantity of spacer material from a supply of spacer material in response to the control signal.
2. The device of claim 1, wherein the mounting hardware is at least one of a bracket, a strap, and one or more fasteners.

3. The device of claim 1, wherein the end effector is a gripper.

4. The device of claim 3, wherein the gripper is a suction-based gripper.

5. The device of claim 1, wherein the robotic arm is comprised in a robotic palletization system.

6. The device of claim 5, further comprising:
one or more processors to configured to provide to the communication interface the control signal,
wherein:
the robotic palletization system comprises one or more processors; and
the one or more processors are configured to:
determine that a spacer is to be placed in connection with palletization of one or more items; and
generate the control signal to cause the actuator to dispense the quantity of spacer material.

7. The device of claim 6, wherein the quantity of spacer material is a predefined quantity.

8. The device of claim 6, wherein the control signal comprises an indication of the quantity of spacer material to be used as the spacer.

9. The device of claim 6, wherein the one or more processors are further configured to send the control signal to the actuator.

10. The device of claim 6, wherein:
the one or more processors are further configured to generate a model of a pallet or a stack of one or more items on the pallet; and
the spacer is determined to be placed in connection with palletization of one or more items based at least in part on the model of the pallet or the stack of one or more items on the pallet.

11. The device of claim 5, wherein:
the robotic palletization system comprises one or more processors; and
the one or more processors are configured to:
generate a model of at least a top surface of a pallet or a stack of one or more items on the pallet;
determine a set of N items to be placed next on the pallet;
determine that placing one or more spacers in connection with placing the set of N items on the pallet will result in an improved stack of items on the pallet compared to a resulting stack of placing the set of N items without spacers;
generate one or more control signals to cause the actuator to dispense the quantity of spacer material corresponding to the one or more spacers; and
provide the one or more control signals to the actuator in connection with placing the set of N items on the pallet.

12. The device of claim 11, wherein N is a positive integer.

13. The device of claim 11, wherein a determination that the placing one or more spacers in connection with placing the set of N items on the pallet is expected to result in an improved stack of items on the pallet is based at least in part on one or more of a packing density, a level top surface, and a stability.

14. The device of claim 11, wherein a determination that the placing one or more spacers in connection with placing the set of N items on the pallet is expected to result in an improved stack of items on the pallet is based at least in part on a determination that a packing density of the stack of items with the set of N items is higher than a packing density if the set of N items are placed on the pallet without the one or more spacers.

15. The device of claim 11, wherein a determination that the placing one or more spacers in connection with placing the set of N items on the pallet is expected to result in an improved stack of items on the pallet is based at least in part on a determination that a top surface is more level than a top surface if the set of N items are placed on the pallet without the one or more spacers.

16. The device of claim 11, wherein a determination that the placing one or more spacers in connection with placing the set of N items on the pallet is expected to result in an improved stack of items on the pallet is based at least in part on a determination that a stability of the stack of items with the set of N items is higher than a stability if the set of N items are placed on the pallet without the one or more spacers.

17. The device of claim 11, wherein to determine that placing one or more spacers in connection with placing the set of N items on the pallet is expected to result in an improved stack of items on the pallet compared to a resulting stack of placing the set of N items without spacers comprises:
performing a simulation placing the set of N items without using any spacers;
determining a first model based at least in part on the simulation of placing the set of N items without using any spacers;
performing a simulation placing the set of N items using one or more spacers;
determining a second model based at least in part on the simulation of placing the set of N items using the one or more spacers; and
comparing the first model and the second model, the second model being determined to bet better than the second model.

18. The device of claim 17, wherein the comparing the first model and the second model comprises:
determining a characteristic value pertaining to the first model;
determining a characteristic value pertaining to the second model; and
determining, based on a comparison of the characteristic values of the first model and the second model, that the second model is indicative of an improved stack of items compared to the first model.

19. The device of claim 1, wherein the spacer material a rigid block.

20. The device of claim 1, wherein the spacer material a rigid block of foam.

21. The device of claim 1, wherein the spacer material comprises polyurethane.

22. The device of claim 1, wherein the supply of spacer material comprises one or more precut blocks.

23. The device of claim 1, wherein:
the supply of spacer material comprises a plurality of precut blocks;
the plurality of precut blocks is preloaded into a spring-loaded cartridge that biases the plurality of precut blocks to a dispensing end; and
in response to a precut block being dispensed from the cartridge, another of the plurality of precut blocks is pushed to a next-in-line position to be dispensed from the cartridge.

24. The device of claim 23, wherein in response to the actuator receiving a control signal, the actuator causes at least one of the plurality of precut blocks to be dispensed from the cartridge.

25. The device of claim 1, wherein the supply of spacer material comprises one or more of a larger block of spacer material, a strip of spacer material, and a roll of spacer material.

26. The device of claim 25, wherein:
the device further comprises a cutter that is configured to cut the quantity of spacer material from the supply of spacer material.

27. The device of claim 26, wherein in response to the control signal being provided to the actuator, the actuator causes the cutter to cut the quantity of spacer material from the supply of spacer material.

28. The device of claim 1, wherein:
the supply of spacer material comprises a liquid precursor;
in response to the control signal being provided to the actuator, the actuator causes the quantity of spacer material to be dispensed onto a surface of a pallet or a stack of items on the pallet; and
the dispensed liquid precursor hardens after being dispensed onto the surface of the pallet or the stack of items on the pallet.

29. The device of claim 1, wherein:
the supply of spacer material comprises an extruded material; and
in response to the control signal being provided to the actuator, the extruded material is filled to one or more of a desired size and a desired firmness.

30. The device of claim 29, wherein the extruded material is sealed in response to a determination that the extruded material is filled to the one or more of the desired size and the desired firmness.

31. The device of claim 29, wherein the extruded material is filled with a fluid.

32. The device of claim 1, further comprising:
one or more processors to configured to provide to the communication interface the control signal,
wherein:
the robotic arm is comprised in a robotic palletization system; and
the one or more processors are configured to:
control the robotic arm to move the quantity of spacer material dispensed from a location to which the quantity of material was dispensed to a destination location.

33. The device of claim 32, wherein:
the one or more processors determine a plan to improve a stacking of a set of items on a pallet; and
the destination location is determined based at least in part on the plan.

34. The device of claim 1, wherein the quantity of spacer material is dispensed into a grasp of the end effector, and the end effector is controlled to place the quantity of spacer material on a pallet or a stack of items on the pallet.

35. The device of claim 1, further comprising:
a connector to receive electrical power that is used to drive one or more of the end effector, the robotic arm, the communication interface, and the actuator.

36. The device of claim 1, further comprising:
a connector to receive compressed fluid that is used to drive one or more of the end effector, the robotic arm, and the actuator.

37. The device of claim 1, wherein the communication interface is a wired communication interface.

38. The device of claim 1, wherein the communication interface is a wireless communication interface.

39. A robotic system, comprising:
a communication interface; and
one or more processors coupled to the communication interface and configured to:
receive, via the communication interface, data associated with a plurality of items to be stacked on or in a destination location;
generate based at least in part on the received data a plan to stack the items on or in the destination location, including by for each item:
determining the destination location based at least in part on a characteristic associated with the item, and at least one of (i) a characteristic of a platform or receptacle on which one or more items are to be stacked, and (ii) an existing stack of one or more items on the platform or receptacle,
wherein the plan includes placing a spacer in connection with placing at least one item of the items at the corresponding destination location; and
implement the plan at least in part by controlling a robotic arm to pick up the items and stack the items on or in the destination location according to the plan, including using the spacer in connection with placing the at least one item.

40. The system of claim 39, wherein generating the plan further includes:
determining the destination location based at least in part on a characteristic associated with the item, and at least one of (i) a characteristic of a platform or receptacle on which one or more items are to be stacked, and (ii) an existing stack of one or more items on the platform or receptacle.

41. The system of claim 40, wherein:
the destination location is determined from among a plurality of zones in which platforms or receptacles are disposed; and
each of the plurality of zones are within a range of a robotic arm.

42. The system of claim 39, wherein:
the robotic arm comprises a spacer dispenser; and
controlling the robotic arm to stack the items on or in the destination location according to the plan comprises:
generating a control signal to cause the spacer dispenser to dispense the spacer in connection with placing the at least one item.

43. The system of claim 42, wherein the controlling the robotic arm to stack the items on or in the destination location according to the plan further comprises:
determining, based at least in part on the plan, that the spacer is to be placed in connection with palletization of the at least one item.

44. The system of claim 43, wherein:
the controlling the robotic arm to stack the items on or in the destination location according to the plan further comprises:
determining a quantity of the spacer to use in connection with palletization of the at least one item; and
the control signal generated to cause the spacer dispenser to dispense the spacer is used to dispense the quantity of the spacer in connection with palletization of the at least one item.

* * * * *